(12) United States Patent
Bae et al.

(10) Patent No.: US 12,508,473 B2
(45) Date of Patent: Dec. 30, 2025

(54) WEARABLE DEVICE AND ELECTRONIC DEVICE FOR PROVIDING FEEDBACK TO USER CROSS-REFERENCE TO RELATED APPLICATIONS

(71) Applicant: Samsung Electronics Co., Ltd., Suwon-si (KR)

(72) Inventors: Soojung Bae, Suwon-si (KR); Sunae Kim, Suwon-si (KR); Sugyeong Kim, Suwon-si (KR); Harkjoon Kim, Suwon-si (KR); Heeyoung Cho, Suwon-si (KR); Sungcheol Kim, Suwon-si (KR); Hyunkyung Song, Suwon-si (KR); Sangyoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 18/475,600

(22) Filed: Sep. 27, 2023

(65) Prior Publication Data
US 2024/0017124 A1    Jan. 18, 2024

Related U.S. Application Data

(63) Continuation of application No. PCT/KR2023/008661, filed on Jun. 22, 2023.

(30) Foreign Application Priority Data

Jun. 24, 2022 (KR) .......... 10-2022-0077697
Oct. 7, 2022  (KR) .......... 10-2022-0128311
(Continued)

(51) Int. Cl.
*A63B 24/00* (2006.01)
*A61B 5/00* (2006.01)

(52) U.S. Cl.
CPC ........ *A63B 24/0062* (2013.01); *A61B 5/6802* (2013.01); *A63B 2024/0065* (2013.01); *A63B 2024/0068* (2013.01)

(58) Field of Classification Search
CPC ........ A63B 24/0062; A63B 2024/0065; A63B 2024/0068; A63B 21/00178;
(Continued)

(56) References Cited

U.S. PATENT DOCUMENTS 11,039,974 B2    6/2021  Kodama et al.
11,406,285 B2 *  8/2022  Ly ..................... G16H 40/67
(Continued)

FOREIGN PATENT DOCUMENTS

JP    2020520774 A    7/2020
KR    20170019040 A   2/2017
(Continued)

OTHER PUBLICATIONS

European Search Report dated Mar. 20, 2025 for EP Application No. 23827534.1.
(Continued)

*Primary Examiner* — Sundhara M Ganesan
(74) *Attorney, Agent, or Firm* — NIXON & VANDERHYE P.C.

(57) ABSTRACT

An electronic device for communicating with a wearable device applying an external force to a user. The electronic device may include a communication module configured to establish a wireless communication link with the wearable device, a display, a memory configured to store a fitness application, and a processor configured to execute the fitness application and control the display so that a screen of the executed fitness application including a first area is displayed on the display. The processor may be configured to receive first state information indicating that the wearable
(Continued)

device is in a sensing state for sensing a motion of the user through the communication module, recognize a state of the wearable device as the sensing state according to the received first state information, and control the display to provide visual feedback corresponding to the sensing state through the first area.

20 Claims, 66 Drawing Sheets

(30)  Foreign Application Priority Data

Dec. 13, 2022 (KR) .......................... 10-2022-0174152
Dec. 16, 2022 (KR) .......................... 10-2022-0177414

(58) Field of Classification Search
CPC ...... A63B 21/00181; A63B 2024/0093; A63B 23/0482; A63B 24/0087; A63B 21/4017; A63B 2022/0092; A63B 2022/0094; A63B 2071/0655; A63B 2071/0663; A63B 2071/0666; A63B 2220/40; A63B 2220/805; A63B 2225/20; A63B 2225/50; A63B 21/4009; A63B 21/4011; A63B 21/4025; A63B 71/0622; A61B 5/6802; A61B 5/7435; A61B 5/744; A61B 5/11; G06F 1/163; G06F 1/1694; G06F 3/016; G06F 3/04842; G06F 3/0481; G06F 3/16; A61H 2201/1628; A61H 2201/164; A61H 2201/165; A61H 2201/5007; A61H 2201/5035; A61H 2201/5046; A61H 2201/5084; A61H 1/0244; A61H 3/00; G06Q 50/10; H04W 4/80
See application file for complete search history.

(56) References Cited

U.S. PATENT DOCUMENTS

| | | | |
|---|---|---|---|
| 11,772,259 B1* | 10/2023 | Kiehl | ....................... A61H 3/00 700/245 |
| 2018/0140900 A1 | 5/2018 | Kim et al. | |
| 2019/0134454 A1 | 5/2019 | Mahoney et al. | |
| 2019/0150792 A1* | 5/2019 | Nakashima | .......... A61B 5/1128 |
| 2020/0223071 A1* | 7/2020 | Mahoney | .......... A63B 21/00181 |
| 2022/0004167 A1* | 1/2022 | Zealand | ................. G16H 20/30 |
| 2023/0398031 A1* | 12/2023 | Cho | ........................ A61B 5/00 |

FOREIGN PATENT DOCUMENTS

| | | |
|---|---|---|
| KR | 20170024135 A | 3/2017 |
| KR | 20180033333 A | 4/2018 |
| KR | 20180119515 A | 11/2018 |
| KR | 102102146 B1 | 4/2020 |
| KR | 20210073274 A | 6/2021 |
| KR | 20210128564 A | 10/2021 |
| KR | 20220052240 A | 4/2022 |
| WO | 2020202714 A1 | 10/2020 |
| WO | WO 2021/251584 A1 | 12/2021 |

OTHER PUBLICATIONS

Extended European Search Report dated Jun. 17, 2025 issued in European Patent Application No. 23827534.1, 14 pp.

* cited by examiner

WEARABLE DEVICE AND ELECTRONIC DEVICE FOR PROVIDING FEEDBACK TO USER CROSS-REFERENCE TO RELATED APPLICATIONS

CROSS-REFERENCE TO RELATED APPLICATIONS

This application is a continuation application of International Application No. PCT/KR2023/008661 designating the United States, filed on Jun. 22, 2023, in the Korean Intellectual Property Receiving Office and claiming priority to Korean Patent Application No. 10-2022-0077697, filed on Jun. 24, 2022, and Korean Patent Application No. 10-2022-0128311, filed on Oct. 7, 2022, and Korean Patent Application No. 10-2022-0174152, filed on Dec. 13, 2022, and Korean Patent Application No. 10-2022-0177414, filed on Dec. 16, 2022, in the Korean Intellectual Property Office, the disclosures of which are incorporated by reference herein in their entireties.

BACKGROUND

1. Field

Certain example embodiments relate to a wearable device and/or an electronic device for providing feedback to a user.

2. Description of Related Art

A wearable device may help a user's exercise by applying an external force to the user. The wearable device may be paired with a user terminal (e.g., a smartphone), and may transmit data collected by the wearable device to the user terminal.

SUMMARY

A user wearing a wearable device may not easily determine a state of the wearable device during exercise.

An example embodiment may provide an electronic device, and a wearable device configured to output feedback (e.g., at least one of visual feedback, auditory feedback, or haptic feedback) corresponding to a state of the wearable device to a user.

An electronic device according to an example embodiment may communicate with a wearable device that applies an external force to a user. The electronic device may include: a communication module, comprising communication circuitry, configured to establish a wireless communication link with the wearable device; a display; a memory configured to store a fitness application; and at least one processor configured to execute the fitness application and control the display to display a screen of the executed fitness application including a first area on the display. The at least one processor may be configured to receive first state information indicating that the wearable device is in a sensing state for sensing a motion of the user through the communication module, recognize a state of the wearable device as the sensing state according to the received first state information, and control the display to provide visual feedback corresponding to the sensing state through the first area.

A wearable device according to an example embodiment may include a communication module, comprising communication circuitry, configured to establish a wireless communication link with an electronic device; a driving module, comprising a motor and/or circuitry, configured to generate torque to provide an external force to a user; a sensor configured to acquire motion information by sensing a motion of the user; a display module comprising a lighting unit; and at least one processor configured to transmit first state information indicating that the wearable device is in a sensing state for sensing the motion to the electronic device through the communication module, control the display module to provide visual feedback corresponding to the sensing state through the display module, determine control information used for generating the torque by using at least some of the acquired motion information, and control the driving module to provide the external force to the user based on the determined control information.

A watch-type electronic device according to an example embodiment may communicate with a wearable device for applying an external force to a user. The watch-type electronic device may include: a communication module, comprising communication circuitry, configured to establish a wireless communication link with a user terminal and communicate with the wearable device through the user terminal; a display; a memory configured to store a fitness application; at least one processor configured to execute the fitness application and control the display to display a first screen of the executed fitness application on the display. The at least one processor may be configured to cause, to be displayed on the first screen, an object corresponding to an operation mode of the wearable device, an exercise intensity, a button for changing the exercise intensity, a button for setting the operation mode to a first operation mode where the wearable device provides assistive power to the user, and a button for setting the operation mode to a second mode where the wearable device provides resistance power to the user.

According to an example embodiment, synchronization (e.g., real-time interworking) between at least an electronic device and a wearable device may be provided to a user through a visual effect.

An example embodiment may enable a user to easily understand exercise progress and/or a state of a wearable device even when the user does not carefully look at a screen of the electronic device during exercise.

An example embodiment may display visual feedback on a state of a wearable device and text indicating the state of the wearable device on a display, so that a user may easily understand the state of the wearable device and/or exercise progress.

An example embodiment may provide auditory and/or tactile feedback as well as visual feedback with respect to a state to a wearable device, so that a user may easily understand the state of the wearable device and/or exercise progress.

An example embodiment may display feedback with respect to a state of a wearable device on a screen of an electronic device of a third party (e.g., a trainer), so that the third party (e.g., the trainer) may easily understand exercise progress of a user and/or the state of the wearable device.

An example embodiment may enable a user to easily control a wearable device during exercise through a watch-type electronic device.

BRIEF DESCRIPTION OF THE DRAWINGS

The above and other aspects, features, and advantages of predetermined embodiments of the present disclosure will be more apparent from the following detailed description, taken in conjunction with the accompanying drawings, in which.

DETAILED DESCRIPTION

Figure 1A:
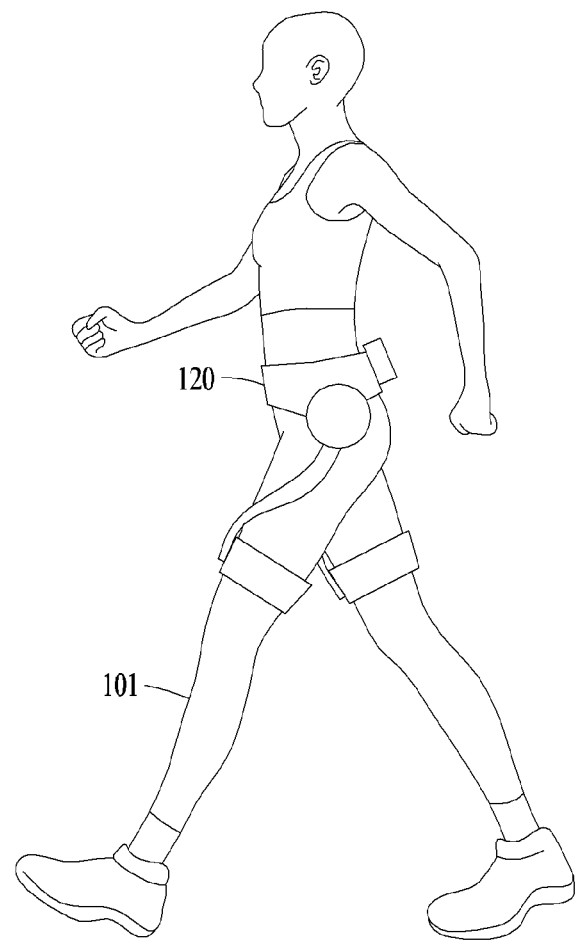
FIG. 1A is a diagram illustrating an overview of a wearable device worn on a user's body, according to an example embodiment.

The following structural or functional descriptions of examples are merely intended for the purpose of describing the examples and the examples may be implemented in various forms. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, at least a third component(s) may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the embodiments with reference to the accompanying drawings, like reference numerals refer to like constituent elements and a repeated description related thereto will be omitted.

FIG. 1A is a diagram illustrating an overview of a wearable device worn on a user's body, according to an embodiment.

Referring to FIG. 1, a wearable device 120 may be a device worn on the body of a user 101 to assist the user 101 in walking, exercising, and/or working. In embodiments, the term "wearable device" may be replaced with a wearable robot, a walking assistance device, or the like. The user 101 may be a human or an animal but is not limited thereto. The wearable device 120 may be worn on the body (e.g., the lower body (legs, ankles, knees, and the like), the upper body (e.g., a torso, an arm, a wrist, and the like), or a waist) of the user 101 and apply an external force, such as an assistive force and/or a resistance force, to a body motion of the user 101. The assistive force may be applied in the same direction as the direction of the body motion of the user 101 and the resistance force may be applied in an opposite direction to the direction of the body motion of the user 101. The term "resistance force" may be also referred to as an "exercise load".

When the wearable device 120 performs a walking assistance function for assisting the walking of the user 101, the wearable device 120 may provide an assistive force to the body of the user 101, thereby partially or entirely supporting the legs of the user 101 to assist the walking of the user 101. The wearable device 120 may enable the user 101 to walk independently or to walk for a long time by providing force required for the user 101 to walk, so that the walking ability of the user 101 may be extended. The wearable device 120 may also improve the walking of a user having a walking habit or an abnormal walking pose.

When the wearable device 120 performs an exercise function for increasing the exercise effect of the user 101, the wearable device 120 may provide a resistance force to the body of the user 101, thereby impeding the body motion of the user 101 or providing resistance to the body motion of the user 101. When the wearable device 120 is, for example, a hip-type wearable device, the wearable device 120 may provide an exercise load to the body motion of the user 101 while being worn on the legs of the user 101, thereby further enhancing the exercise effect. The user 101 may perform a walking motion while wearing the wearable device 120 for exercise. In this case, the wearable device 120 may apply a resistance force to the motion of the legs of the user 101 while the user 101 is walking.

In various embodiments, the wearable device 120 of a hip type that is worn on the waist and legs of the user 101 is described as an example for convenience of explanation but, as described above, the wearable device 120 may be worn on body parts (e.g., an upper arm, a lower arm, a hand, a calf, and a foot) other than the waist and legs (particularly thighs). The shape and configuration of a wearable device may vary depending on a body part where the wearable device is worn.

Figure 1B:
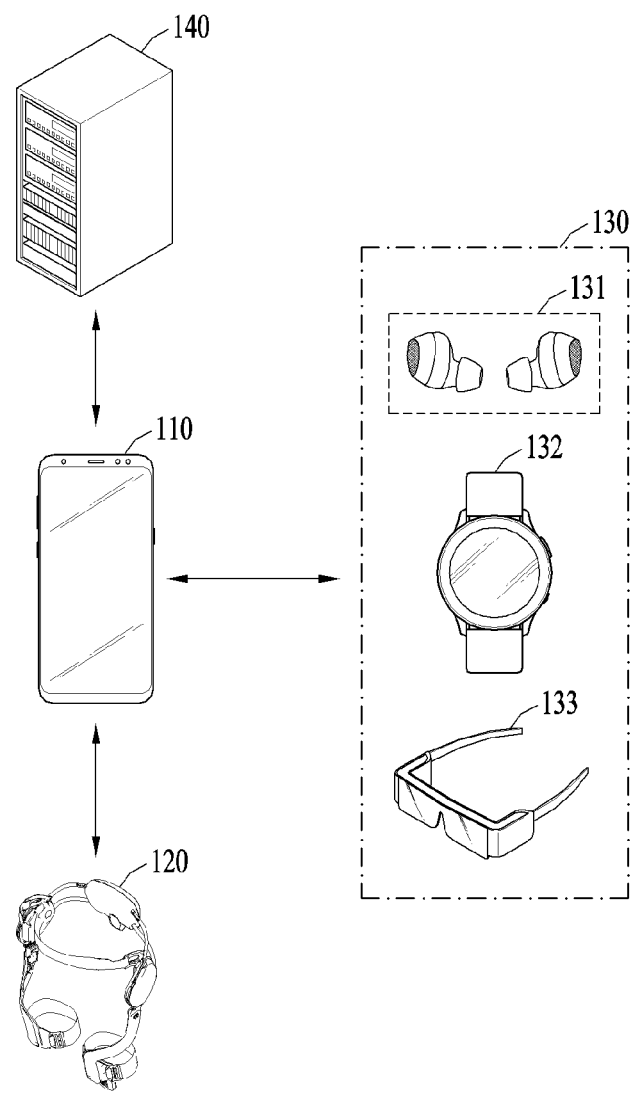
FIG. 1B is a diagram illustrating an example of a system including a wearable device according to an example embodiment.

FIG. 1B is a diagram illustrating an example of a system including a wearable device according to an embodiment.

Referring to FIG. 1B, an electronic device 110 may communicate with the wearable device 120 and remotely control the wearable device 120. The electronic device 110 may be an electronic device in various forms. The electronic device 110 may include, for example, a portable communication device (e.g., a smartphone), a computer device, a portable multimedia device, or a home appliance device but is not limited thereto. The electronic device 110 may be differently expressed as a user terminal.

In an embodiment, the electronic device 110 may communicate with the wearable device 120 to identify a state (e.g., a booting state, a state of charge, a scanning state, a sensing state, an utterance state, or an error state, which are to be described below) of the wearable device 120. The electronic device 110 may transmit, to the wearable device 120, a control signal instructing that feedback corresponding to the identified state be provided to a user. The wearable device 120 may provide (or output) the feedback (e.g., at least one of visual feedback, auditory feedback, and tactile feedback) corresponding to the state of the wearable device 120 according to a control signal. In addition, the electronic device 110 may provide (or output) feedback (e.g., at least one of visual feedback, auditory feedback, and tactile feedback) corresponding to the state of the wearable device 120.

In an embodiment, the wearable device 120 and/or the electronic device 110 may connect to other wearable devices 130. For example, the wearable device 120, the electronic device 110, and the other wearable devices 130 may be connected, directly or indirectly, to one another through wireless communication (e.g., Bluetooth™ communication). The other wearable devices 130 may include, for example, wireless earphones 131, a smart watch 132, or smart glasses 133 but are not limited thereto. The smart watch 132 may be a watch-type wearable device (or watch-type electronic device) and the smart glasses 133 may be a glasses-type wearable device (or glasses-type electronic device).

In an embodiment, the smart watch 132 may obtain the user's biometric information (e.g., heart rate information) and transmit the obtained biometric information to the electronic device 110.

In an embodiment, the smart watch 132 may control the wearable device 120. The smart watch 132 may control the wearable device 120 through the electronic device 110 when the smart watch 132 is connected, directly or indirectly, to the electronic device 110 through a wireless communication link and the electronic device 110 is connected to the wearable device 120 through a wireless communication link. Without being limited thereto, the smart watch 132 may directly connect to the wearable device 120 and may control the wearable device 120.

In an embodiment, the electronic device 110 may transmit, to the other wearable devices 130, a control signal instructing that feedback corresponding to a state of the wearable device 120 be provided to the user 101. In an embodiment, the other wearable devices 130 may provide (or output) feedback (e.g., at least one of visual feedback, auditory feedback, and tactile feedback) corresponding to the state of the wearable device 120 according to the received control signal.

In an embodiment, the electronic device 110 may be connected, directly or indirectly, to a server 140 by using short-range wireless communication (e.g., Wi-Fi) or mobile communication (e.g., 4th generation (4G) mobile communication systems, 5G, and the like).

In an embodiment, the electronic device 110 may receive profile information of the user 101 from the user 101. The profile information may include, for example, at least one of a name, age, gender, height, weight, and body mass index (BMI). The electronic device 110 may transmit the profile information of the user 101 to the server 140.

The electronic device 110 and/or the wearable device 120 may request the user 101 to perform one or more target motions so as to determine (or check) the motion ability of the user 101. The one or more target motions may include, for example, lifting a knee, extending a leg backward, and the like. Lifting the knee may be a pose starting from the user 101 uprightly standing with their feet on the ground and returning to the standing pose after the user 101 maximally extends their leg backward without bending their waist. Extending the leg backward may be a pose starting from the user 101 uprightly standing with their hands against a wall and returning to the standing pose after maximally extending their leg backward without bending their waist.

The wearable device 120 may obtain motion information of the user 101 who performs a target motion by using a sensor (e.g., an Inertial Measurement Unit (IMU)) and transmit the obtained motion information to the electronic device 110. The electronic device 110 may transmit the obtained motion information to the server 140.

The server 140 may determine a target amount of exercise for each exercise type (e.g., a muscle exercise, a balance exercise, and a cardio exercise) of the user 101 through the profile information and the motion information received from the electronic device 110. The server 140 may transmit the target amount of exercise for each exercise type to the electronic device 110. As described below, the electronic device 110 may execute a fitness application and display an execution screen including the target amount of exercise for each exercise type on a display.

For example, the server 140 may include a database storing information about a plurality of exercise programs that may be provided to the user 101 through the wearable device 120. For example, the server 140 may manage a user account of the user 101 of the electronic device 110 or the wearable device 120. The server 140 may store and manage an exercise program performed by the user 101 and a result of the exercise program in association with the user account.

In an embodiment, the electronic device 110 and/or the server 140 may provide the user 101 with various exercise programs to achieve an exercise target in various exercise environments desired by the user 101. The exercise target may include, for example, at least one of muscle strength improvement, physical strength improvement, cardiorespiratory endurance improvement, core stability improvement, flexibility improvement, and symmetry improvement, or a combination thereof.

In an embodiment, the electronic device 110 and/or the server 140 may recommend an exercise program to the user 101 in order to achieve the exercise target of the user 101. Each exercise program may include one or more exercise modes. For example, each exercise mode may be for a body motion to achieve a specific exercise target. For example, running may be an exercise mode for improving the cardiorespiratory endurance of the user 101. For example, a lunge may be an exercise mode for improving the core stability of the user 101. Combinations of a plurality of exercise modes in each exercise program may variously appear according to an exercise target of the user 101. The electronic device 110 may provide the user 101 with various exercise programs according to a combination of the plurality of exercise modes even for the same exercise target.

According to an embodiment, the plurality of exercise programs may be converted into a database and stored in the electronic device 110 or in the server 140. The electronic device 110 or the server 140 may generate the plurality of exercise programs based on various sets of information about the user 101 and recommend, to the user 101, a target exercise program among the plurality of exercise programs, considering an exercise target of the user 101 or an exercise performance state of the user 101. For example, the electronic device 110 or the server 140 may determine a target exercise program to recommend to the user 101 based on at least one of an exercise target, exercise history, and an exercise performance result of the user 101. Accordingly, the user 101 may be recommended a new exercise program even when the user 101 exercises for the same exercise target and the user 101 may perform the new exercise program, feeling as if the user 101 is performing a different exercise from an existing one.

Figure 2A:
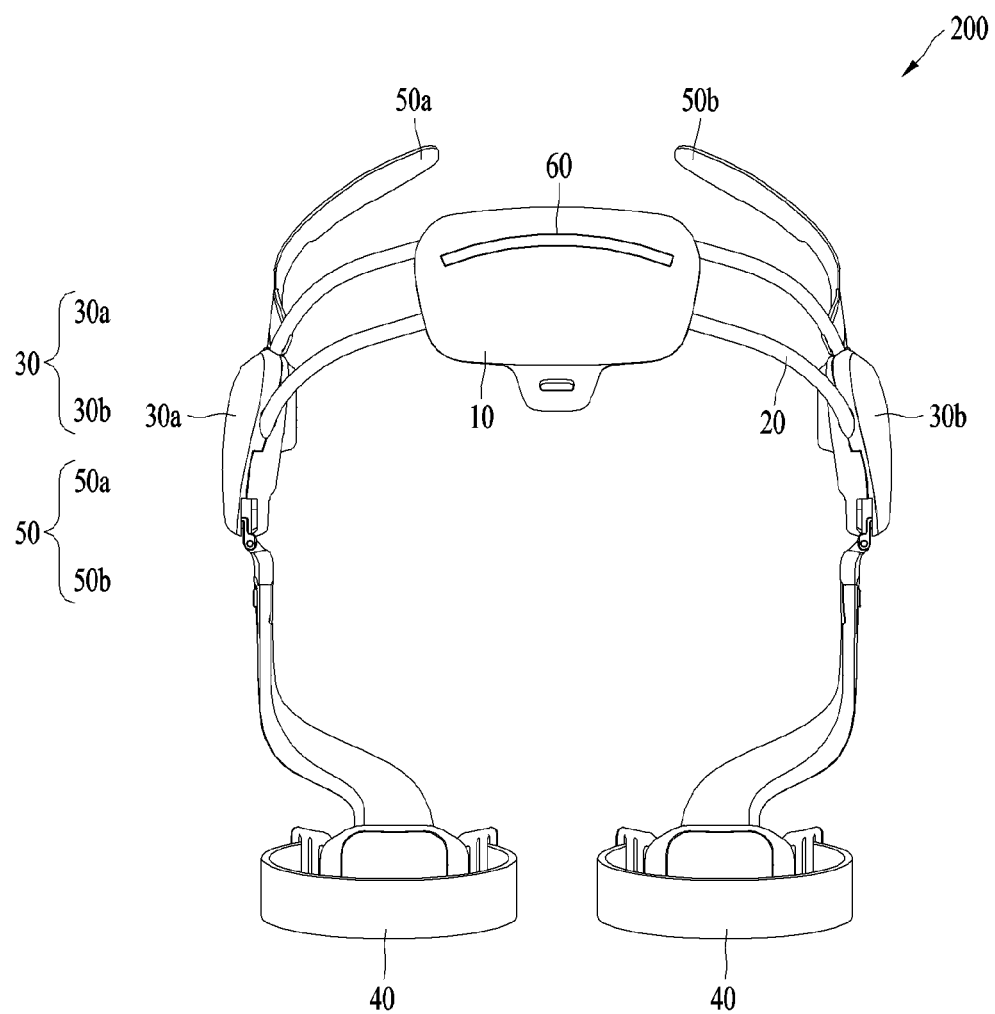
FIG. 2A is a rear schematic diagram illustrating a wearable device according to an example embodiment.
Figure 2B:
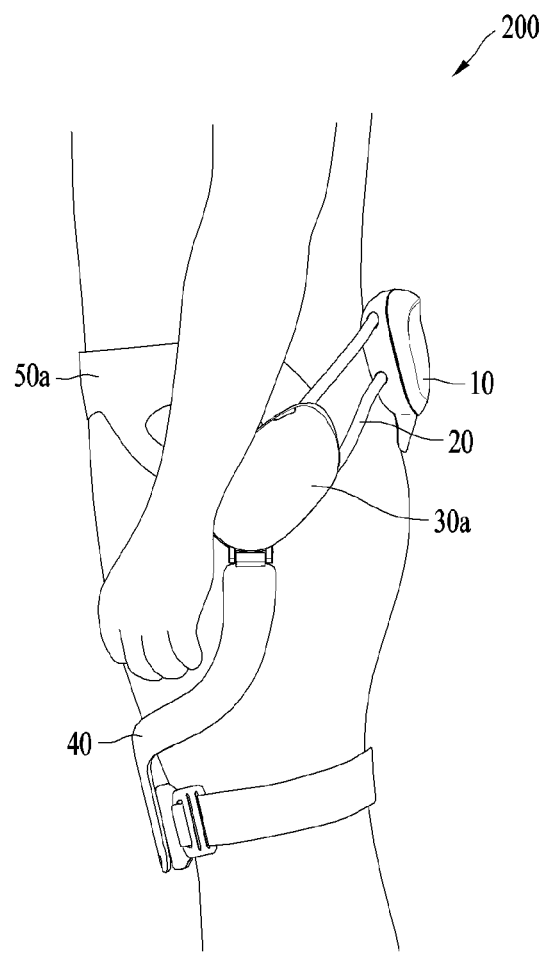
FIG. 2B is a left side view illustrating the wearable device according to an example embodiment.

FIG. 2A is a rear schematic diagram illustrating a wearable device according to an embodiment. FIG. 2B is a left side view illustrating the wearable device according to an embodiment.

Referring to FIG. 2A, a wearable device 200 (e.g., the wearable device 120) according to an embodiment may include a base body 10, a base frame 20, driving modules 30a and 30b, and a pair of arms 40, and a main belt 50.

The base body 10 may be on the lumbar (or the waist) of a user when the user wears the wearable device 200. The base body 10 worn on the user's lumbar may cushion the user's waist to support the user's waist. The base body 10 may be above the user's hip when the user wears the wearable device 200 such that the wearable device 200 may not be deviated downward by gravity. The base body 10 may disperse some of the weight of the wearable device 200 to the waist of the user wearing the wearable device 200. The base body 10 may connect to the base frame 20. Base frame connection elements (not shown) which may connect to the base frame 20 may be at both ends of the base body 10.

The base body 10 may include a lighting unit 60. The lighting unit 60 may include a plurality of light sources (e.g., light-emitting diodes (LEDs)). The lighting unit 60 may emit light according to control of a processor (not shown) (e.g., a processor 310 of FIGS. 3A and 3B). According to an embodiment, the processor may control the lighting unit 60 to provide (or output) visual feedback corresponding to a state of the wearable device 200 to the user through the lighting unit 60.

The base frame 20 may extend from both ends of the base body 10. The user's lumbar may be accommodated inside the base frame 20. The base frame 20 may include at least one rigid body beams. Each rigid body beam may have a curved shape having a preset curvature to surround the user's lumbar. The main belt 50 may connect to an end of the base frame 20. The driving module 30 may be mounted on the base frame 20. The base frame 20 may include a connector (not shown) for equipping the driving module 30.

Figure 3A:
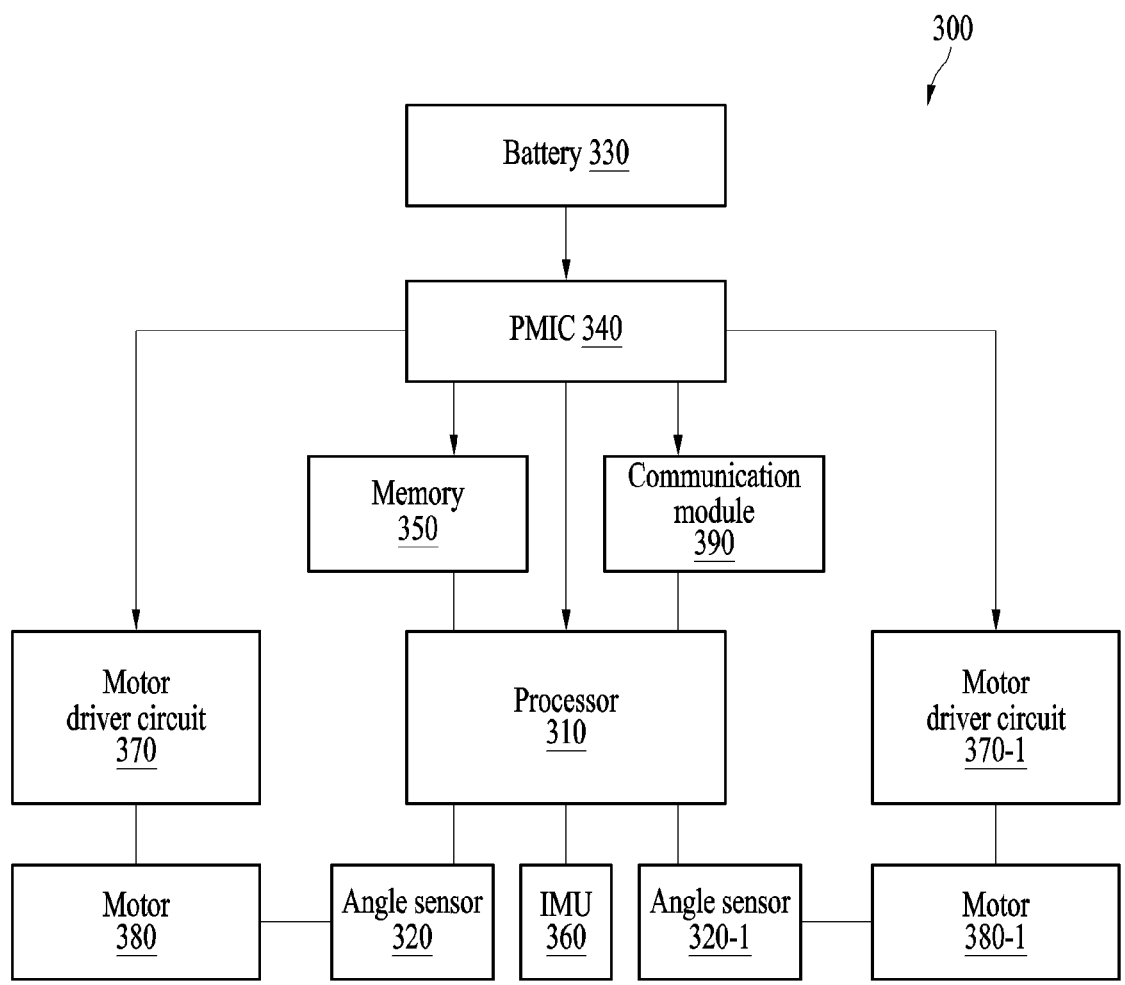
FIGS. 3A and 3B illustrate examples of a configuration of a wearable device according to an example embodiment(s)
Figure 3B:
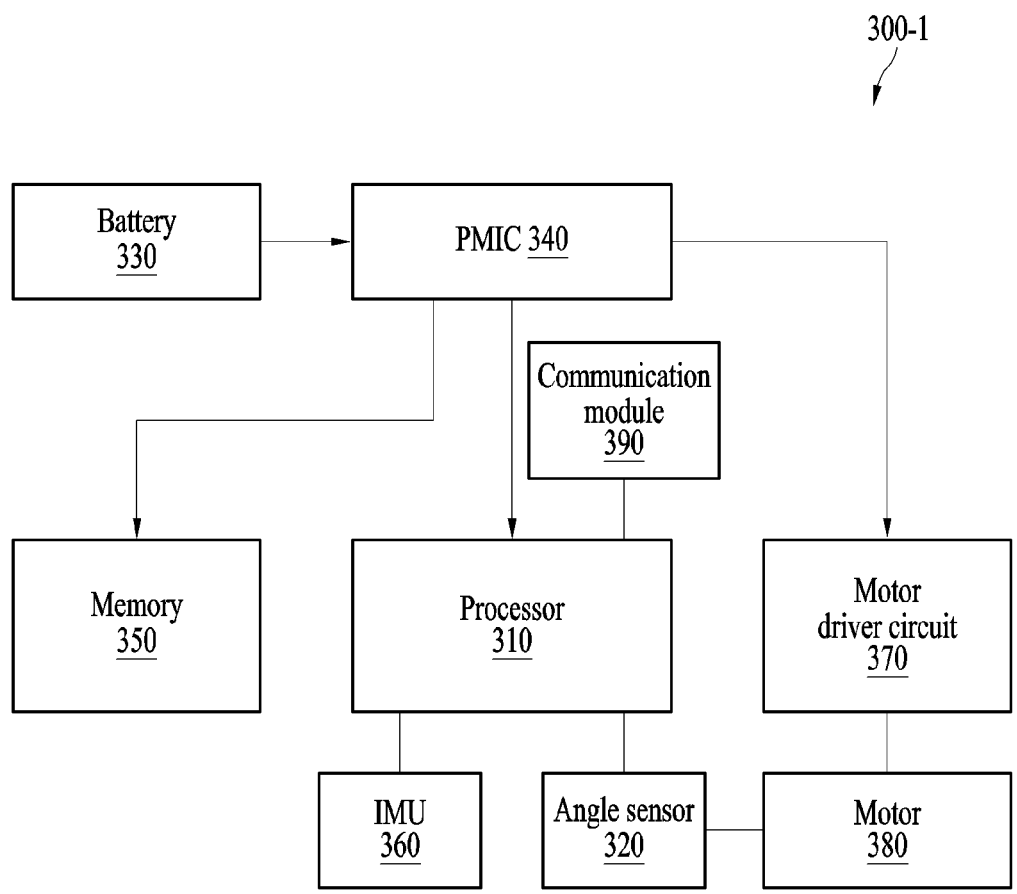

The driving module 30 may include the first driving module 30a that is on the user's left side when the user wears the wearable device 200 and the second driving module 30b that is on the user's right side when the user wears the wearable device 200. Each driving module herein may comprise a motor and/or circuitry, for example as shown in FIGS. 3A-3B.

The first driving module 30a may include a first actuator (not shown) and a first joint member (not shown) and the second driving module 30b may include a second actuator (not shown) and a second joint member (not shown). The first actuator may provide power to be transmitted to the first joint member and the second actuator may provide power to be transmitted to the second joint member. Each of the first actuator and the second actuator may include a motor generating power after receiving power from a battery (e.g., a battery 330 of FIGS. 3A and 3B). When driven by received power, the motor may provide an assistive force for assisting the user's body motion or a resistance force to impede the user's body motion.

The first joint member may be rotated by the power received from the first actuator. A first encoder for measuring a rotation angle of the first joint member may be on one side of the first joint member. The second joint member may be rotated by the power received from the second actuator. A second encoder for measuring a rotation angle of the second joint member may be on one side of the second joint member.

The driving module 30 may be mounted on and fixed to the base frame 20. The driving module 30 may transmit power to the pair of arms 40. The driving module 30 may be on the side of the user's thigh, the side of the user's lumbar, or therebetween while the user is wearing the wearable device 200.

The pair of arms 40 may be worn on both the user's legs. The pair of arms 40 may receive power from the driving module 30 and press the user's legs in a direction of assisting the motion of the user's thighs, knees, and calves. The pair of arms 40 may include a support unit for surrounding the user's legs and a connection frame for connecting the support unit to the driving module 30.

The main belt 50 may connect to the base frame 20. The main belt 50 may include a first main belt 50a that may wrap around the user's left abdomen when the user wears the wearable device 200 and a second main belt 50b that may wrap around the user's right abdomen when the user wears the wearable device 200. The first main belt 50a may be formed in a shape having a longer length than the second main belt 50b but is not limited thereto. The first main belt 50a may have the same length as the second main belt 50b or a shorter length than the second main belt 50b. The first main belt 50a and the second main belt 50b may, respectively, connect to both ends of the base frame 20. When the main belt 50 is inserted in a direction in which the user's body is accommodated in the wearable device 200, the main belt 50 may be bent in a direction surrounding the user's abdomen. The first main belt 50a may connect to the second main belt 50b when the user wears the wearable device 200. The main belt 50 may disperse some of the weight of the wearable device 200 to the user's abdomen when the user wears the wearable device 200.

Referring to FIG. 2B, the base body 10 may be mounted on the back of the user's lumbar and may support some of the weight of the wearable device 200 by hanging on the user's buttocks. The first driving module 30a may be on the user's left lumbar. The base frame 20 may be inclined in a direction extending from an end of the base body 10 toward the first driving module 30a. The first main belt 50a mounted on the base frame 20 may be wrapped around the user's left abdomen. The arms 40 may be mounted on the user's legs and receive power from the first driving module 30a.

FIGS. 3A and 3B illustrate examples of a configuration of a wearable device according to an embodiment.

According to an embodiment, a wearable device 300 (e.g., the wearable device 120 and the wearable device 200) may include a processor 310, angle sensors 320 and 320-1, a battery 330, and a Power Management Integrated Circuit (PMIC) 340, a memory 350, an IMU 360, motor driver circuits 370 and 370-1, motors 380 and 380-1, and a communication module 390 comprising communication circuitry.

Although the angle sensors 320 and 320-1, the motor driver circuits 370 and 370-1, and the motors 380 and 380-1 are illustrated in plurality in FIG. 3A, they are only examples. A wearable device 300-1 shown in FIG. 3B may include one sensor 320, one motor driver circuit 370, and one motor 380. In addition, according to implementation, the wearable devices 300 and 300-1 may include a plurality of processors. The number of motor driver circuits, the number of motors, or the number of processors may vary depending on a body part on which the wearable devices 300 and 300-1 are worn.

The angle sensor 320, the motor driver circuit 370, and the motor 380 may be included in the first driving module 30a of FIG. 2A. The angle sensor 320-1 and the motor driver circuit 370-1, and the motor 380-1 may be included in the second driving module 30b of FIG. 2A.

The angle sensor 320 may measure or sense an angle of a first joint (e.g., the left hip joint) of the user. The angle sensor 320 may transmit, to the processor 310, first angle information obtained by measuring the angle of the first joint. For example, the angle sensor 320 may measure the angle of the user's left hip joint and transmit angle information obtained by measuring the angle of the left hip joint to the processor 310.

The angle sensor 320-1 may measure the angle of a second joint (e.g., the right hip joint) of the user and transmit second angle information obtained by measuring the angle of the second joint to the processor 310.

Depending on positions of the angle sensor 320 and the angle sensor 320-1, the angle sensor 320 and the angle sensor 320-1 may additionally measure a knee angle and ankle angle of the user.

The angle sensor 320 and the angle sensor 320-1 may be, for example, the first encoder and the second encoder, respectively, described with reference to FIG. 2A.

According to embodiments, the wearable devices 300 and 300-1 may include a potentiometer. The potentiometer may sense an R-axis joint angle, an L-axis joint angle, an R-axis joint angular velocity, and an L-axis angular velocity based on a walking motion of the user. In this example, the R and L axes may be reference axes for the right leg and the left leg of the user, respectively. For example, the R and L axes may be set to be vertical to the ground and set such that the front side of the body of a person has a negative value and the rear side of the body has a positive value.

The PMIC 340 may charge the battery 330 by using power supplied from an external power source. For example, the external power source and the wearable devices 300 and 300-1 may be connected, directly or indirectly, to one another through a cable (e.g., a universal serial bus (USB) cable or the like). The PMIC 340 may receive power from the external power source through the cable and may charge the battery 330 using the received power. According to an embodiment, the PMIC 340 may charge the battery 330 through a wireless charging method.

The PMIC 340 may transfer power stored in the battery 330 to components in the wearable devices 300 and 300-1. The PMIC 340 may, for example, adjust power stored in the battery 330 to a voltage level or a current level suitable for components (e.g., the processor 310, the angle sensors 320 and 320-1, the memory 350, the IMU 360, the motors 380 and 380-1, and the like) in the wearable device 300. The PMIC 340 may include, for example, a converter (e.g., a direct current (DC)-DC converter) or a regulator (e.g., a low dropout (LDO) regulator or a switching regulator) capable of performing the adjustment described above.

The PMIC 340 may determine state information of the battery 330 (e.g., a state of charge, a state of health, overvoltage, low voltage, overcurrent, overcharge, over discharge, overheating, a short circuit, or swelling) and transmit the state information of the battery 330 to the processor 310. The processor 310 may provide the state information of the battery 330 to the user through an output module to be described below.

The IMU 360 may acquire or measure acceleration information (or pose information) of the user. For example, the IMU 360 may measure or acquire three-axis (e.g., an X-axis, a Y-axis, and a Z-axis) acceleration and a rotation angle (e.g., roll, pitch, and yaw) according to the user's walking motion. The IMU 330 may transmit the acquired acceleration information (e.g., the measured three-axis acceleration and rotation angle) to the processor 310.

The processor 310 may control the overall operation of the wearable devices 300 and 300-1.

The processor 310 may, for example, execute software (or programs or instructions) stored in the memory 350 to control components (e.g., the motor driver circuits 370 and 370-1) in the wearable devices 300 and 300-1 and may variously perform data processing or calculations. As at least apart of data processing or calculations, the processor 310 may store, in the memory 350, data received from other components (e.g., the IMU 360, the angle sensors 320 and 320-1, or the like) and process instructions or data stored in the memory 350.

The processor 310 may determine control information for generating torque of each of the motors 380 and 380-1 and may control the motor driver circuits 370 and 370-1 based on the determined control information. For example, the processor 310 may determine a state factor y(t) that represents a state of the user's motion according to an equation $y(t)=\sin(q\_r(t))-\sin(q\_l(t))$. $q\_l(t)$ may denote first angle information and $q\_r(t)$ may denote second angle information. The processor 310 may determine control information $\tau(t)$ according to the equation $\tau(t)=\kappa y(t-\Delta t)$. A gain $\kappa$ may be a parameter indicating a magnitude and direction of an output torque. The greater the value of the gain K, the greater the torque to be output. When the gain $\kappa$ is a negative value, torque acting as a resistance force may be output to the user. When the gain $\kappa$ is a positive value, torque acting as an assistive force may be output to the user. Delay $\Delta t$ may be a parameter associated with output timing of torque. The value of the gain $\kappa$ and the value of the delay $\Delta t$ may be preset and may be adjusted by the user, the wearable device 300, or the electronic device 110 paired with the wearable device 300. The processor 310 may determine control information $\tau_r(t)$ for generating torque in the motor 380-1 according to the equation $\tau_r(t)=\tau(t)$ and determine control information $\tau_l(t)$ for generating torque in the motor 380 according to the equation $\tau_l(t)=-\tau(t$.

The motor driver circuits 370 and 370-1 may control the motors 380 and 380-1, respectively, based on the control information received from the processor 310. By the controlling, the motors 380 and 380-1 may each generate torque.

The communication module 390, comprising communication circuitry, may support the establishment of a direct (e.g., wired) communication channel or a wireless communication channel between the wearable electronic devices 300 and 300-1 and an external electronic device and may support the communication performance through the established communication channel. The communication module 390 may include one or more communication processors configured to support direct (e.g., wired) communication or wireless communication. According to an embodiment, the communication module 390 may include a wireless communication module (e.g., a cellular communication module, a short-range wireless communication module, or a global navigation satellite system (GNSS) communication module) or a wired communication module (e.g., a local area network (LAN) communication module or a power line communication module). A corresponding one of these communication modules may communicate with the external electronic device via a first network (e.g., a short-range communication network, such as Bluetooth™, Wi-Fi direct, or IrDA) or a second network (e.g., a legacy cellular network, a 5G network, a next-generation communication network, the Internet, or a computer network). These various types of communication modules may be implemented as a single component (e.g., a single chip) or may be implemented as components (e.g., chips) separate from each other.

In an embodiment, the wearable devices 300 and 300-1 may each include a display module. The display module may include, for example, a display and/or a lighting unit (e.g., the lighting unit 60 of FIG. 2A). The processor 310 may control the display module to provide visual feedback to the user.

In an embodiment, the wearable devices 300 and 300-1 may include a sound output module. The sound output module may include, for example, a speaker. The processor 310 may control the sound output module to provide auditory feedback to the user.

In an embodiment, the wearable devices 300 and 300-1 may include a vibration output module. The vibration output module may include, for example, a vibration motor. The processor 310 may control the vibration output module to provide tactile feedback (or haptic feedback) to the user.

In an embodiment, the base body 10 of FIGS. 2A and 2B may include at least one of the processor 310, the battery 330, the PMIC 340, the memory 350, the IMU 360, the communication module 390, the display module, the sound output module, and the vibration output module, or a combination thereof.

Figure 4:
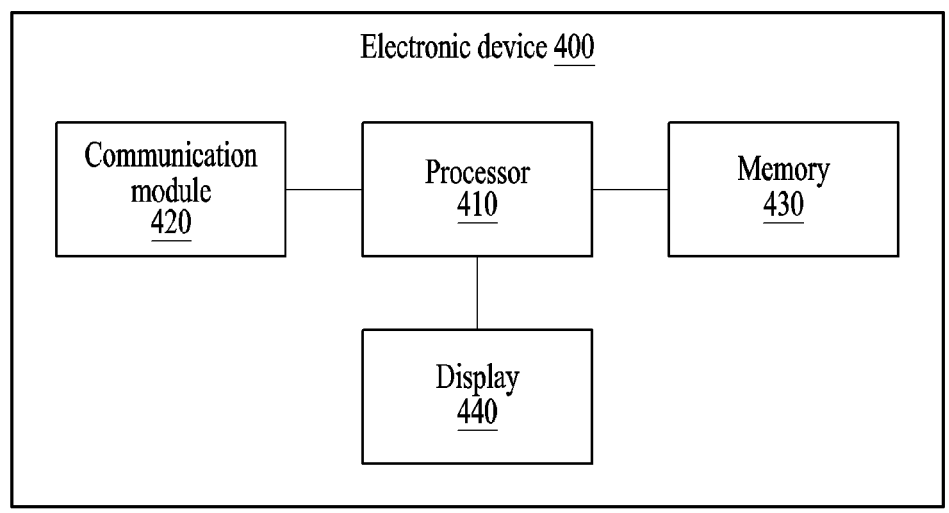
FIG. 4 is a block diagram illustrating an example of a configuration of an electronic device according to an example embodiment.

FIG. 4 is a block diagram illustrating an example of a configuration of an electronic device according to an embodiment.

Referring to FIG. 4, according to an embodiment, an electronic device 400 (e.g., the electronic device 110 of FIG. 1B) may include a processor 410, a communication module 420, a memory 430, and a display 440.

The communication module 420 may establish a wireless communication link with a wearable device (e.g., the wearable device 300 or the like). The wireless communication link may include, for example, a Bluetooth link or a Bluetooth Low Energy (BLE) link but is not limited thereto.

The memory 430 may store a fitness application. The fitness application, for example, may recommend an exercise program to a user, provide a target amount of exercise to the user, and manage a result of the user's exercise performance when the user performs an exercise with the wearable device 300 worn on the user's body.

The processor 410 may execute the fitness application and control the display 440 to display a screen of the executed fitness application on the display 440. As described in detail with reference to FIG. 5, the screen of the executed fitness application may include a first area. The processor 410 may control the display 440 to provide visual feedback corresponding to a state of the wearable device 300 to the user through the first area.

In an embodiment, the processor 410 may receive state information indicating that the wearable device 300 is in a booting state from the wearable device 300 through the communication module 420. The processor 410 may recognize (or determine) a state of the wearable device 300 as the booting state according to the state information indicating the booting state. The processor 410 may control the display 440 to provide visual feedback corresponding to the booting state of the wearable device 300 through the first area of the execution screen of the fitness application. For example, for the visual feedback corresponding to the booting state of the wearable device 300, the processor 410 may control the display 440 to display a first color on a user interface (UI) (e.g., a first object 612 of FIG. 6A to be described below or a second object 622 of FIG. 6B to be described below) of the first area. The processor 410 may also control the display 440 to change the first color of the UI to a second color. The first color may be, for example, one of shades of white or white but is not limited thereto. The second color may be, for example, one of shades of blue or blue but is not limited thereto.

In an embodiment, the processor 410 may receive state information indicating that the wearable device 300 is in a state of charge from the wearable device 300 through the communication module 420. The processor 410 may recognize (or determine) a state of the wearable device 300 as the state of the charge according to the state information indicating the state of the charge. The processor 410 may control the display 440 to provide visual feedback corresponding to the state of charge of the wearable device 300 through the first area of the execution screen of the fitness application. For example, for the visual feedback corresponding to the state of charge of the wearable device 300, the processor 410 may determine an area where the first color is represented on the UI (e.g., the first object 612 of FIG. 6A to be described below or the second object 622 of FIG. 6B to be described below) of the first area by using a charging rate of the wearable device 300. The processor 410 may also control the display 440 to move the area where the first color is represented on the UI according to an increase in the charging rate of the wearable device 300.

In an embodiment, the processor 410 may transmit, to the wearable device 300 through the communication module 420, a control signal instructing the wearable device 300 to perform scanning. The scanning may indicate an operation in which the wearable device 300 determines whether the user is ready to start an exercise. The processor 410 may receive, through the communication module 420, state information indicating that the wearable device 300 is in a scanning state for performing scanning. The processor 410 may recognize (or determine) a state of the wearable device 300 as the scanning state according to state information indicating that the wearable device 300 is in the scanning state. The processor 410 may control the display 440 to provide visual feedback corresponding to the scanning state through the first area of the execution screen of the fitness application. For example, for the visual feedback corresponding to the scanning state, the processor 410 may control the display 440 to move an area where the second color is represented on the UI (e.g., the first object 612 of FIG. 6A to be described below or the second object 622 of FIG. 6B to be described below) of the first area.

In an embodiment, through the communication module 420, the processor 410 may receive state information indicating that the wearable device 300 is in a sensing state for sensing the user's motion (e.g., an exercise motion). The processor 410 may recognize (or determine) a state of the wearable device 300 as the sensing state according to the state information indicating that the wearable device 300 is in the sensing state. The processor 410 may control the display 440 to provide visual feedback corresponding to the sensing state of the wearable device 300 through the first area of the execution screen of the fitness application. For example, for the visual feedback corresponding to the sensing state, the processor 410 may control the display 440 to sequentially represent each of colors on the UI (e.g., the first object 612 of FIG. 6A to be described below or the second object 622 of FIG. 6B to be described below) of the first area.

In an embodiment, through the communication module 420, the processor 410 may receive, from the wearable device 300, an evaluation result of an exercise pose and state information indicating that the wearable device 300 is in an utterance state in which the wearable device 300 outputs the evaluation result of the user's exercise pose in an utterance voice. The processor 410 may recognize (or determine) a state of the wearable device 300 as the utterance state according to the state information indicating that the wearable device 300 is in the utterance state. The processor 410 may control the display 440 to provide visual feedback corresponding to the utterance state of the wearable device 300 through the first area of the execution screen of the fitness application. For example, for the visual feedback corresponding to the utterance state, the processor 410 may control the display 440 to repeatedly extend and reduce the area where the second color is represented on the UI (e.g., the first object 612 of FIG. 6A to be described below or the second object 622 of FIG. 6B to be described below) of the first area. A visual effect as if the electronic device 400 is speaking may be provided to the user.

According to implementation, when the electronic device 400 establishes a wireless communication link with wireless earphones (e.g., the wireless earphones 131 of FIG. 1B) through the communication module 420, the processor 410 may control the wearable device 300 not to output an utterance voice. The processor 410 may generate an utterance voice based on the received evaluation information and transmit the generated utterance voice to the wireless earphones so that the generated utterance voice may be output through the wireless earphones. The user may listen to the utterance voice of the evaluation result of the exercise pose through the wireless earphones.

In an embodiment, the processor 410 may receive a request of the wearable device 300 for wireless communication connection through the communication module 420. In this case, the processor 410 may control the display 440 to provide visual feedback indicating that the electronic device 400 is connecting to the wearable device 300, through the first area of the execution screen of the fitness application. For example, for the visual feedback indicating that the connection is in progress, the processor 410 may control the display 440 to periodically change the predetermined size of the area where the second color is represented on the UI (e.g., the first object 612 of FIG. 6A to be described below or the second object 622 of FIG. 6B to be described below) of the first area. A visual effect, such as flickering of the second color light, may be provided to the user. The user may easily recognize that the electronic device 400 is connecting to the wearable device 300. When the connection between the electronic device 400 and the wearable device 300 is completed, the processor 410 may not provide the visual feedback indicating that the connection is in progress.

In an embodiment, through the communication module 420, the processor 410 may receive, from the wearable device 300, state information indicating an error situation occurs in the wearable device 300. The error situation may include, for example, an error where an error occurs in the wearable device 300, an error where the user wears the wearable device 300 incorrectly, an error where the user falls, and the like. The processor 410 may recognize (or determine) a state of the wearable device 300 as the error state according to the state information indicating that an error situation occurs. The processor 410 may control the display 440 to provide visual feedback corresponding to the error state of the wearable device 300 through the first area of the execution screen of the fitness application. For example, for the visual feedback corresponding to the error state, the processor 410 may control the display 440 to periodically change the density of the first color on the UI (e.g., the first object 612 of FIG. 6A to be described below or the second object 622 of FIG. 6B to be described below) of the first area. A visual effect, such as flickering of the first color light, may be provided to the user. The user may easily recognize that an error occurs in the wearable device 300.

In an embodiment, the processor 410 may receive motion information obtained by sensing the user's motion, from the wearable device 300 through the communication module 420. The processor 410 may transmit the motion information, the user's position information, the user's biometric information (e.g., heart rate information, and the like), and information about the amount of the user's exercise to a server (e.g., the server 140 of FIG. 1B) through the communication module 420. The server may determine guide information about the user's exercise based on the motion information, position information, biometric information and information about the amount of exercise, which are all received, and environment information (e.g., the weather, topography, and the like) of the area where the user is. The server may transmit the determined guide information to the electronic device 400. The processor 410 may control the display 440 to provide the received guide information through the first area of the execution screen of the fitness application.

FIGS. 5 to 7B are diagrams illustrating examples of execution screens of a fitness application of an electronic device according to an embodiment.

Figure 5:
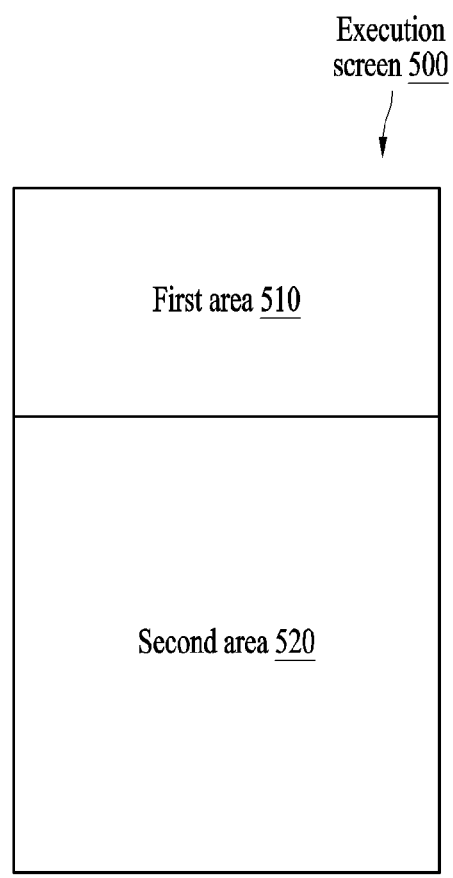
FIGS. 5 to 7B are diagrams illustrating examples of execution screens of a fitness application of an electronic device according to an example embodiment(s)

Referring to FIG. 5, an execution screen 500 of a fitness application may include a first area 510 and a second area 520.

Visual feedback corresponding to a state of the wearable device 300 may be displayed on the first area 510 and text may be displayed thereon. In most execution screens of the fitness application, the first area 510 may be a fixed area and in some execution screens (e.g., a setting screen) of the fitness application, the first area 510 may not be provided.

According to an embodiment, an analysis result (e.g., an evaluation result of an exercise pose) of Artificial Intelligence (AI) of the electronic device 400 may be displayed on the first area 510 as text, so that the first area 510 may be expressed as an AI area.

In the second area 520, a target amount of exercise and/or a recommended exercise for each of exercise types (e.g., a muscle exercise, a balance exercise, and a cardio exercise) may be displayed. According to an embodiment, a guide image for an exercise being performed by the user may be displayed on the second area 520.

Figure 6A:
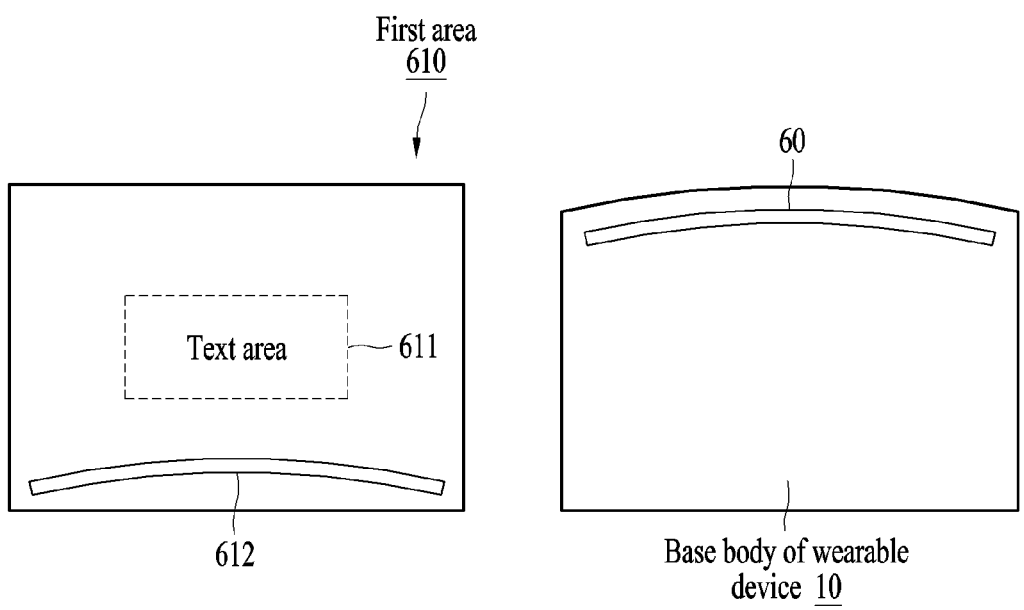
Figure 6B:
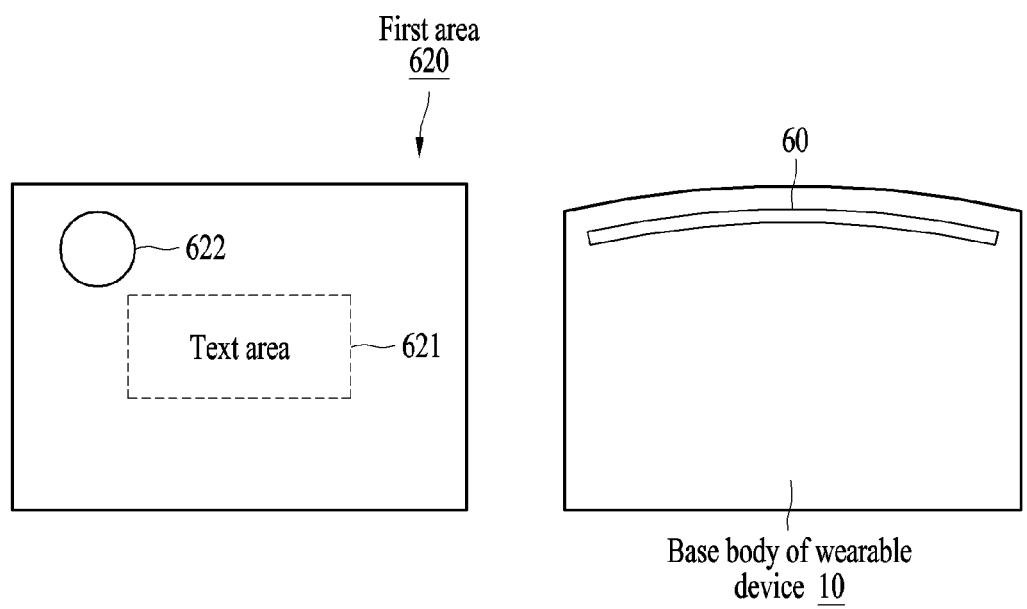

Examples of the first area 510 are shown in FIGS. 6A and 6B.

In the example shown in FIG. 6A, a first area 610 may include a text area 611 and a first object 612. The processor 410 may display text on the text area 611. The processor 410 may provide visual feedback corresponding to a state of the wearable device 300 to the user through the first object 612. Correspondingly, the lighting unit 60 of the base body 10 of the wearable device 300 may provide visual feedback corresponding to a state of the wearable device 300 to the user. The visual feedback provided through the first object 612 may be synchronized with the visual feedback provided through the lighting unit 60. The shape of the first object 612 may correspond to the shape of the lighting unit 60.

In the example shown in FIG. 6B, a first area 620 may include a text area 621 and a second object 622. The second object 622 may have a circular shape and may be at the top left of the text area 621. The shape and position of the second object 622 are not limited to those shown in FIG. 6B. The processor 410 may display text on the text area 621. The processor 410 may provide visual feedback corresponding to a state of the wearable device 300 to the user through the second object 622. Correspondingly, the lighting unit 60 of the base body 10 of the wearable device 300 may provide visual feedback corresponding to a state of the wearable device 300 to the user. The visual feedback provided through the second object 622 may be synchronized with the visual feedback provided through the lighting unit 60.

In an embodiment, the electronic device 400 may connect to the smart watch 132 through a wireless communication link. The smart watch 132 may execute the fitness application and display, on its display, the same screen as the first area 510 (e.g., the first area 610 of FIG. 6A or the first area 620 of FIG. 6B).

Figure 7A:
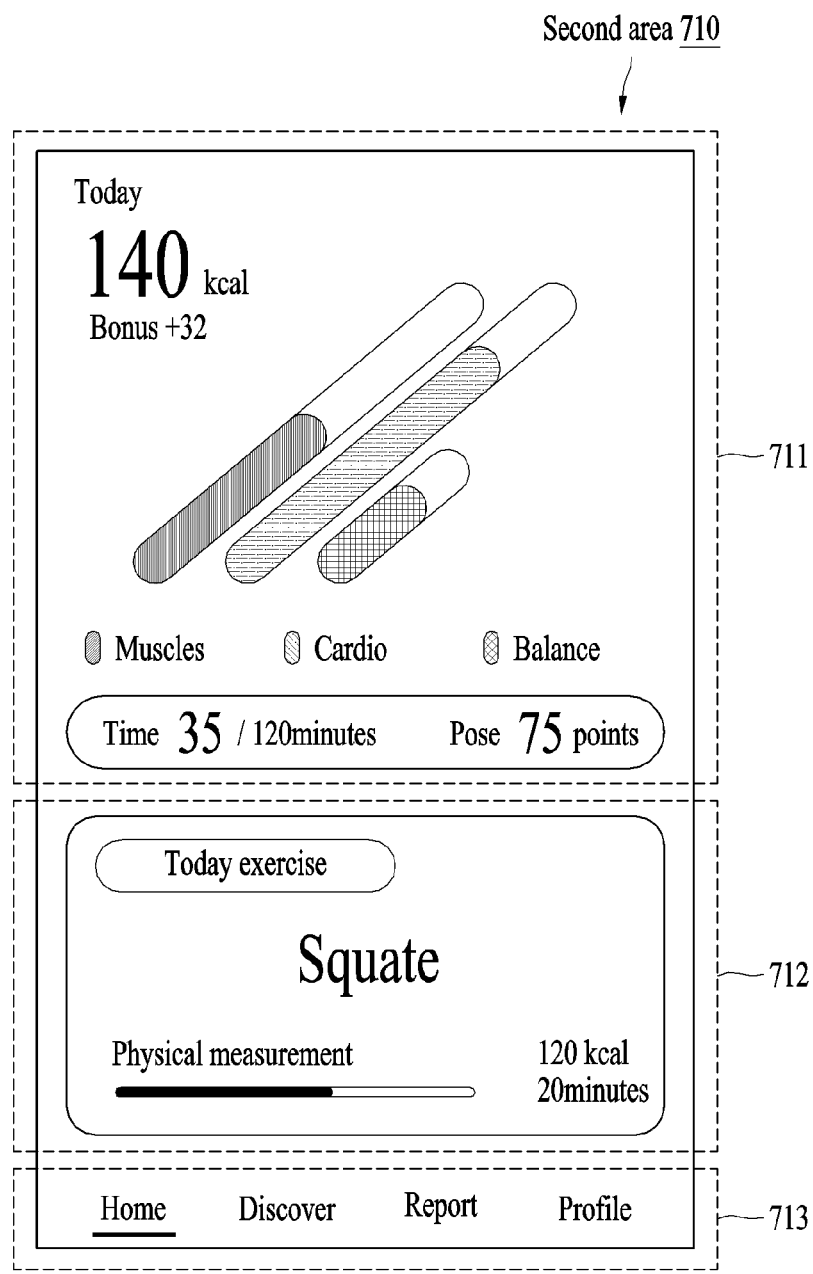
Figure 7B:
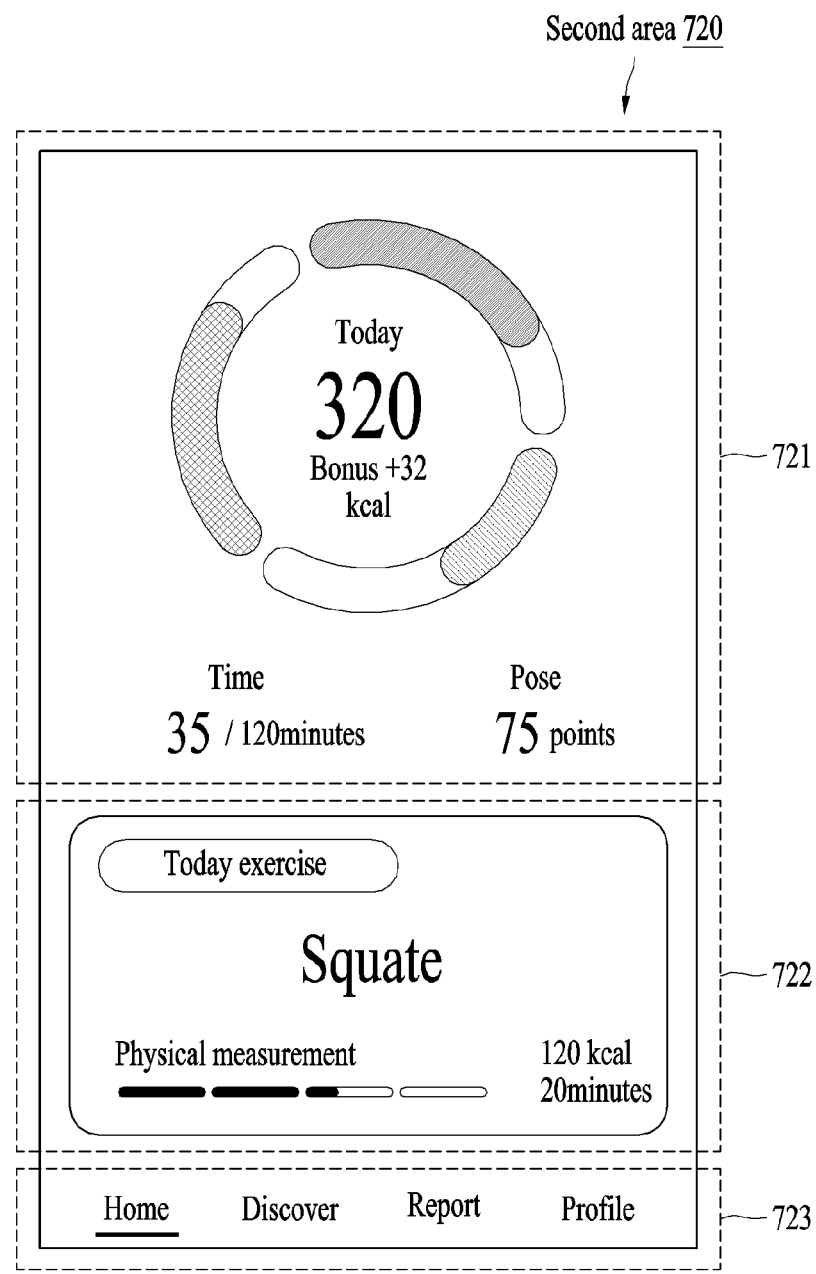

Examples of the second area 520 are shown in FIGS. 7A and 7B.

In the example shown in FIG. 7A, a second area 710 may include subareas 711, 712, and 713.

At least one of objects of a first shape (e.g., a bar shape) for providing a target amount of exercise for each of exercise types, an exercise time of the user, an exercise pose score of the user, and calories consumed by the user during exercise, or a combination thereof may be displayed on the first subarea 711.

In the first subarea 711, the objects of the first shape may be in a diagonal direction but are not limited thereto.

A recommended exercise may be displayed on the second subarea 712. When the user selects the recommended exercise displayed on the second subarea 712, a video of the recommended exercise may be played or a description of the recommended exercise may be provided.

A plurality of menu buttons (e.g., a home menu button, a discovery menu button, a report menu button, and a profile menu button) may be displayed on the third subarea 713. An execution screen including the first area 510 (e.g., the first area 610 of FIG. 6A or the first area 620 of FIG. 6B) and the second area 710 of FIG. 7A may be a home screen. When the user selects a home menu button, the processor 410 may control the display 440 to display the home screen on the display 440. When the user selects a discovery menu button, the processor 410 may control the display 440 to display, on the display 440, a screen including an exercise list in an exercise program to be performed by the user. When the user selects a report menu button, the processor 410 may control the display 440 to display, on the display 440, a screen including a report on an execution result of the exercise program. When the user selects a profile menu button, the processor 410 may control the display 440 to display, on the display 440, a screen including user information (e.g., an ID and the like).

In the example shown in FIG. 7B, a second area 720 may include subareas 721, 722, and 723.

At least one of objects of a second shape (e.g., a curved shape) for providing a target amount of exercise for each of exercise types, an exercise time of the user, an exercise pose score of the user, and calories consumed by the user during exercise, or a combination thereof may be displayed on the first subarea 721.

In the first subarea 721, curved objects may form a circle.

A recommended exercise may be displayed on the second subarea 722, and a plurality of menu buttons (e.g., a home menu button, a discovery menu button, a report menu button, and a profile menu button) may be displayed on the third subarea 723. A description of the second subarea 722 and the third subarea 723 may be applied to the description of the second subarea 712 and the third subarea 713.

The execution screen 500 of FIG. 5 may include, for example, the first area 610 of FIG. 6A and the second area 710 of FIG. 7A; the first area 610 of FIG. 6A and the second area 720 of FIG. 7B; the first area 620 of FIG. 6B and the second area 710 of FIG. 7A; or the first area 620 of FIG. 6B and the second area 720 of FIG. 7B.

Figure 8:
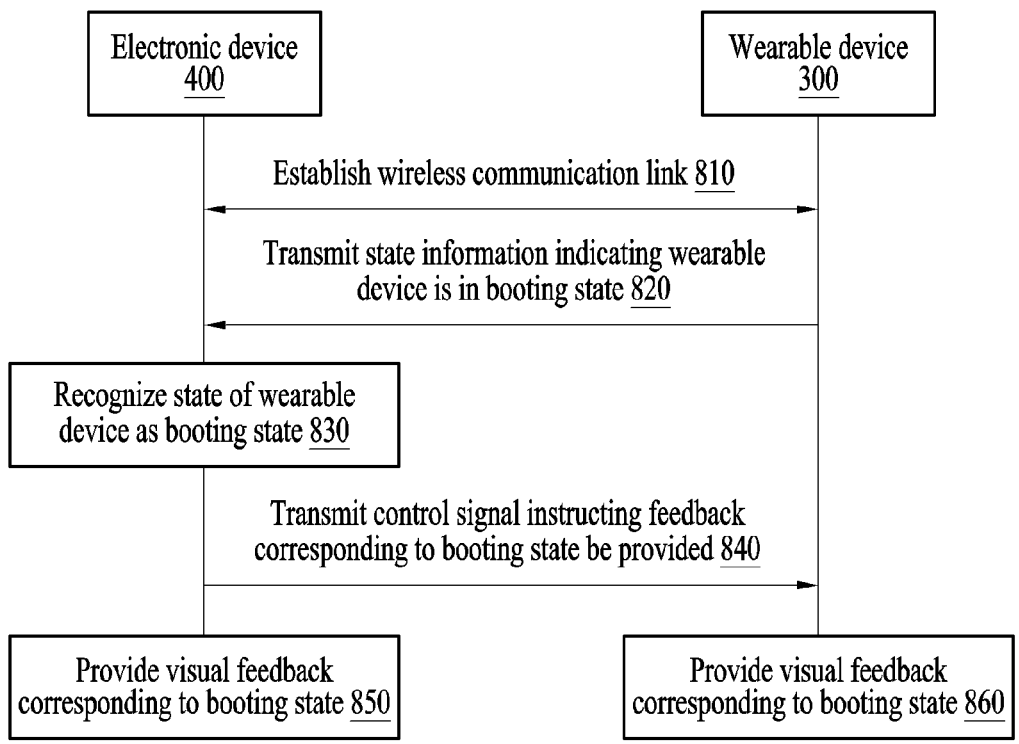
FIGS. 8 and 9 are diagrams illustrating examples of providing visual feedback corresponding to a booting state of a wearable device according to an example embodiment(s)
Figure 9:
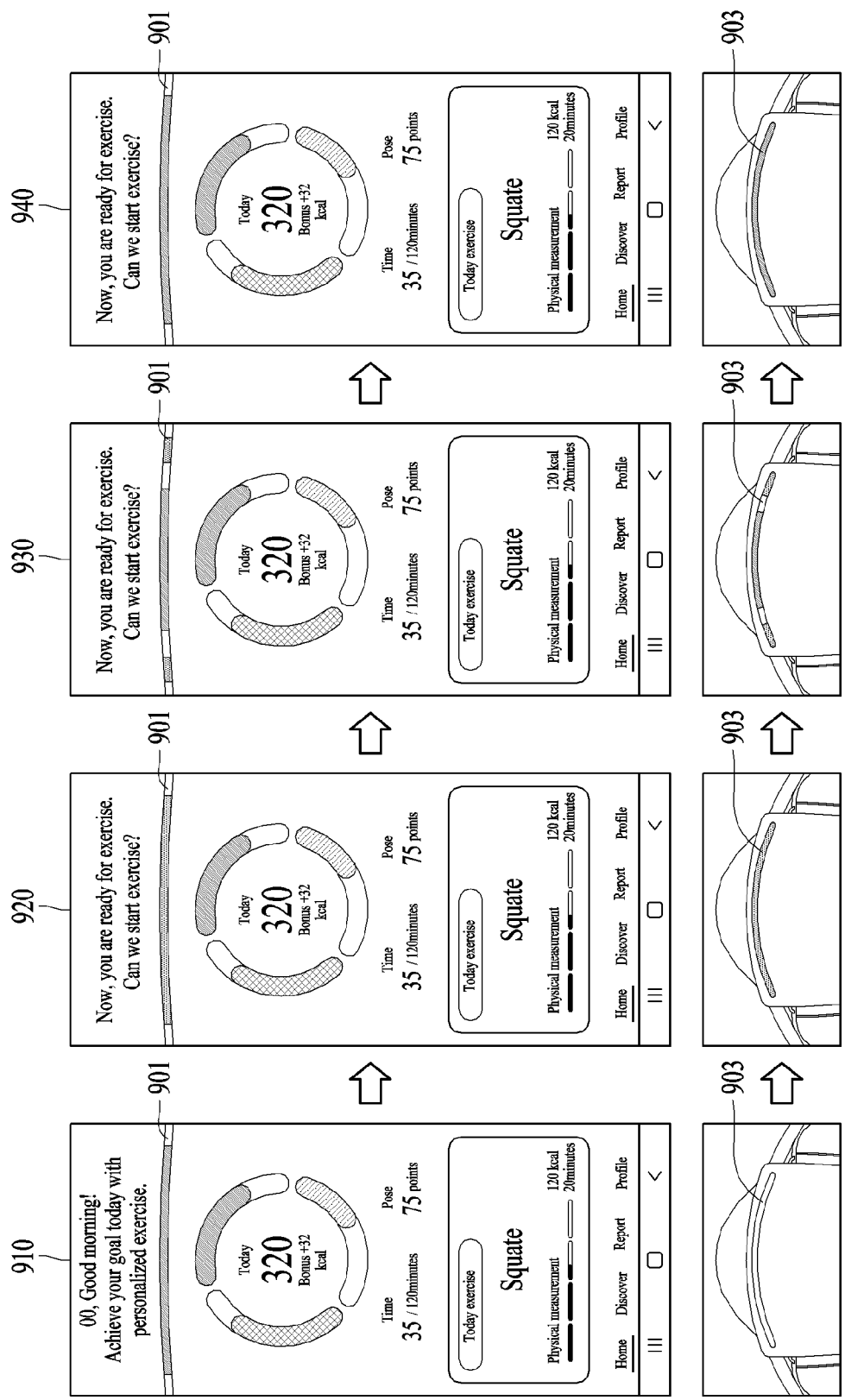

FIGS. 8 and 9 are diagrams illustrating examples of providing visual feedback corresponding to a booting state of a wearable device according to an embodiment.

The user may perform an input on a power button of the wearable device 300. In this case, the wearable device 300 may be powered on.

Referring to FIG. 8, in operation 810, the electronic device 400 may establish a wireless communication link with the wearable device 300. When powered on, the wearable device 300 may transmit, to the electronic device 400, a request for wireless communication connection and the electronic device 400 may transmit, to the wearable device 300, a response to the request for the wireless communication connection. The electronic device 400 may connect to the wearable device 300 through the wireless communication link.

In operation 820, the wearable device 300 may transmit, to the electronic device 400, state information indicating that the wearable device 300 is in a booting state.

In operation 830, the electronic device 400 may recognize (or determine) a state of the wearable device 300 as the booting state, upon receipt of the state information indicating that the wearable device 300 is in the booting state from the wearable device 300.

In operation 840, the electronic device 400 may transmit, to the wearable device 300, a control signal instructing that feedback corresponding to the booting state be provided.

In operation 850, the electronic device 400 may provide visual feedback corresponding to the booting state to the user. For example, the processor 410 of the electronic device 400 may control the display 440 to display a first color on an object (e.g., the first object 612 of FIG. 6A or the second object 622 of FIG. 6B) of a first area of the screen of the fitness application and may control the display 440 to change the first color on the object (e.g., the first object 612 of FIG. 6A or the second object 622 of FIG. 6B) to a second color.

In operation 860, the wearable device 300 may provide the visual feedback corresponding to the booting state to the user. For example, the processor 310 of the wearable device 300 may control the lighting unit 60 to output light of the first color and control the lighting unit 60 to change the first color output by the lighting unit 60 to the second color. According to an embodiment, the wearable device 300 may provide haptic feedback and/or auditory feedback indicating the booting state to the user along with the visual feedback.

Examples of operations 850 and 860 are described with reference to FIG. 9.

Each of screens 910 to 940 of FIG. 9 may be an example of the execution screen 500 of FIG. 5.

Referring to FIG. 9, the wearable device 300 may be in a non-booting state and the processor 410 of the electronic device 400 may control the display 440 to display the screen 910 of the fitness application on the display 440.

A first object 901 (e.g., the first object 612 of FIG. 6A) represented in a second color and text may be displayed on the first area 510 of the screen 910. The second color of the first object 901 may be an example, and the first color or a color having lower concentration than the first color may be represented in the first object 901. On the second area 520 (e.g., the second area 720 of FIG. 7B) of the screen 920, objects of a second shape (e.g., a curved shape) for providing a target amount of exercise for each of exercise types, an exercise time of the user, an exercise pose score of the user, and calories consumed by the user during exercise, a recommended exercise, and a plurality of menu buttons may be displayed.

When the wearable device 300 is a non-booting state, a lighting unit 903 (e.g., the lighting unit 60 of FIG. 2A) of the wearable device 300 may not output light.

When the processor 410 of the electronic device 400 transmits, to the wearable device 300, a control signal instructing that feedback corresponding to a booting state be provided (or recognizes a state of the wearable device 300 as the booting state), the processor 410 may control the display 440 to represent the first object 901 in the first color. The first object 901 represented in the first color and text may be displayed on the first area 510 of the screen 920. The electronic device 400 may provide the user with a visual effect, such as outputting light of the first color.

When the processor 310 of the wearable device 300 receives, from the electronic device 400, the control signal instructing that the feedback corresponding to the booting state be provided, the processor 310 may control the lighting unit 903 to output light of the first color. The first object 901 represented in the first color may be synchronized with the lighting unit 903 outputting the light of the first color.

The processor 410 of the electronic device 400 may control the display 440, so that the first object 901 represented in the first color may be gradually represented in the second color. Correspondingly, the processor 310 of the wearable device 300 may control the lighting unit 903, so that the lighting unit 903 outputting light of the first color may gradually output light of the second color.

For example, the processor 410 of the electronic device 400 may change a color of the central portion of the first object 901 represented in the first color from the first color to the second color. The processor 410 of the electronic device 400 may change the first color to the second color from the central portion of the first object 901 to the edge of the first object 901. The second color may be represented on an area other than the edge of the first object 901 of the screen 930 shown in FIG. 9 and the first color may be represented around the edge of the first object 901. The processor 310 of the wearable device 300 may control the lighting unit 903, so that the central portion of the lighting unit 903 outputting light of the first color may output light of the second color. The processor 310 of the wearable device 300 may control the lighting unit 903, so that the light of the second color may be output from the central portion of the lighting unit 903 to the edge of the lighting unit 903. Corresponding to the first object 901 of the screen 930, the light of the second color may be output in an area other than the edge of the lighting unit 903 and the light of the first color may be output around the edge of the lighting unit 903.

As the first color of the first object 901 gradually changes to the second color, the first object 901 may be represented in the second color. As the color of light output by the lighting unit 903 of the wearable device 300 gradually changes from the first color to the second color, the lighting unit 903 may output light of the second color. The first object 901 represented in the second color and the lighting unit 903 outputting the light of the second color may correspond to complete booting of the wearable device 300. The first object 901 represented in the second color and text may be displayed on the first area 510 of the screen 940 shown in FIG. 9. The processor 310 of the wearable device 300 may control the lighting unit 903 to output the light of the second color.

In the booting state of the wearable device 300, the electronic device 400 may provide the user with visual feedback (e.g., a visual effect of gradually changing the first color of the first object 901 to the second color) corresponding to the booting state. In the booting state of the wearable device 300, the wearable device 300 may provide the user with the visual feedback (e.g., a visual effect of gradually changing the color of light output by the lighting unit 903 from the first color to the second color). Accordingly, the user may easily recognize that the wearable device 300 is in the booting state.

In an embodiment, the electronic device 400 may connect to the smart watch 132 through a wireless communication link. The smart watch 132 may communicate with the electronic device 400 and display, on its display, the visual feedback corresponding to the booting state of the wearable device 300. The smart watch 132 may be synchronized with the electronic device 400. Through such synchronization, the smart watch 132 may display the same screen as the first area 510 of each of the screens 910 to 940 of FIG. 9 on its display.

Figure 10:
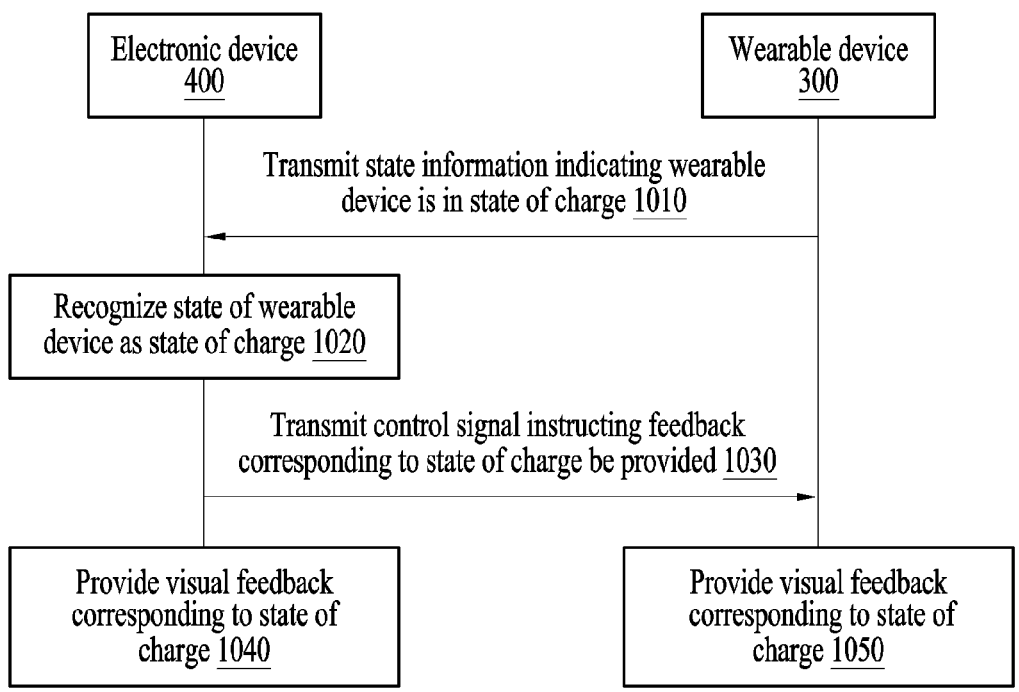
FIGS. 10 and 11 are diagrams illustrating examples of providing visual feedback corresponding to a state of charge of a wearable device according to an example embodiment(s)
Figure 11:
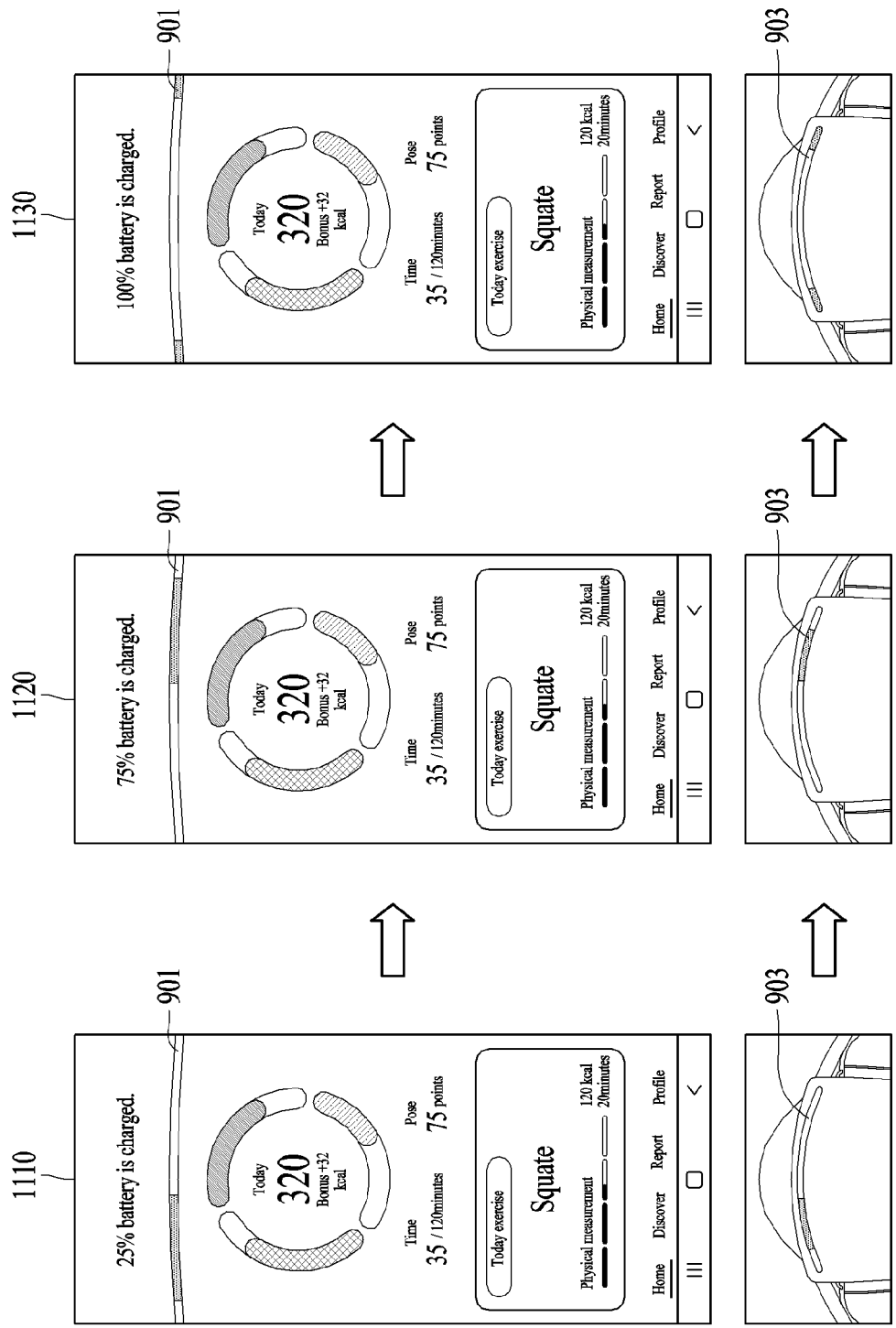

FIGS. 10 and 11 are diagrams illustrating examples of providing visual feedback corresponding to a state of charge of a wearable device according to an embodiment.

Referring to FIG. 10, in operation 1010, the wearable device 300 may transmit state information indicating that the wearable device 300 is in a state of charge to the electronic device 400. For example, when the wearable device 300 is connected, directly or indirectly, to a charging cable (or wirelessly charged), the wearable device 300 may transmit state information indicating that the wearable device 300 is in the state of charge to the electronic device 400.

In operation 1020, the electronic device 400 may determine (or recognize) a state of the wearable device 300 to be the state of charge when the electronic device 400 receives, from the wearable device 300, the state information indicating that the wearable device 300 is in the state of charge.

In operation 1030, the electronic device 400 may transmit, to the wearable device 1030, a control signal instructing feedback corresponding to the state of charge be provided.

In operation 1040, the electronic device 400 may provide visual feedback corresponding to the state of charge to the user. For example, the processor 410 of the electronic device 400 may determine an area to be represented in the first color in an object (e.g., the first object 612 of FIG. 6A or the second object 622 of FIG. 6B) of the first area of the screen of the fitness application. The processor 410 of the electronic device 400 may control the display 440 to display the first color on the determined area. The processor 410 of the electronic device 400 may control the display 440 to provide a visual effect of moving the area, in which the first color is represented in the object (e.g., the first object 612 of FIG. 6A or the second object 622 of FIG. 6B) as the charging rate of the wearable device 300 increases.

In operation 1050, the wearable device 300 may provide the user with the visual feedback corresponding to the state of charge. For example, the processor 310 of the wearable device 300 may determine an area (or some light sources) where the lighting unit 60 is to output the first color. The processor 310 of the wearable device 300 may control the lighting unit 60 to output light of the first color on the determined area. The processor 310 of the wearable device 300 may control the display 440 to provide a visual effect of moving the area where the lighting unit 60 outputs the light of the first color as the charging rate of the wearable device 300 increases. According to an embodiment, the wearable device 300 may provide the user with haptic feedback and/or auditory feedback corresponding to the state of charge along with the visual feedback.

Examples of operations 1040 and 1050 are described with reference to FIG. 11.

Screens 1110 to 1130 of FIG. 11 may be examples of the execution screen 500 of FIG. 5.

The processor 410 of the electronic device 400 may receive state information including a first charging rate (e.g., a charging rate of 25%) from the wearable device 300. The processor 410 of the electronic device 400 may determine an area where the first color is to be represented (or a position of an area where the first color is to be represented) in the first object 901 by using the first charging rate. For example, the leftmost side of the first object 901 may correspond to a charging rate of 0 and a direction from left to right of the first object 901 may correspond to an increase in the charging rate of the wearable device 300. The processor 410 of the electronic device 400 may determine an area (or a position) corresponding to the first charging rate in the first object 901. The processor 410 of the electronic device 400 may control the display 440 to display, on the display 440, the screen 1110 including the first object 901, in which the first color is represented in the determined area, and a charging rate.

The leftmost side of the lighting unit 903 of the wearable device 300 may correspond to a charging rate of 0 and a direction from left to right of the lighting unit 903 may correspond to an increase in the charging rate of the wearable device 300. The processor 310 of the wearable device 300 may control the lighting unit 903, so that among light sources of the lighting unit 903, light sources at positions corresponding to the first charging rate may output the light of the first color.

As the charging rate of the wearable device 300 increases, the processor 410 of the electronic device 400 may control the display 440 to provide a visual effect of moving, to the right, the area where the first color is represented in the first object 901. For example, when the charge rate of the wearable device 300 is a second charge rate (e.g., 75%), the processor 410 of the electronic device 400 may control the display 440 to display the screen 1120 including the second charging rate and the first object 901 where an area corresponding to the second charging rate is represented in the first color, on the display 440.

As the charging rate of the wearable device 300 increases, the processor 310 of the wearable device 300 may control the lighting unit 903 to provide a visual effect of moving, to the right, the area where the light of the first color is output. For example, the processor 310 of the wearable device 300 may control the lighting unit 903, so that light sources at positions corresponding to the second charging rate among the light sources of the lighting unit 903 may output the light of the first color.

When the wearable device 300 is completely charged, the processor 410 of the electronic device 400 may control the display 440 to display a screen 1130 including the first object 901, in which ends of both right and left sides are represented in the first color, and text indicating completed charging, on the display 440. The processor 310 of the wearable device 300 may control the lighting unit 903, so that some of light sources (e.g., light sources at left and right ends) of the lighting unit 903 may output the light of the first color. When the wearable device 300 is completely charged, the processor 310 of the wearable device 300 may have some light sources of the lighting unit 903 output the light of the first color, thereby reducing power consumption.

In an embodiment, the electronic device 400 may be connected to the smart watch 132 through a wireless communication link. The smart watch 132 may communicate with the electronic device 400 and display, on its display, visual feedback corresponding to the charging state of the wearable device 300. The smart watch 132 may be synchronized with the electronic device 400. Through such synchronization, the smart watch 132 may display the same screen as the first area 510 of each of the screens 1110 to 1130 of FIG. 11 on its display.

Each embodiment herein may be used in combination with any other embodiment(s) described herein.

Figure 12:
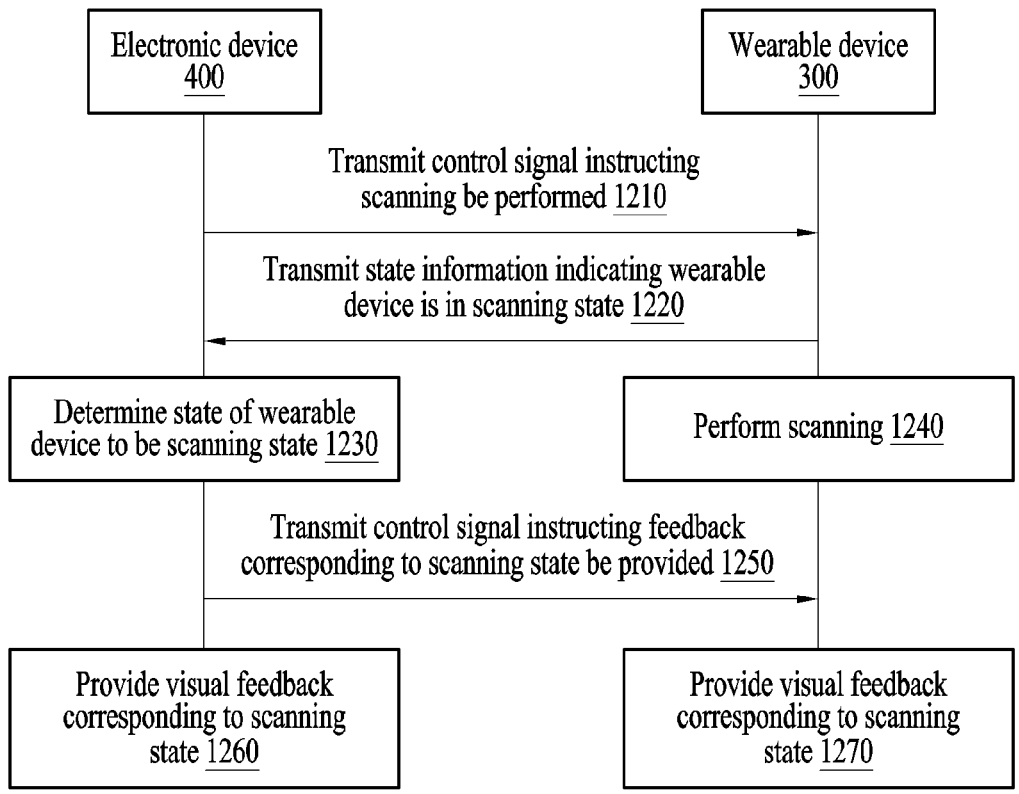
FIGS. 12 and 13 are diagrams illustrating examples of providing visual feedback corresponding to a scanning state of a wearable device according to an example embodiment(s)
Figure 13:
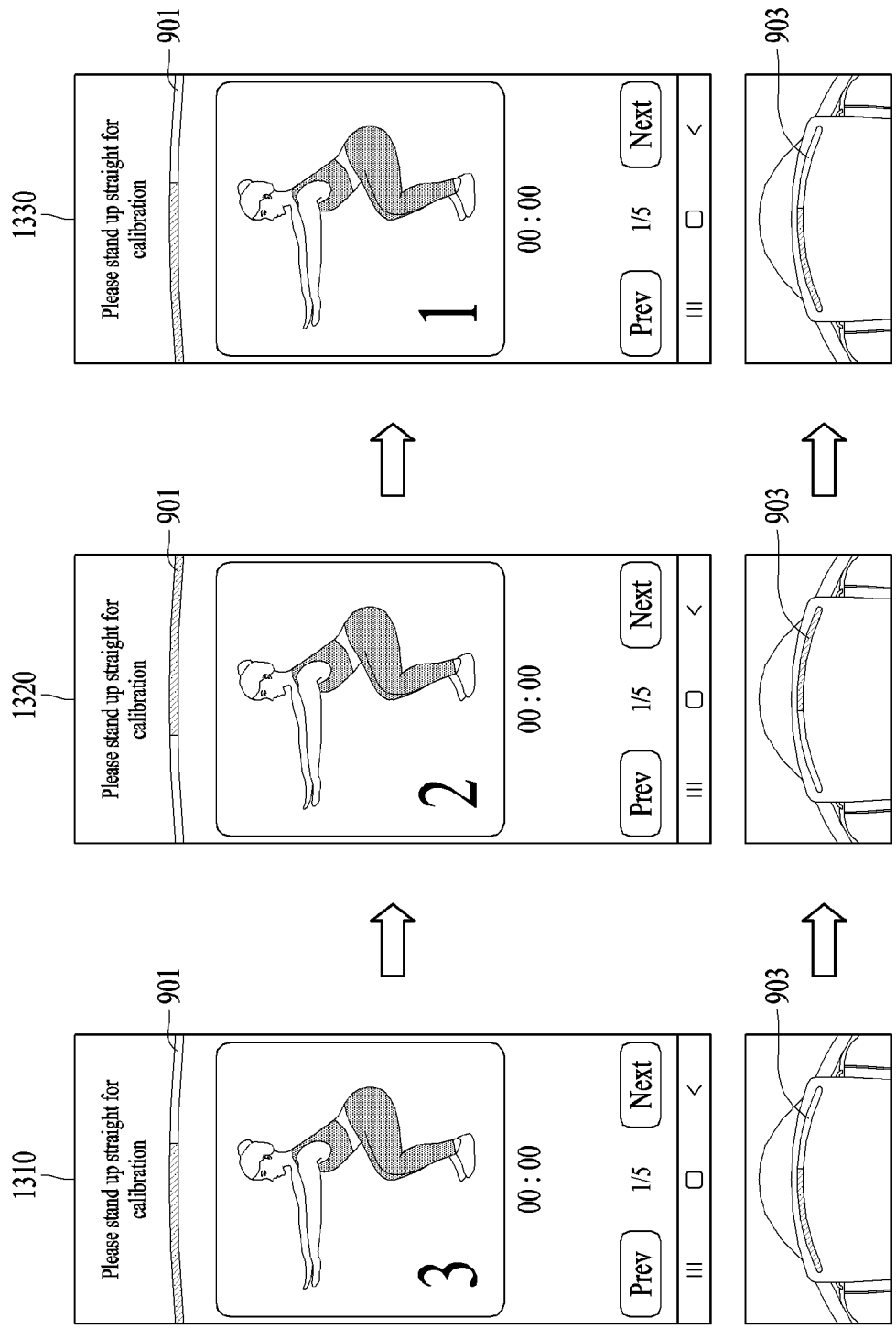

FIGS. 12 and 13 are diagrams illustrating examples of providing visual feedback corresponding to a scanning state of a wearable device according to an embodiment.

Referring to FIG. 12, in operation 1210, the electronic device 400 may transmit, to the wearable device 300, a control signal instructing scanning be performed. The scanning may indicate an operation in which the wearable device 300 determines whether the user is in a ready state of exercise start.

In an embodiment, the electronic device 400 may transmit, to the wearable device 300, the control signal instructing the scanning be performed in response to an exercise start instruction of the user. The exercise start instruction may include, for example, the user's input to an exercise start button on a screen of the fitness application of the electronic device 400. The electronic device 400 may transmit the control signal instructing the scanning to the wearable device 300 in response to the user's input to the exercise start button. In another example, the exercise start instruction may include a voice input. Upon receipt of a voice signal indicating exercise start from the user, the electronic device 400 may transmit, to the wearable device 300, the control signal instructing that the scanning be performed.

In operation 1220, the wearable device 300 may transmit, to the electronic device 400, state information indicating that the wearable device 300 is in a scanning state for performing scanning. The wearable device 300 may enter the scanning state upon receipt of the control signal instructing that the scanning be performed, from the electronic device 400, and may transmit, to the electronic device 400, the state information indicating that the wearable device 300 is in the scanning state.

In operation 1230, upon receipt of the state information indicating that the wearable device 300 is in the scanning state, the electronic device 400 may recognize (or determine) a state of the wearable device 300 as the scanning state.

According to an implementation, the user may perform a motion for starting an exercise with the wearable device 300 worn on the user's body. The wearable device 300 may sense the motion for starting the exercise, using a sensor (e.g., the IMU 360). Upon sensing of such a motion, the wearable device 300 may transmit the state information indicating that the wearable device 300 is in the scanning state to the electronic device 400. When the electronic device 400 receives, from the wearable device 300, the state information indicating that the wearable device 300 is in the scanning state, the electronic device 400 may recognize that the wearable device 300 is in the scanning state.

In operation 1240, the wearable device 300 may perform the scanning. The wearable device 300 may determine whether the user is in a ready state of exercise start through a sensor (e.g., the IMU 360). For example, the wearable device 300 may determine whether the user is in a first pose (e.g., a pose standing upright) through the IMU 360 and/or the angle sensors 320 and 320-1 and may determine whether the user is properly wearing the wearable device 300.

In operation 1250, the electronic device 400 may transmit, to the wearable device 300, a control signal instructing that feedback corresponding to the scanning state be provided.

In operation 1260, the electronic device 400 may provide the user with visual feedback corresponding to the scanning state. For example, the processor 410 of the electronic device 400 may control the display 440 to provide a visual effect of moving an area where the second color is represented in an object (e.g., the first object 612 or the second object 622) of the first area 510.

In operation 1270, the wearable device 300 may provide the user with visual feedback corresponding to the scanning state. For example, the processor 310 of the wearable device 300 may control the lighting unit 903, so that lighting is moved by the lighting unit 903. According to an embodiment, the wearable device 300 may provide the user with visual feedback and auditory feedback indicating that the scanning is in progress.

When the wearable device 300 determines that the user is in the ready state of exercise start, the wearable device 300 may enter a sensing state, which is to be described below, and may notify the electronic device 400 that the user is in the ready state of exercise start or transmit state information indicating that the wearable device 300 is in the sensing state to the electronic device 400. When the wearable device 300 determines that the user is not in the ready state of exercise start, the wearable device 300 may notify the electronic device 400 that the user is not in the ready state of exercise start. In this case, the electronic device 400 may perform operation 1210 again.

Examples of operations 1260 and 1270 are described with reference to FIG. 13.

Each of screens 1310 to 1330 of FIG. 13 may be an example of the execution screen 500 of FIG. 5.

In the example shown in FIG. 13, when the processor 410 of the electronic device 400 transmits, to the wearable device 300, a control signal instructing that feedback corresponding to the scanning state be provided, the processor 410 of the electronic device 400 may control the display 440 to display the screen 1310 of the fitness application on the display 440. For example, a countdown number (e.g., 3) may be displayed on the screen 1310, text requesting that a specific pose be made may be displayed on the first area 510, and the second color may be represented in a partial area (e.g., a left area) of the first object 901. The countdown number (e.g., 3) may indicate a time during which the scanning is performed or a remaining time before exercise start.

The processor 310 of the wearable device 300 may control the lighting unit 903, so that some light sources (e.g., left light sources) of the lighting unit 903 may output the light of the second color. Positions of light sources that output the light of the second color in the lighting unit 903 may correspond to an area where the second color is represented in the first object 901 of the screen 1310.

The processor 410 of the electronic device 400 may control the display 440 to provide a visual effect of moving, to the right, an area where the second color is represented in the first object 901 and may reduce the countdown number. For example, a countdown number (e.g., 2) may be displayed on the screen 1320 of FIG. 13 and the second color may be represented in a partial area (e.g., right area) of the first object 901.

The processor 310 of the wearable device 300 may control the lighting unit 903, so that some light sources (e.g., right light sources) of the lighting unit 903 may output the light of the second color. That is, the processor 310 of the wearable device 300 may control the lighting unit 903 to move the lighting from left to right. The wearable device 300 may provide the user with a visual effect of moving the light of the second color to the right in the lighting unit 903. Positions of light sources that output the second color in the lighting unit 903 may correspond to an area where the second color is represented in the first object 901 of the screen 1320.

The processor 410 of the electronic device 400 may control the display 440 to provide a visual effect of moving, to the left, the area where the second color is represented in the first object 901. For example, a countdown number (e.g., 1) may be displayed on the screen 1330 of FIG. 13 and the second color may be represented in the left area of the first object 901.

The processor 310 of the wearable device 300 may control the lighting unit 903, so that some light sources (e.g., left light sources) of the lighting unit 903 may output the light of the second color. That is, the processor 310 of the wearable device 300 may control the lighting unit 903 to move lighting from right to left. The wearable device 300 may provide the user with a visual effect of moving the second color to the left in the lighting unit 903. Positions of light sources that output the second color in the lighting unit 903 may correspond to the area where the second color is represented in the first object 901 of the screen 1330.

While the wearable device 300 is performing scanning, the electronic device 400 may provide the user with visual feedback (or a visual effect) of moving left and right the area where the second color is represented in the first object 901. The wearable device 300 may provide the user with visual feedback (or a visual effect) in which the light of the second color moves left and right in the lighting unit 903 while the wearable device 300 is performing scanning.

When the wearable device 300 determines that the user is in a ready state of exercise start during the scanning, the wearable device 300 may enter a sensing state, which is to be described below, and notify the electronic device 400 that the user is in the ready state of exercise start. When the wearable device 300 determines that the user is not in the ready state of exercise start, the wearable device 300 may notify the electronic device 400 that the user is not in the ready state of exercise start. In this case, the processor 410 of the electronic device 400 may control the display 440 to display the screen 1310 on the display 440.

In an embodiment, the electronic device 400 may be connected to the smart watch 132 through a wireless communication link. The smart watch 132 may communicate with the electronic device 400 and display, on its display, visual feedback corresponding to the scanning state of the wearable device 300. The smart watch 132 may be synchronized with the electronic device 400. Through such synchronization, the smart watch 132 may display the same screen as the first area 510 of each of the screens 1310 to 1330 of FIG. 13 on its display.

Figure 14:
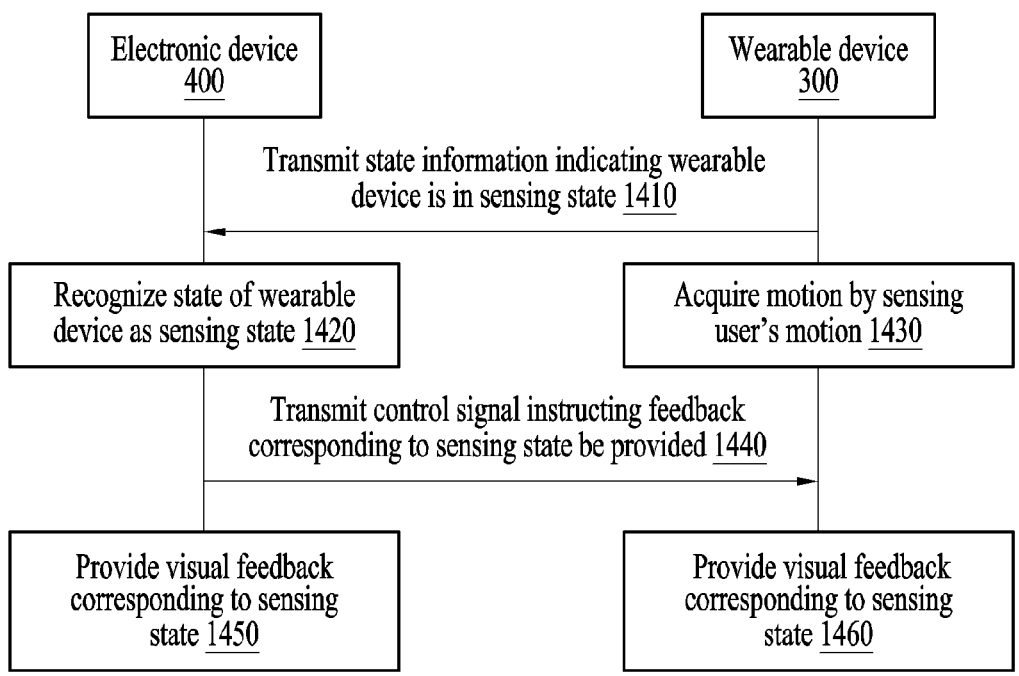
FIGS. 14 and 15 are diagrams illustrating examples of providing visual feedback corresponding to a sensing state of a wearable device according to an example embodiment(s)
Figure 15:
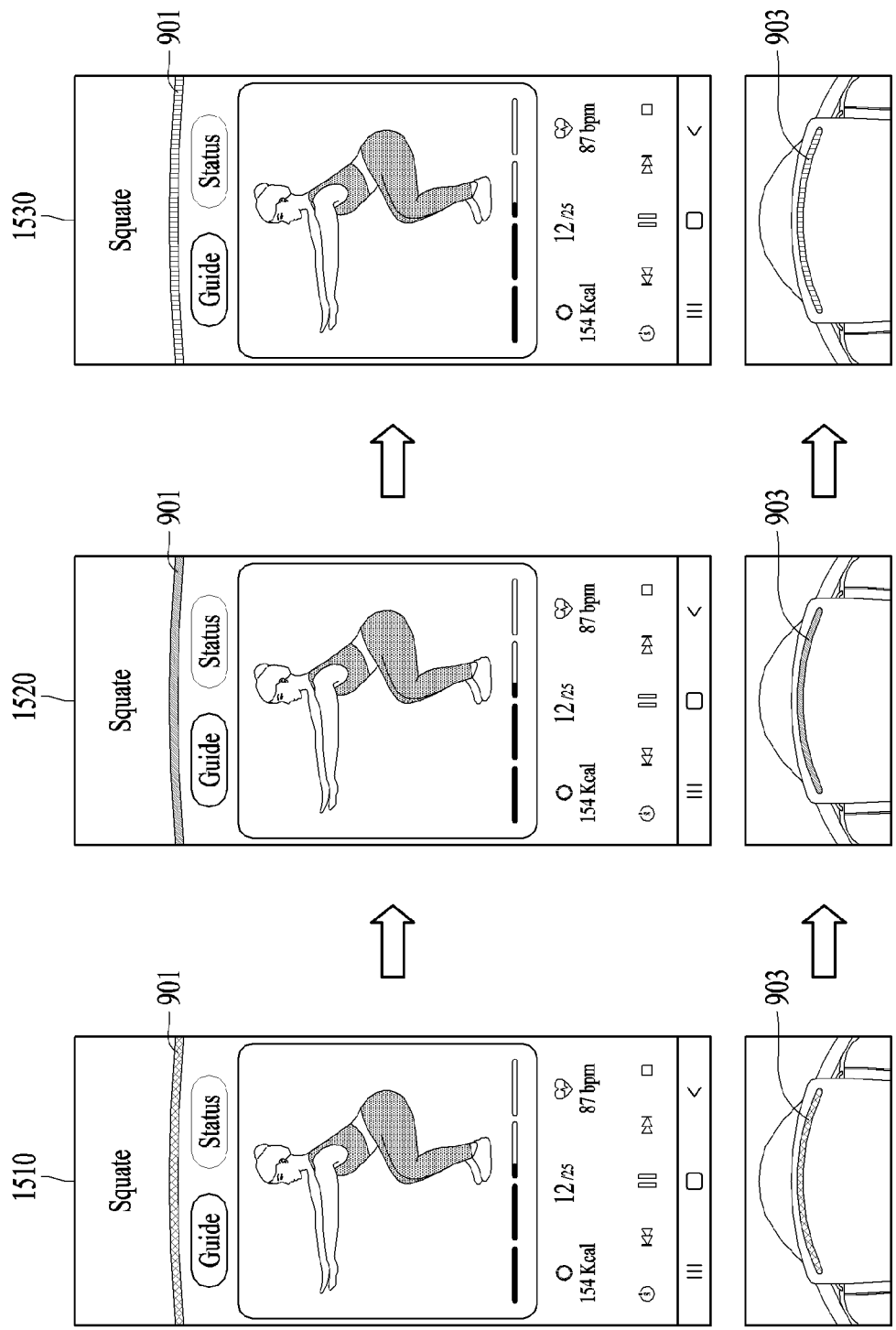

FIGS. 14 and 15 are diagrams illustrating examples of providing visual feedback corresponding to a sensing state of a wearable device according to an embodiment.

Referring to FIG. 14, in operation 1410, the wearable device 300 may transmit, to the electronic device 400, state information indicating that the wearable device 300 is in a sensing state for sensing a motion (e.g., an exercise motion) of the user. For example, the wearable device 300 may enter the sensing state when it is determined that the user is in the ready state of exercise start during the scanning. Upon entrance of the sensing state, the wearable device 300 may transmit, to the electronic device 400, state information indicating that the wearable device 300 is in the sensing state.

In operation 1420, the electronic device 400 may recognize (or determine) a state of the wearable device 300 as the sensing state.

In operation 1430, the wearable device 300 may acquire motion information by sensing a motion of the user. For example, the wearable device 300 may acquire the motion information of the user by sensing the motion of the user through a sensor (e.g., the IMU 360 and/or the angle sensors 320 and 320-1).

The wearable device 300 may generate exercise progress information of the user based on the obtained motion information. The exercise progress information may include, for example, the number of repetitions of an exercise but is not limited thereto. The wearable device 300 may transmit the exercise progress information to the electronic device 400. According to an embodiment, the wearable device 300 may transmit the acquired motion information to the electronic device 400. The electronic device 400 may generate the exercise progress information of the user based on the motion information received from the wearable device 300.

In operation 1440, the electronic device 400 may transmit, to the wearable device 300, a control signal instructing that feedback corresponding to the sensing state be provided.

In operation 1450, the electronic device 400 may provide visual feedback corresponding to the sensing state to the user. For example, the processor 410 of the electronic device 400 may control the display 440 to sequentially represent each of colors in an object (e.g., the first object 612 or the second object 622) of the first area 510. Colors may be configured by the user.

In operation 1460, the wearable device 300 may provide the visual feedback corresponding to the sensing state to the user. For example, the processor 310 of the wearable device 300 may control the lighting unit 60 to sequentially output light of each of the colors. According to an embodiment, the wearable device 300 may provide the user with haptic feedback and/or auditory feedback corresponding to the sensing state along with the visual feedback.

Examples of operations 1450 and 1460 are described with reference to FIG. 15.

Each of screens 1510 to 1530 of FIG. 15 may be an example of the execution screen 500 of FIG. 5.

In the example shown in FIG. 15, when the processor 410 of the electronic device 400 transmits the control signal instructing the feedback corresponding to the sensing state be provided (or recognizes a state of the wearable device 300 as the sensing state), the processor 410 of the electronic device 400 may control the display 440 to display the screen 1510 of the fitness application on the display 440. On the first area 510 of the screen 1510, the name of an exercise performed by the user may be displayed and the first object 901 represented in a third color may be displayed. The third color may be different from the first and second colors and may be set by the user. At least one of exercise progress information (e.g., the total number of repetitions per set and the number of repetitions performed by the user), heart rate information, calories consumed by the user, and a thumbnail of a guide image of an exercise performed by the user, or a combination thereof may be displayed on the second area 520 of the screen 1510. When the user applies an input to the thumbnail, a guide image may be reproduced.

When the processor 310 of the wearable device 300 receives a control signal instructing that visual feedback corresponding to the sensing state be provided, the processor 310 of the wearable device 300 may control the lighting unit 903 to output the light of the third color.

The processor 410 of the electronic device 400 may change the third color of the first object 901 to a fourth color. The first object 901 represented in the fourth color may be displayed on the first area 510 of the screen 1520 of FIG. 15. The processor 410 of the electronic device 400 may control the display 440 to provide a visual effect of changing the color of the first object 901 from the third color to the fourth color. The processor 310 of the wearable device 300 may control the lighting unit 903 to output light of the fourth color. The processor 310 of the wearable device 300 may control the lighting unit 903 to provide a visual effect of changing the color of light of the lighting unit 903 from the third color to the fourth color. According to an embodiment, the fourth color may be set by the user.

The processor 410 of the electronic device 400 may change the fourth color of the first object 901 to a fifth color. The first object 901 represented in the fifth color may be displayed on the first area 510 of the screen 1530 of FIG. 15. The processor 410 of the electronic device 400 may control the display 440 to provide a visual effect of changing the color of the first object 901 from the fourth color to the fifth color. The processor 310 of the wearable device 300 may control the lighting unit 903 to output light of the fifth color. The processor 310 of the wearable device 300 may control the lighting unit 903 to provide a visual effect of changing the color of light of the lighting unit 903 from the fourth color to the fifth color. According to an embodiment, the fifth color may be set by the user.

The processor 410 of the electronic device 400 may apply an effect (hereinafter, "a first breathing effect") that gradually fades the color density of the first object 901 and then gradually increases the color density of the first object 901, along with the change of the color of the first object 901. Correspondingly, the processor 310 of the wearable device 300 may apply an effect (hereinafter, "a second breathing effect) that gradually fades the light intensity of the lighting unit 903 and then gradually increase the light intensity of the lighting unit 903.

In the sensing state of the wearable device 300, the electronic device 400 may provide the user with visual feedback (e.g., the visual effect of sequentially changing the color of the first object 901 and the first breathing effect) corresponding to the sensing state. In the sensing state of the wearable device 300, the wearable device 300 may provide the user with visual feedback (e.g., the visual effect of sequentially changing the color of light of the lighting unit 903 and the second breathing effect) corresponding to the sensing state. Accordingly, the user may easily recognize that the wearable device 300 is in the sensing state.

In an embodiment, the electronic device 400 may be connected to the smart watch 132 through a wireless communication link. The smart watch 132 may communicate with the electronic device 400 and display, on its display, the visual feedback corresponding to the sensing state of the wearable device 300. The smart watch 132 may be synchronized with the electronic device 400. Through such synchronization, the smart watch 132 may display the same screen as the first area 510 of each of the screens 1510 to 1530 of FIG. 15 on its display.

Although the number of colors representing the sensing state of the wearable device 300 is described as three with reference to FIG. 15, this is only an example. The number of colors representing the sensing state of the wearable device 300 is not limited thereto.

Figure 16:
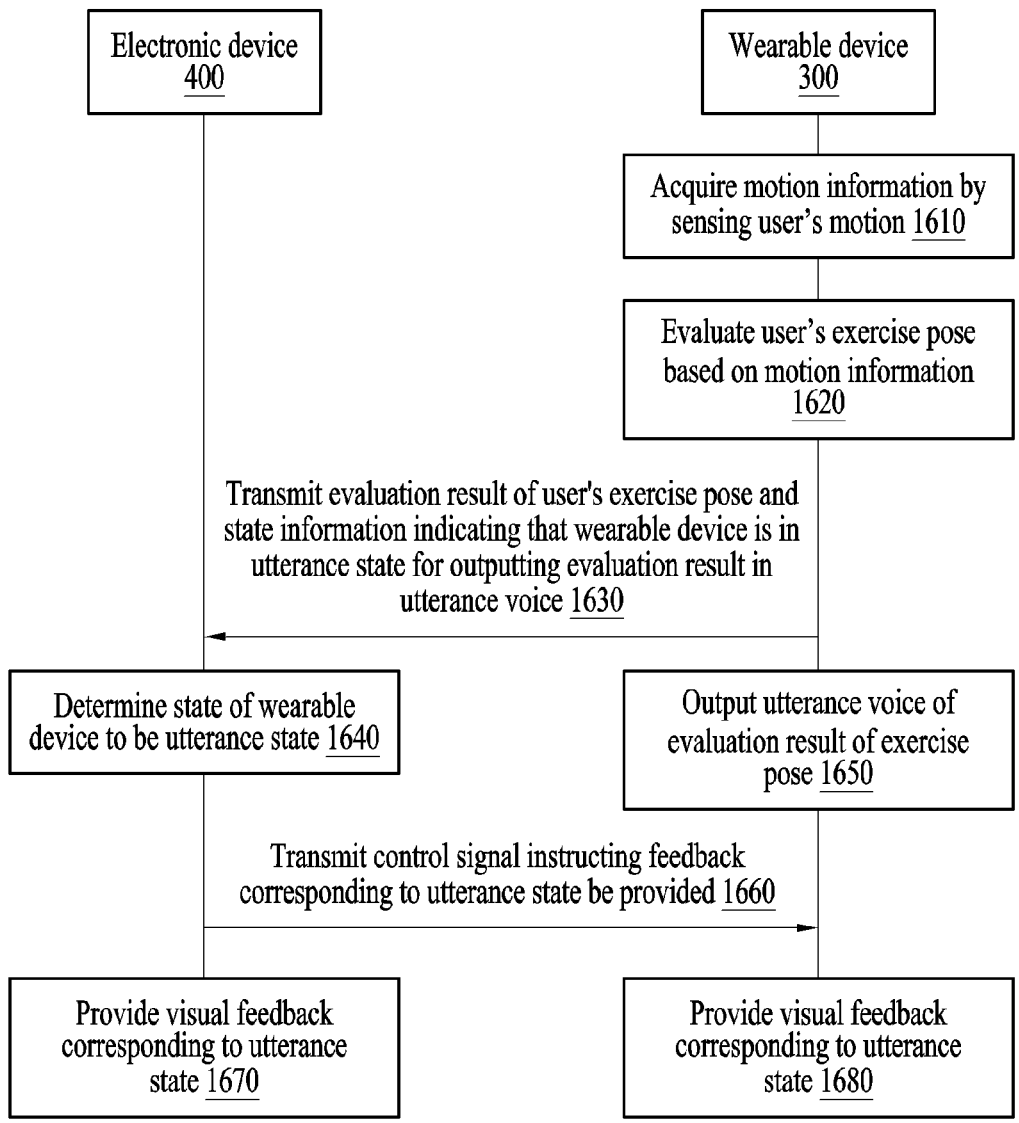
FIGS. 16 and 17 are diagrams illustrating examples of providing visual feedback corresponding to an utterance state of a wearable device according to an example embodiment(s)
Figure 17:
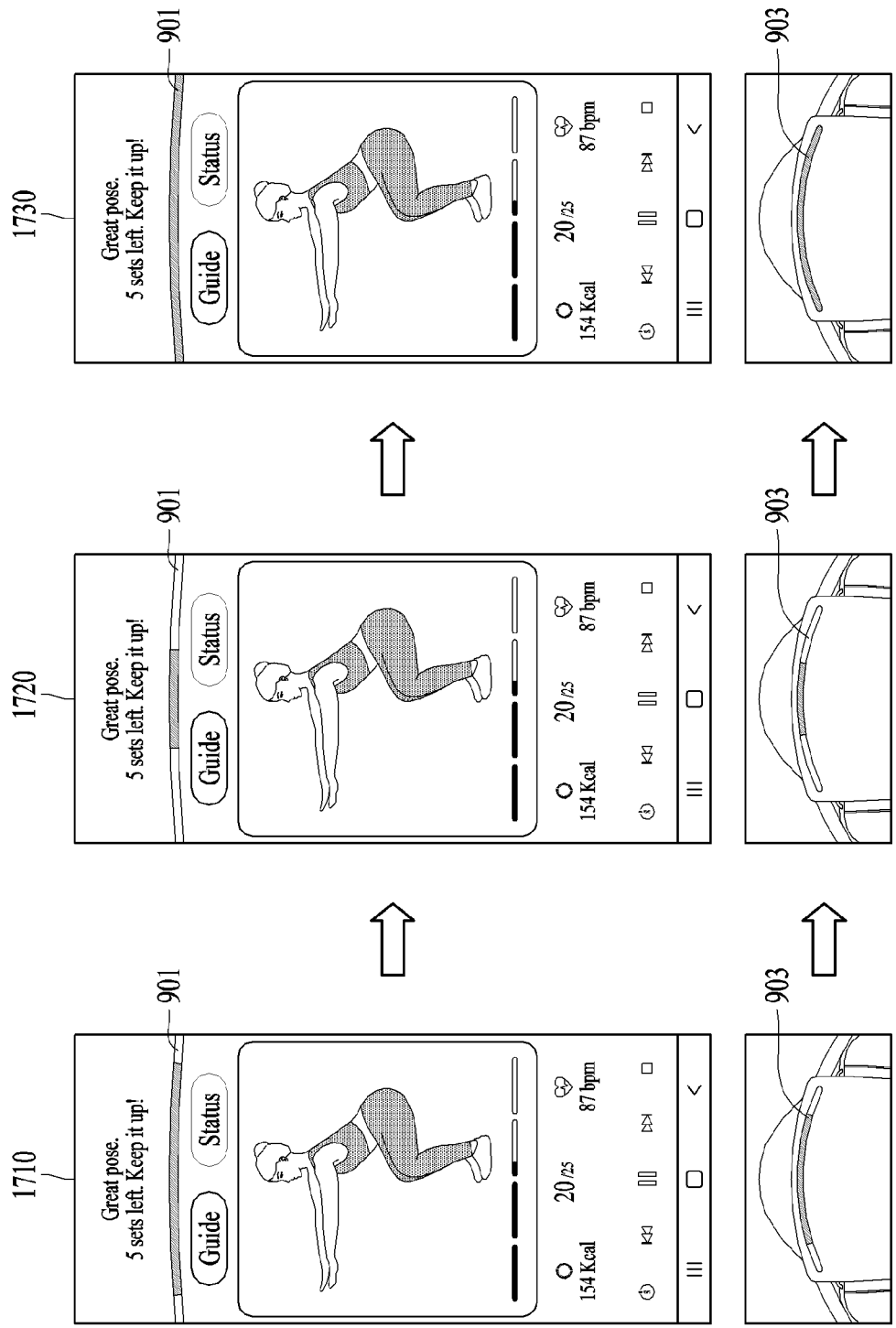

FIGS. 16 and 17 are diagrams illustrating examples of providing visual feedback corresponding to an utterance state of a wearable device according to an embodiment.

Referring to FIG. 16, in operation 1610, the wearable device 300 may acquire motion information by sensing a motion of the user. For example, the wearable device 300 may acquire the motion information of the user by sensing the motion of the user through a sensor (e.g., the IMU 360 and/or the angle sensors 320 and 320-1).

In operation 1620, the wearable device 300 may evaluate an exercise pose of the user based on the acquired motion information. For example, the wearable device 300 may evaluate the exercise pose of the user by comparing the bent angle of the user's joint to a bent angle required for an exercise. According to implementation, operation 1620 may be performed by the electronic device 400. For example, the wearable device 300 may transmit the acquired motion information to the electronic device 400. The AI of the electronic device 400 may evaluate an exercise pose of the user based on the motion information.

In operation 1630, the wearable device 300 may transmit, to the electronic device 400, an evaluation result of the user's exercise pose and state information indicating that the wearable device 300 is in an utterance state for outputting the evaluation result in an utterance voice.

In operation 1640, upon receipt of the state information indicating that the wearable device 300 is in the utterance state, the electronic device 400 may recognize (or determine) a state of the wearable device 300 as the utterance state.

In operation 1650, the wearable device 300 may output the utterance voice of the evaluation result of the exercise pose. For example, when it is determined that the user's exercise pose is good, the wearable device 300 may output an utterance of "Your pose is excellent" through a speaker. According to an embodiment, the wearable device 300 may determine to provide the user with the evaluation result of the exercise pose in an utterance voice when the remaining number of repetitions of the exercise reaches a predetermined value. According to such determination, the wearable device 300 may output the utterance voice of the evaluation result of the exercise pose and the remaining number of repetitions of the exercise. For example, the wearable device 300 may output an utterance voice of "Your pose is excellent. There are 5 sets left. Keep it up." through a speaker. According to an embodiment, when the exercise pose of the user is incorrect more than a predetermined number of times, the wearable device 300 may determine to provide the user with the evaluation result of the exercise pose in an utterance voice and may output the utterance voice of the evaluation result of the exercise pose according to the determination. For example, when the exercise pose of the user is incorrect three times, the wearable device 300 may output an utterance voice of "Please, correct your pose" through a speaker.

According to an embodiment, the utterance voice described in operation 1650 may be output by the electronic device 400.

In operation 1660, the electronic device 400 may transmit, to the wearable device 300, a control signal instructing that visual feedback corresponding to the utterance state be provided.

In operation 1670, the electronic device 400 may provide the user with the visual feedback corresponding to the utterance state. For example, the processor 410 of the electronic device 400 may control the display 440 to repeatedly extend and reduce an area in which the second color is represented in an object (e.g., the first object 612 or the second object 622) of the first area 510.

In operation 1680, the wearable device 300 may provide the visual feedback corresponding to the utterance state to the user. For example, the processor 310 of the wearable device 300 may control the lighting unit 903 to repeatedly extend and reduce an area where light of the second color is output in the lighting unit 903.

Examples of operations 1670 and 1680 are described with reference to FIG. 17.

Each of screens 1710 to 1730 of FIG. 17 may be an example of the execution the screen 500 of FIG. 5.

In the example shown in FIG. 17, when the processor 410 of the electronic device 400 transmits a control signal instructing that visual feedback corresponding to the utterance state be provided, the processor 410 of the electronic device 400 may control the display 440 to display the screen 1710 of the fitness application on the display 440. On the first area 510 of the screen 1710, text indicating the evaluation result of the exercise pose and the remaining number of repetitions may be displayed and the first object 901, in which some areas (the central area) are represented in the second color, may be displayed. On the second area 520 of the screen 1510, exercise progress information, and a thumbnail of a guide image of an exercise performed by the user may be displayed.

When the processor 310 of the wearable device 300 receives the control signal instructing that the visual feedback corresponding to the utterance state be provided, the processor 310 of the wearable device 300 may control the lighting unit 903 to output the light of the second color in an area #1 (e.g., the central area) of the lighting unit 903. The area #1 where the light of the second color is output in the lighting unit 903 may correspond to an area where the second color is represented in the first object 901 of the screen 1710.

The processor 410 of the electronic device 400 may control the display 440 to reduce the area where the second color is represented in the first object 901. The area where the second color is represented in the first object 901 of the screen 1720 of FIG. 17 may be narrower than the area where the second color is represented in the first object 901 of the screen 1710 of FIG. 17. The processor 310 of the wearable device 300 may control the lighting unit 903 to output the light of the second color in an area #2 that is narrower than the area #1 of the lighting unit 903. The area #2 where the light of the second color is output in the lighting unit 903 may correspond to the area where the second color is represented in the first object 901 of the screen 1720.

The processor 410 of the electronic device 400 may control the display 440 to extend the area where the second color is represented in the first object 901. The area where the second color is represented in the first object 901 of the screen 1730 may be wider than the area where the second color is represented in the first object 901 of the screen 1720. The processor 310 of the wearable device 300 may control the lighting unit 903 to output the light of the second color in an area #3 that is wider than the area #2 of the lighting unit 903. The area #3 where the light of the second color is output in the lighting unit 903 may correspond to the area where the second color is represented in the first object 901 of the screen 1730.

In the utterance state of the wearable device 300, the electronic device 400 may provide the user with visual feedback (e.g., a visual effect of repeatedly extending and reducing the area where the second color is represented in the first object 901) corresponding to the utterance state. In the utterance state of the wearable device 300, the wearable device 300 may provide the user with visual feedback (e.g., a visual effect of repeatedly extending and reducing the area where the light of the second color is output in the lighting unit 903) corresponding to the utterance state. Accordingly, the user may easily recognize that the wearable device 300 is in the utterance state.

The processor 310 of the wearable device 300 may output, through the speaker of the wearable device 300, the utterance voice of the evaluation result of the exercise pose and the remaining number of repetitions, along with the visual feedback.

According to an embodiment, the electronic device 400 may establish a wireless communication link with wireless earphones of the user. In this case, the electronic device 400 may control the wearable device 300 not to output the utterance voice. The electronic device 400 may transmit a control signal indicating no output of the utterance voice to the wearable device 300. The electronic device 400 may generate an utterance voice of the evaluation result of the exercise pose and the remaining number of repetitions and may output the generated utterance voice through the wireless earphones. The wireless earphones may output the utterance voice received from the electronic device 400.

According to an embodiment, the electronic device 400 may be connected to the smart watch 132 through a wireless communication link. The smart watch 132 may communicate with the electronic device 400 and display, on its display, visual feedback corresponding to the utterance state of the wearable device 300. The smart watch 132 may be synchronized with the electronic device 400. Through such synchronization, the smart watch 132 may display the same screen as the first area 510 of each of the screens 1710 to 1730 of FIG. 17 on its display.

Figure 18:
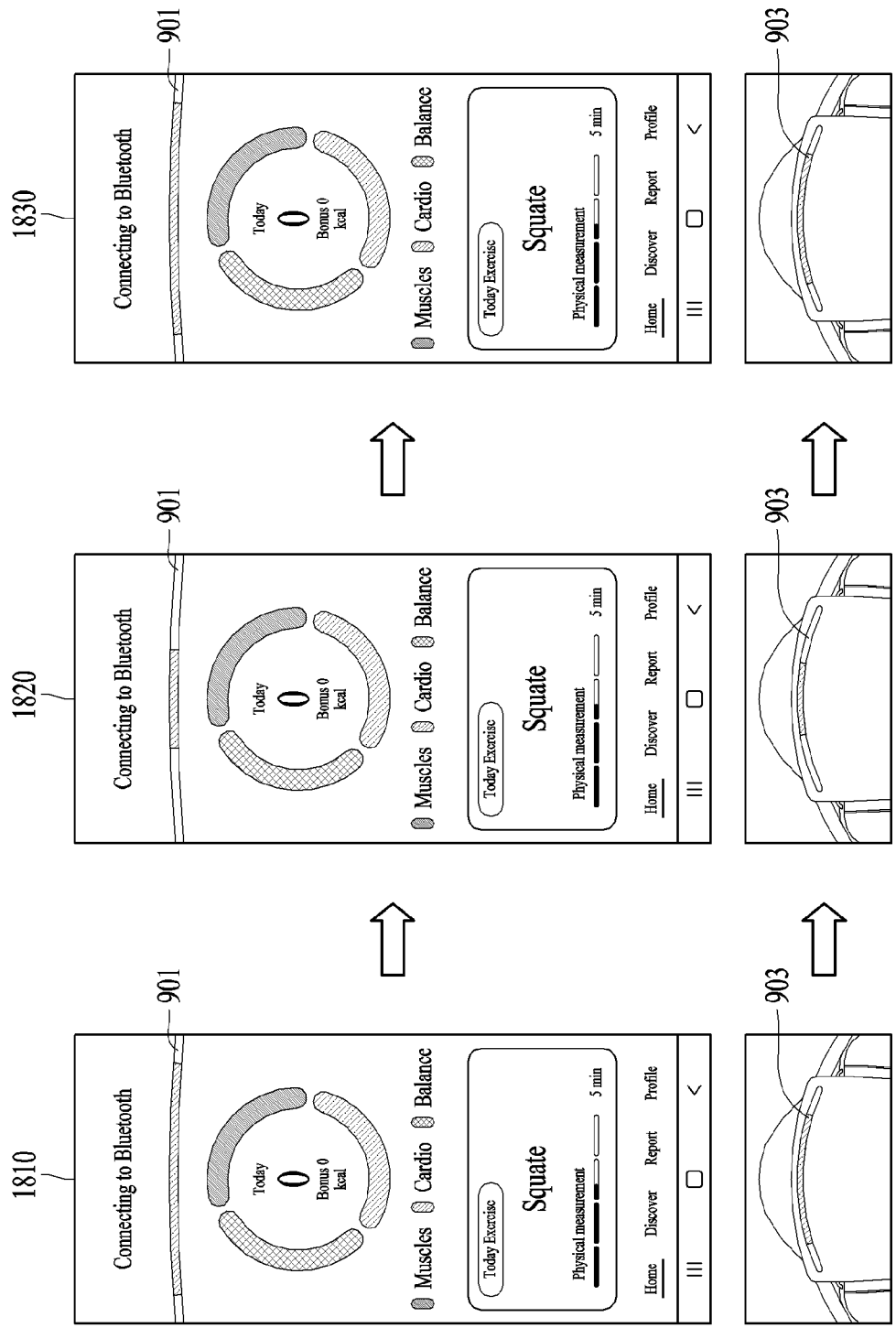
FIG. 18 is a diagram illustrating an example of providing visual feedback when an electronic device establishes a wireless communication link with a wearable device, according to an example embodiment.

FIG. 18 is a diagram illustrating an example of providing visual feedback when an electronic device establishes a wireless communication link with a wearable device, according to an embodiment.

Each of screens 1810 to 1830 of FIG. 18 may be an example of the execution screen 500 of FIG. 5.

In an embodiment, the electronic device 400 may be connecting to the wearable device 300. For example, the processor 410 of the electronic device 400 may receive a connection request from the wearable device 300 through the communication module 420 and may transmit a response to the connection request to the wearable device 300 through the communication module 420, comprising communication circuitry. Alternatively, the processor 410 of the electronic device 400 may transmit a connection request to the wearable device 300 through the communication module 420 and may receive a response to the connection request from the wearable device 300 through the communication module 420.

When the electronic device 400 is connecting to the wearable device 300, the processor 410 of the electronic device 400 may control the display 440 to display the screen 1810 of the fitness application on the display 440. On the first area 510 of the screen 1810, text indicating that the connection is in progress may be displayed on the first area 510 of the screen 1810 and the first object 901, in which a partial area (e.g., a central area) is represented in the second color, may be displayed. When the wearable device 300 is connecting to the electronic device 400, the processor 310 of the wearable device 300 may control the lighting unit 903 to output light of the second color in a partial an area a of the lighting unit 903. The area a of the lighting unit 903 may correspond to an area where the second color is represented in the first object 901 of the screen 1810.

The processor 410 of the electronic device 400 may control the display 440 to provide a visual effect of periodically changing the size of the area where the second color is represented in the first object 901. The processor 310 of the wearable device 300 may control the lighting unit 903 to periodically change the size of the area where the light of the second color is output in the lighting unit 903. The size of the area, in which the second color is represented in the first object 901 in the screen 1820 of FIG. 18, may be less than the size of the area, in which the second color is represented in the first object 901 in the screen 1810. The light of the second color may be output in an area that is narrower than the area a in the lighting unit 903. The size of the area, in which the second color is represented in the first object 901 in the screen 1830 of FIG. 18, may be greater than the size of the area, in which the second color is represented in the first object 901 in the screen 1820. The size of the area, in which the second color is represented in the first object 901 in the screen 1830, may be the same as the size of the area, in which the second color is represented in the first object 901 in the screen 1810. The light of the second color may be output in the area a of the lighting unit 903.

When the connection between the electronic device 400 and the wearable device 300 is completed, the processor 410 may not provide the visual feedback indicating that the connection is in progress.

According to an embodiment, the wearable device 300 may provide the user with auditory feedback and/or haptic feedback along with the visual feedback indicating connection.

In an embodiment, the electronic device 400 may be connected to the smart watch 132 through a wireless communication link. The smart watch 132 may communicate with the electronic device 400 and display, on its display, the visual feedback corresponding to the connection state of the wearable device 300. The smart watch 132 may be synchronized with the electronic device 400. Through such synchronization, the smart watch 132 may display the same screen as the first area 510 of each of the screens 1810 to 1830 of FIG. 18 on its display.

Figure 19:
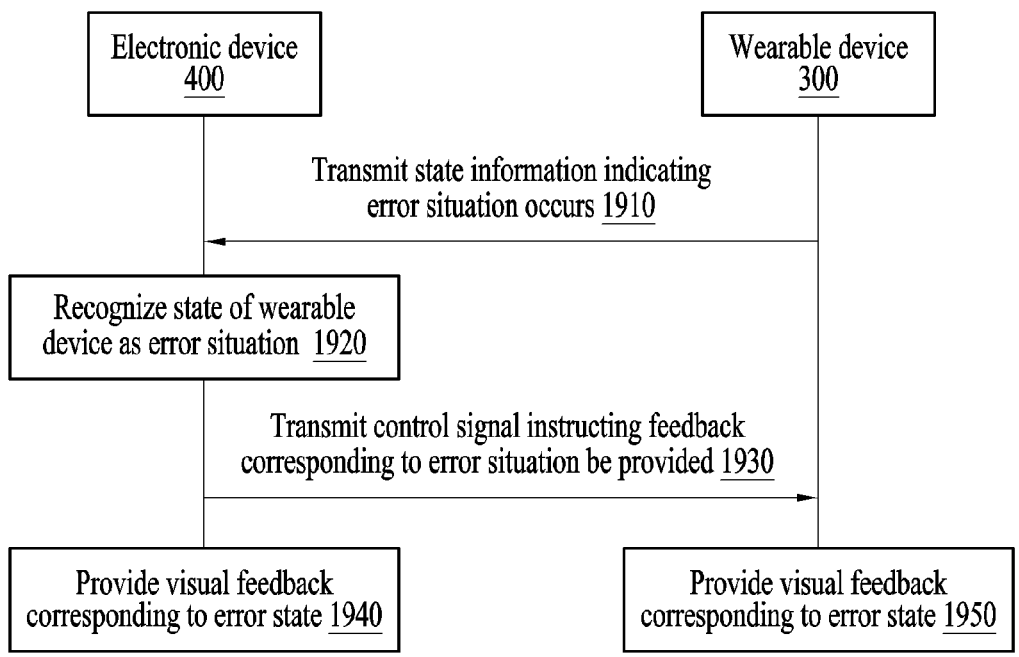
FIGS. 19 and 20 are diagrams illustrating examples of providing visual feedback corresponding to an error state of a wearable device according to an example embodiment(s)
Figure 20:
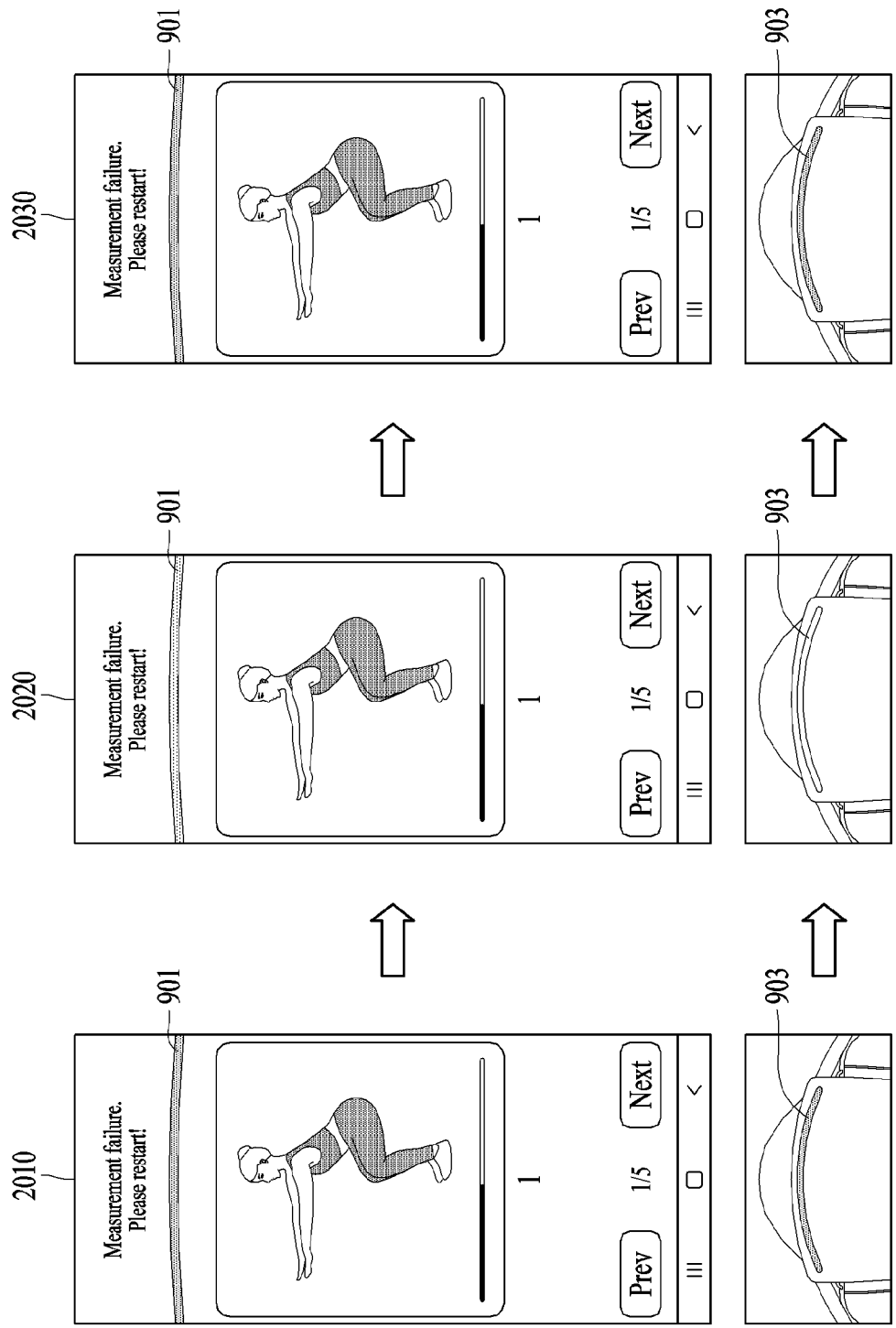

FIGS. 19 and 20 are diagrams illustrating examples of providing visual feedback corresponding to an error state of a wearable device according to an embodiment.

Referring to FIG. 19, in operation 1910, the wearable device 300 may transmit, to the electronic device 400, state information indicating that an error situation occurs. The error situation may include, for example, a situation where an error occurs in the wearable device 300, a situation where an error occurs in connection between the wearable device 300 and the electronic device 400, a situation where a user wears the wearable device 300 incorrectly, a situation where the user falls, and the like.

In operation 1920, upon receipt of the state information indicating that an error situation occurs from the wearable device 300, the electronic device 400 may determine a state of the wearable device 300 as the error state.

In operation 1930, the electronic device 400 may transmit, to the wearable device 300, a control signal instructing that feedback corresponding to the error state be provided.

In operation 1940, the electronic device 400 may provide the user with visual feedback corresponding to the error state. For example, the processor 410 of the electronic device 400 may control the display 440 to periodically change the density of the first color in an object (e.g., the first object 612 or the second object 622) of the first area 510.

In operation 1950, the wearable device 300 may provide the visual feedback corresponding to the error state to the user. For example, the processor 310 of the wearable device 300 may control the lighting unit 903 to blink light of the first color at a high speed. According to an embodiment, the wearable device 300 may provide the user with auditory feedback and/or haptic feedback corresponding to the error state along with the visual feedback.

Examples of operations 1940 and 1950 are described with reference to FIG. 20.

Each of screens 2010 to 2030 of FIG. 20 may be an example of the execution screen 500 of FIG. 5.

In the example shown in FIG. 20, the processor 410 of the electronic device 400 may control the display 440 to display the screen 2010 of the fitness application on the display 440. The first object 901, in which the first color is represented, may be displayed on the first area 510 of the screen 2010.

Corresponding to the first object 901 on the screen 2010, the processor 310 of the wearable device 300 may control the lighting unit 903 to output light of the first color.

The processor 410 of the electronic device 400 may control the display 440 to gradually decrease the density of the first color of the first object 901. The density of the first color of the first object 901 of the screen 2020 may be lower than the density of the first color of the first object 901 of the screen 2010. The processor 310 of the wearable device 300 may control the lighting unit 903 to gradually decrease the light intensity of the lighting unit 903. Corresponding to the first object 901 of the screen 2020, the lighting unit 903 may not output light.

The processor 410 of the electronic device 400 may control the display 440 to increase the density of the first color of the first object 901. The density of the first color of the first object 901 of the screen 2030 may be greater than the density of the first color of the first object 901 of the screen 2020. The processor 310 of the wearable device 300 may control the lighting unit 903 to gradually increase the light intensity of the lighting unit 903. Corresponding to the first object 901 of the screen 2030, the lighting unit 903 may output the light of the first color.

In the error state of the wearable device 300, the electronic device 400 may provide the user with visual feedback (e.g., a visual effect of repeatedly increasing and decreasing the density of the first color in the first object 901) corresponding to the error state. In the error state of the wearable device 300, the wearable device 300 may provide the user with visual feedback (e.g., a visual effect of blinking the light of the first color in the lighting unit 903) corresponding to the error state. Accordingly, the user may easily recognize that the wearable device 300 is in the error state.

In an embodiment, the electronic device 400 may be connected to the smart watch 132 through a wireless communication link. The smart watch 132 may communicate with the electronic device 400 and display, on its display, visual feedback corresponding to the error state of the wearable device 300. The smart watch 132 may be synchronized with the electronic device 400. Through such synchronization, the smart watch 132 may display the same screen as the first area 510 of each of the screens 2010 to 2030 of FIG. 20 on its display.

Figure 21:
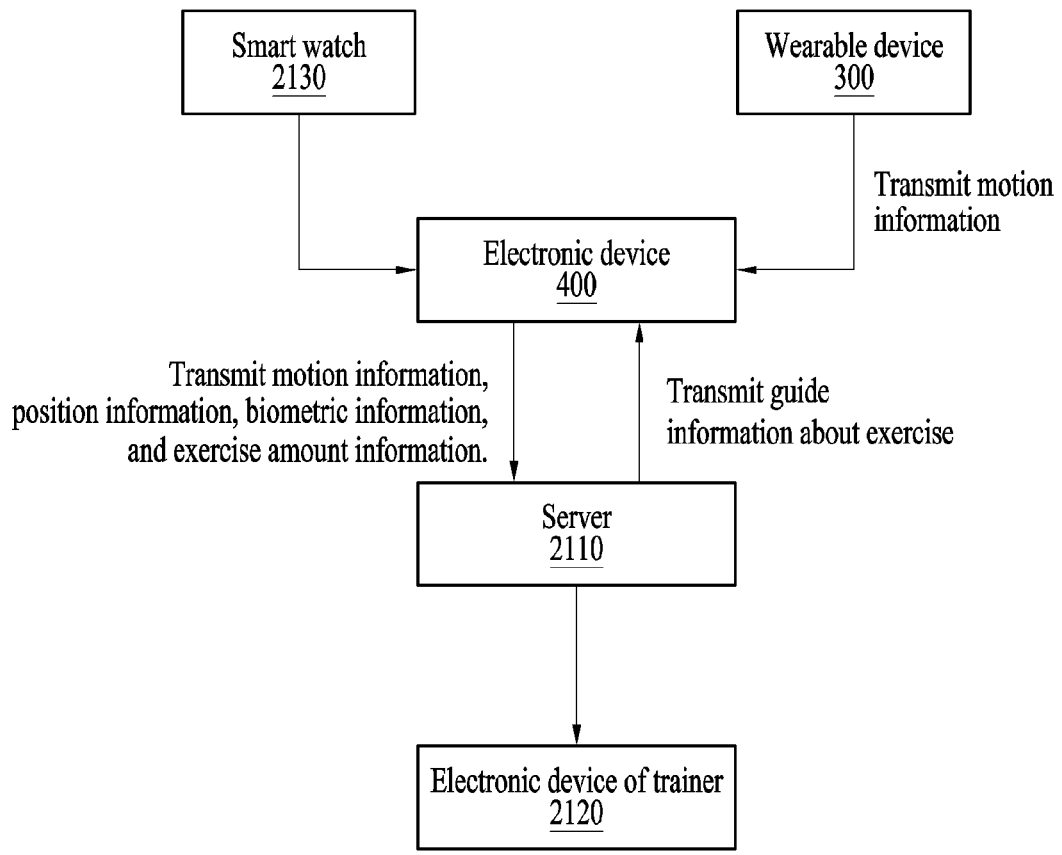
FIG. 21 is a diagram illustrating an example of providing feedback in a system including a wearable device and an electronic device, according to an example embodiment.

FIG. 21 is a diagram illustrating an example of providing feedback in a system including a wearable device and an electronic device according to an embodiment.

Referring to FIG. 21, the electronic device 400 may receive motion information from the wearable device 300.

The electronic device 400 may transmit, to a server 2110 (e.g., the server 140 of FIG. 1B), the motion information, position information of the user, biometric information of the user, and exercise amount information of the user.

The server 2110 may determine guide information about the user's exercise based on the motion information, the position information, the biometric information, and the exercise amount information, which are received, and environment information (e.g., weather, topography, and the like) of an area where the user is. For example, when the user's heart rate is high and the probability of precipitation is high in the area where the user is, the server 2110 may determine guide information indicating exercise suspension.

The server 2110 may transmit the determined guide information to the electronic device 400.

The electronic device 400 may control the display 440 to provide the received guide information through the first area 510 of the screen of the fitness application. The electronic device 400 may display text about the received guide information on the first area 510 and provide the user with visual feedback corresponding to the received guide information through an object (e.g., the first object 612 or the second object 622) in the first area 510. For example, the electronic device 400 may display text indicating the exercise suspension on the first area 510 and display the first object 901, in which a sixth color (e.g., red) is represented.

The electronic device 400 may transmit, to the wearable device 300, a control signal instructing that feedback corresponding to the received guide information be provided. According to the control signal, the wearable device 300 may provide the user with feedback (e.g., visual feedback, auditory feedback, or haptic feedback) corresponding to the received guide information. For example, when the wearable device 300 receives, from the electronic device 400, the control signal instructing that the feedback corresponding to the exercise suspension be provided, the wearable device 300 may control the lighting units 60 and 903 to output light of the sixth color. The wearable device 300 may output an utterance voice of the exercise suspension through its speaker and/or provide the user with haptic feedback corresponding to the exercise suspension through a vibration motor.

The electronic device 400 may transmit the received guide information to a smart watch 2130 (e.g., the smart watch 132 of FIG. 1B). The smart watch 2130 may provide feedback corresponding to the received guide information to the user. For example, when the smart watch 2130 receives the guide information indicating the exercise suspension from the electronic device 400, the smart watch 2130 may display the same screen as the first screen of the electronic device 400 on its display.

The server 2110 may transmit the determined guide information to an electronic device 2120 of a trainer. The server 2110 may transmit, to the electronic device 2120, at least one of biometric information of the user, exercise amount information of the user, and motion information of the user, or a combination thereof together with the determined guide information. The electronic device 2120 may display the information (e.g., guide information, biometric information, exercise amount information, and motion information) received from the server 2110, on its display. The electronic device 2120 may display feedback corresponding to the determined guide information on its display. The trainer may be aware of a situation (e.g., a situation where the user should suspend an exercise) of the user through the feedback displayed on the display of the electronic device 2120. For example, when the user is in a situation where the user needs to suspend the exercise, the trainer may request the user to suspend the exercise.

Although not shown in FIG. 21, the server 2110 may display visual feedback corresponding to the guide information on a web site or a web page.

FIGS. 22 to 26 are diagrams illustrating examples of providing visual feedback corresponding to a user's exercise state, according to an embodiment.

Figure 22:
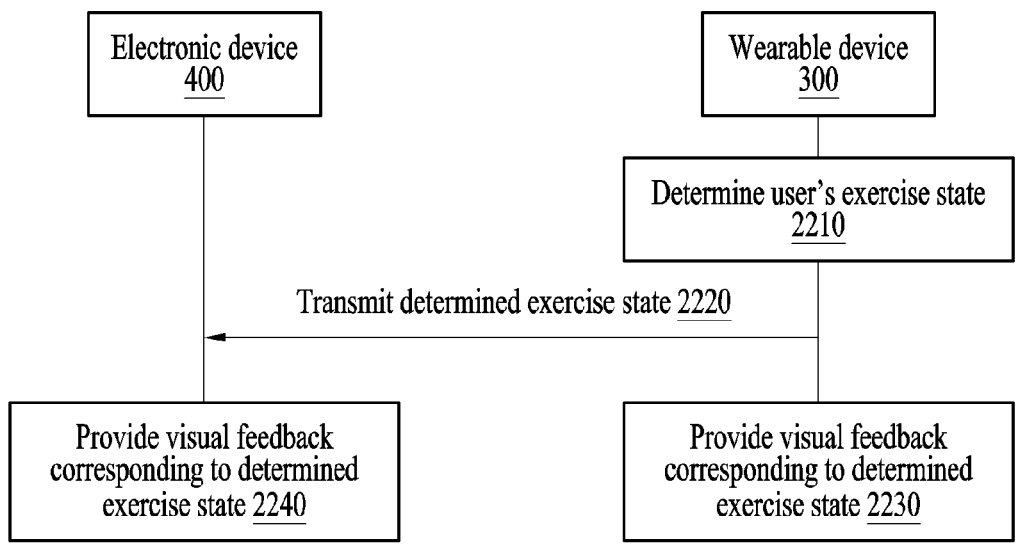
FIGS. 22 to 26 are diagrams illustrating examples of providing visual feedback corresponding to a user's exercise state, according to an example embodiment(s)

Referring to FIG. 22, in operation 2210, the wearable device 300 may determine a user's exercise state (e.g., an exercise speed (or a motion speed), an exercise intensity, and the like).

In an embodiment, the wearable device 300 may calculate an exercise speed value (e.g., a walking speed value) of the user by using a measurement result of a sensor (e.g., the IMU 360). When the calculated exercise speed value is within a speed range (e.g., 4 km/h to 6 km/h), the wearable device 300 may determine that the user's exercise speed is medium. The wearable device 300 may determine that the user's exercise speed is slow when the calculated exercise speed value is less than the speed range (e.g., 4 km/h to 6 km/h). The wearable device 300 may determine that the user's exercise speed is fast when the calculated exercise speed value is greater than the speed range (e.g., 4 km/h to 6 km/h). The exercise speed is categorized into three stages above, but they are only examples. The speed range is not limited to the example described above.

In an embodiment, the electronic device 400 may transmit heart rate information of the user to the wearable device 300. The wearable device 300 may determine the user's exercise intensity through the heart rate information of the user. For example, when the heart rate information of the user is 50 to 60% of the user's maximum heart rate, the wearable device 300 may determine the user's exercise intensity to be an extremely low exercise intensity (or a first exercise intensity). When the user's heart rate information is 60 to 70% of the user's maximum heart rate, the wearable device 300 may determine the user's exercise intensity to be a low exercise intensity (or a second exercise intensity). When the user's heart rate information is 70 to 80% of the user's maximum (or high) heart rate, the wearable device 300 may determine the user's exercise intensity to be a medium exercise intensity (or a third exercise intensity). When the user's heart rate information is 80 to 90% of the user's maximum heart rate, the wearable device 300 may determine the user's exercise intensity to be a high exercise intensity (or a fourth exercise intensity). When the user's heart rate information is 90% or more of the user's maximum heart rate, the wearable device 300 may determine the user's exercise intensity to be an extremely high exercise intensity (or a fifth exercise intensity). The exercise intensity is categorized into 5 stages above, but they are only examples.

In operation 2220, the wearable device 300 may transmit, to the electronic device 400, a determined exercise state (e.g., an exercise speed, an exercise intensity, and the like). The wearable device 300 may transmit a determined exercise speed (e.g., a low speed, a medium speed, or a high speed) to the electronic device 400. The wearable device 300 may transmit a determined exercise intensity (e.g., an extremely low exercise intensity, a low exercise intensity, a medium exercise intensity, a high exercise intensity, or an extremely high exercise intensity) to the electronic device 400.

Operation 2210 is described as being performed by the wearable device 300 above but this is only an example.

Operation 2210 may be performed by the electronic device 400. In an example, the wearable device 300 may transmit a measurement result of a sensor (e.g., the IMU 360) to the electronic device 400. The electronic device 400 may determine a exercise speed (e.g., a low speed, a medium speed, or a fast speed) of the user by using the received measurement result. In another example, the electronic device 400 may determine a exercise intensity (e.g., an extremely low exercise intensity, a low exercise intensity, a medium exercise intensity, a high exercise intensity, or an extremely high exercise intensity) of the user through the user's heart rate information.

In operation 2230, the wearable device 300 may provide visual feedback corresponding to the determined exercise state.

In operation 2240, the electronic device 400 may provide visual feedback corresponding to the determined exercise state.

Examples of operations 2230 and 2240 are described with reference to FIGS. 23 and 24.

Figure 23:
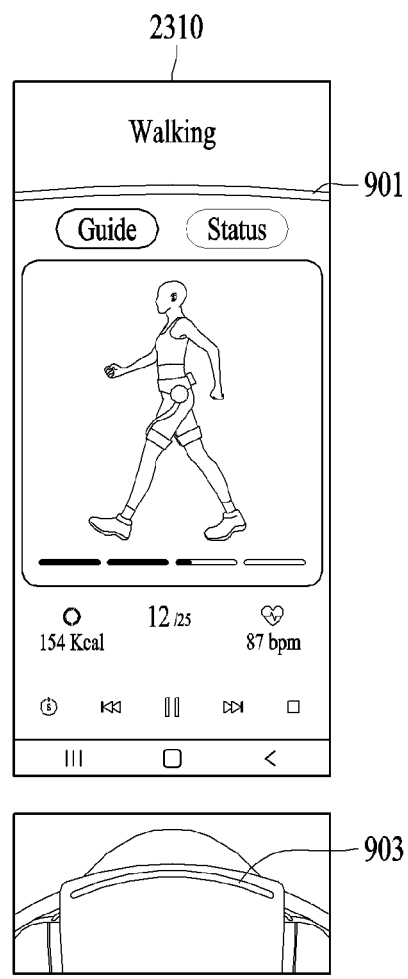

A screen 2310 of FIG. 23 may be an example of the execution screen 500 of FIG. 5.

In the example shown in FIG. 23, the wearable device 300 may provide the user with visual feedback corresponding to a determined exercise state (e.g., an exercise speed) through the lighting unit 903. The electronic device 400 may provide the visual feedback corresponding to the determined exercise state (e.g., an exercise speed) to the user.

For example, the processor 310 of the wearable device 300 may control the lighting unit 903 to perform the second breathing effect described above at a first speed when the user's exercise speed corresponds to a low speed. Correspondingly, when the user's exercise speed corresponds to the low speed, the processor 410 of the electronic device 400 may control the display 440 to provide the first breathing effect described above at the first speed through the first object 901 of the screen 2310.

For example, when the user's exercise speed corresponds to a medium speed, the processor 310 of the wearable device 300 may control the lighting unit 903 to perform the second breathing effect at a second speed. Correspondingly, when the user's exercise speed corresponds to the medium speed, the processor 410 of the electronic device 400 may control the display 440 to provide the first breathing effect at the second speed through the first object 901 of the screen 2310. The second speed may be faster than the first speed.

For example, when the user's exercise speed corresponds to a high speed, the processor 310 of the wearable device 300 may control the lighting unit 903 to perform the second breathing effect at a third speed. Correspondingly, when the user's exercise speed corresponds to the high speed, the processor 410 of the electronic device 400 may control the display 440 to provide the first breathing effect at the third speed through the first object 901 of the screen 2310. The third speed may be faster than the second speed.

An example of providing visual feedback corresponding to the user's exercise intensity is described with reference to FIG. 24.

Figure 24:
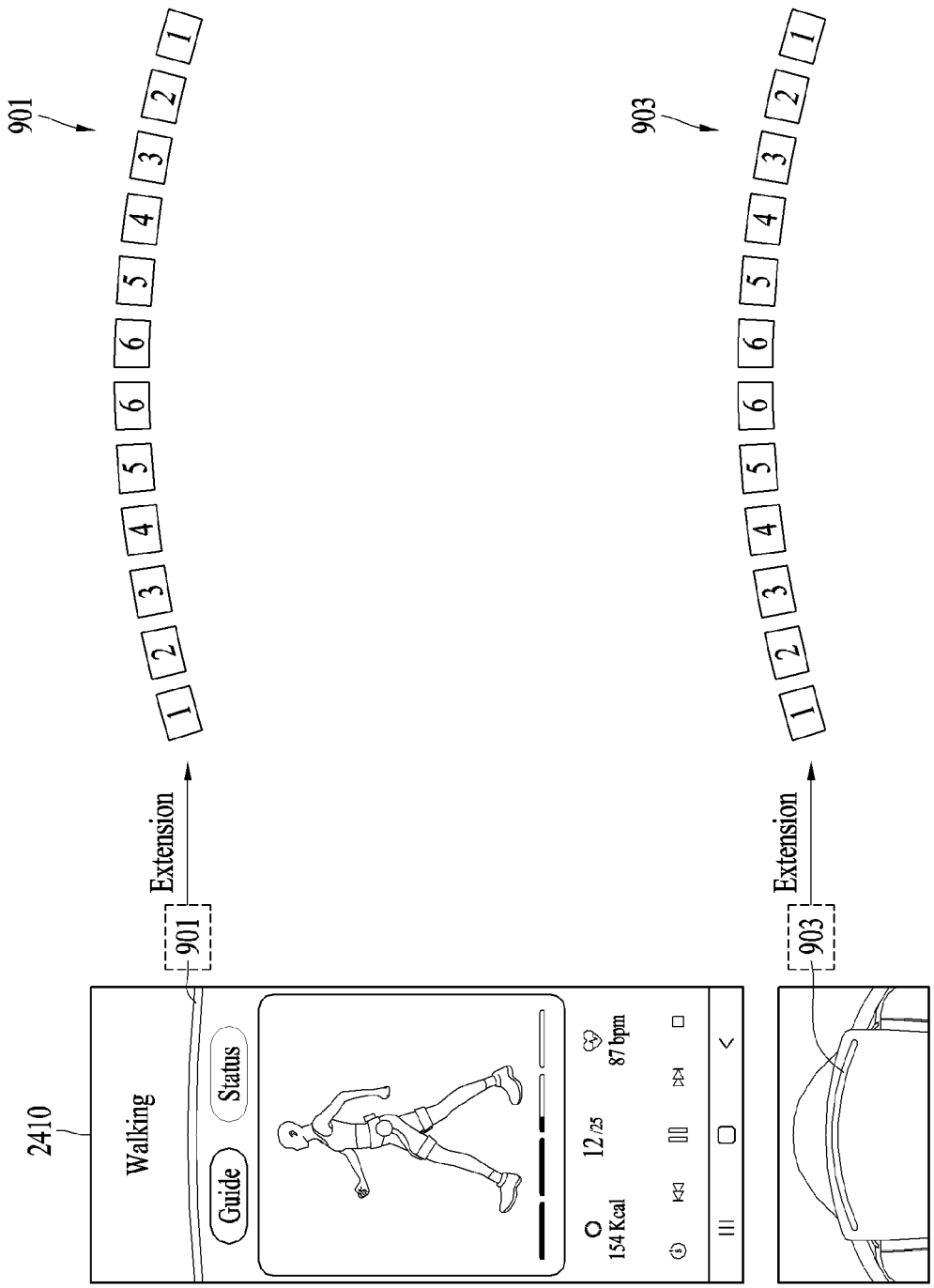

A screen 2410 of FIG. 24 may be an example of the execution screen 500 of FIG. 5.

In the example shown in FIG. 24, the wearable device 300 may provide the user with visual feedback corresponding to a determined exercise state (e.g., an exercise intensity) through the lighting unit 903. The electronic device 400 may provide visual feedback corresponding to the determined exercise state (e.g., an exercise intensity) to the user through the screen 2410.

For example, when the user's exercise intensity corresponds to an extremely low exercise intensity, the processor 310 of the wearable device 300 may control the lighting unit 903, so that light sources in an area (a first area) corresponding to the extremely low exercise intensity in the lighting unit 903 may output the light of the first color. Correspondingly, when the user's exercise intensity corresponds to the extremely low exercise intensity, the processor 410 of the electronic device 400 may control the display 440 to display the first color on an area (a first area) corresponding to the extremely low exercise intensity in the first object 901 of the screen 2410.

For example, when the user's exercise intensity corresponds to a low exercise intensity, the processor 310 of the wearable device 300 may control the lighting unit 903, so that light sources of areas (the first area and a second area) corresponding to the low exercise intensity in the lighting unit 903 may output the light of the first color. Correspondingly, when the user's exercise intensity corresponds to the low exercise intensity, the processor 410 of the electronic device 400 may control the display 440 to display the first color on areas (the first area and a second area) corresponding to the low exercise intensity in the first object 901 of the screen 2410.

For example, when the user's exercise intensity corresponds to a medium exercise intensity, the processor 310 of the wearable device 300 may control the lighting unit 903, so that light sources of areas (the first area, the second area, and a third area) corresponding to the medium exercise intensity in the lighting unit 903 may output the light of the first color. Correspondingly, when the user's exercise intensity corresponds to the medium exercise intensity, the processor 410 of the electronic device 400 may control the display 440 to display the first color on areas (the first area, the second area, and a third area) corresponding to the medium exercise intensity in the first object 901 of the screen 2410.

For example, when the user's exercise intensity corresponds to a high exercise intensity, the processor 310 of the wearable device 300 may control the lighting unit 903, so that light sources of areas (the first area, the second area, the third area, and a fourth area) corresponding to the high exercise intensity in the lighting unit 903 may output the light of the first color. Correspondingly, when the user's exercise intensity corresponds to the high exercise intensity, the processor 410 of the electronic device 400 may control the display 440 to display the first color on areas (the first area, the second area, the third area, and a fourth area) corresponding to the high exercise intensity in the first object 901 of the screen 2410.

For example, when the user's exercise intensity corresponds to an extremely high exercise intensity, the processor 310 of the wearable device 300 may control the lighting unit 903, so that light sources of areas (the first area, the second area, the third area, the fourth area, and a fifth area) corresponding to the extremely high exercise intensity in the lighting unit 903 may output the light of the first color. Correspondingly, when the user's exercise intensity corresponds to the extremely high exercise intensity, the processor 410 of the electronic device 400 may control the display 440 to display the first color on areas (the first area, the second area, the third area, the fourth area, and a fifth area) corresponding to the extremely high exercise intensity in the first object 901 of the screen 2410.

An example of providing visual feedback corresponding to an exercise state (e.g., heart rate information) of the user is described with reference to FIGS. 25 and 26.

Figure 25:
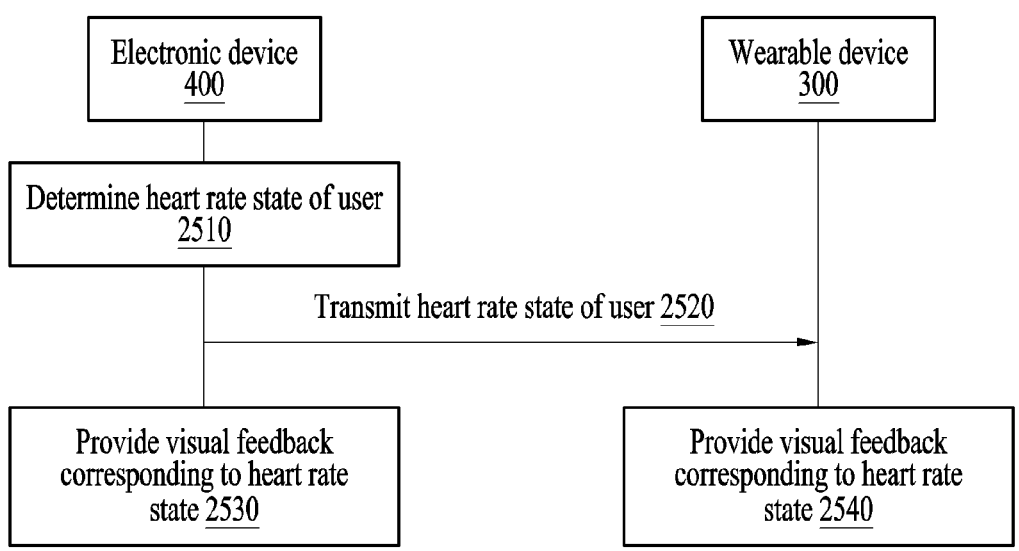

Referring to FIG. 25, in operation 2510, the electronic device 400 may determine a heart rate state of the user. The electronic device 400 may receive heart rate information of the user from the smart watch 132 and determine a heart rate state of the user based on the received heart rate information. For example, when the received heart rate information is 70 to 80% of the maximum heart rate of the user, the electronic device 400 may determine a heart rate state of the user to be a medium state (or a first heart rate state). When the received heart rate information is 80 to 90% of the maximum heart rate of the user, the electronic device 400 may determine a heart rate state of the user to be a hard state (or a second heart rate state). When the received heart rate information is 90% or above of the maximum heart rate of the user, the electronic device 400 may determine a heart rate state of the user to be a maximum state (or a third heart rate state). An example of determining the heart rate state is not limited to the examples described above. In addition, although the heart rate state is categorized into three stages above, they are only examples.

In operation 2520, the electronic device 400 may transmit a heart rate state (e.g., a medium state, a hard state, or a maximum or high state) of the user to the wearable device 300.

In operation 2530, the electronic device 400 may provide visual feedback corresponding to the heart rate state to the user.

In operation 2540, the wearable device 300 may provide the visual feedback corresponding to the heart rate state to the user.

Examples of operations 2530 and 2540 are described with reference to FIG. 26.

Figure 26:
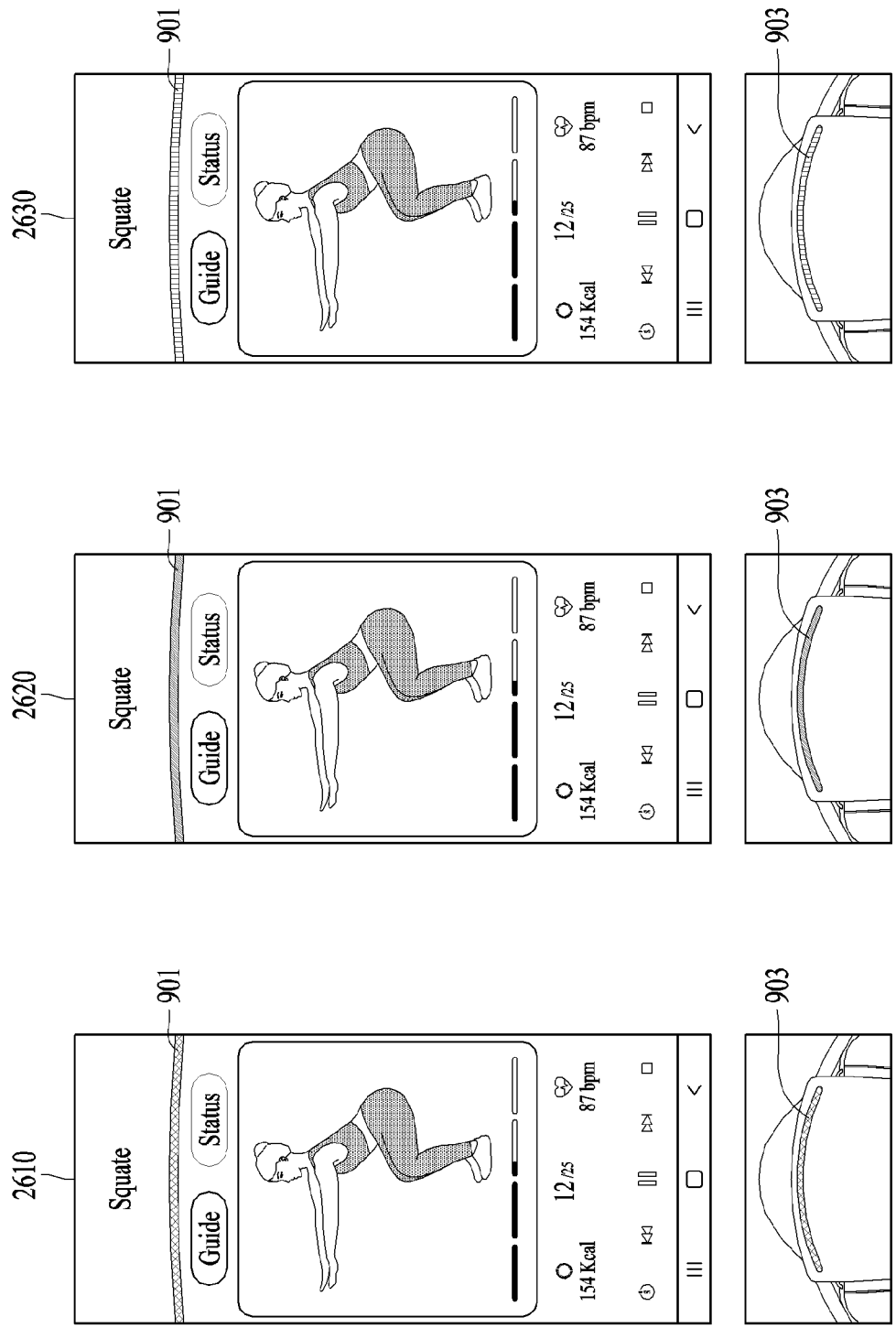

Each of screens 2610 to 2630 of FIG. 26 may be an example of the execution screen 500 of FIG. 5.

In the example shown in FIG. 26, the wearable device 300 may provide visual feedback corresponding to a determined exercise state (e.g., a heart rate state) to the user through the lighting unit 903. The electronic device 400 may provide visual feedback corresponding to a determined exercise state (e.g., a heart rate state) to the user.

For example, the processor 310 of the wearable device 300 may control the lighting unit 903 to output light of a seventh color (e.g., green) when the heart rate state of the user corresponds to a medium state. Correspondingly, when the heart rate state of the user corresponds to the medium state, the processor 410 of the electronic device 400 may control the display 440 to display the seventh color on the first object 901 of the screen 2610.

For example, the processor 310 of the wearable device 300 may control the lighting unit 903 to output light of an eighth color (e.g., yellow) when the heart rate state of the user corresponds to a hard state. Correspondingly, when the heart rate state of the user corresponds to the hard state, the processor 410 of the electronic device 400 may control the display 440 to display the eighth color on the first object 901 of the screen 2620.

For example, the processor 310 of the wearable device 300 may control the lighting unit 903 to output light of a ninth color (e.g., orange) when the heart rate state of the user corresponds to a maximum or high state. Correspondingly, when the heart rate state of the user corresponds to the maximum or high state, the processor 410 of the electronic device 400 may control the display 440 to display the ninth color on the first object 901 of the screen 2630.

Figure 27:
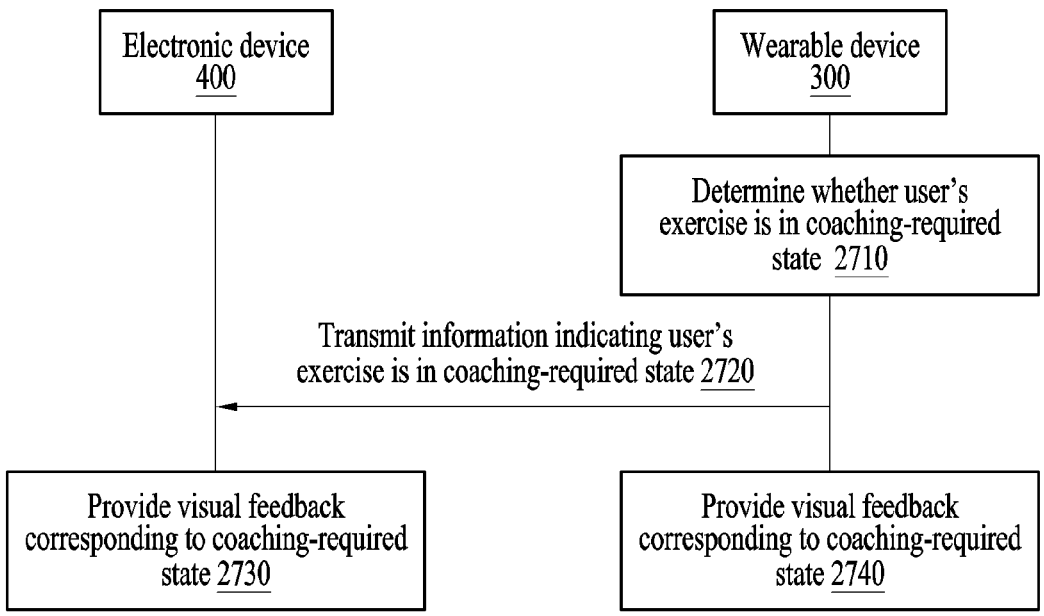
FIGS. 27 and 28 are diagrams illustrating examples of providing visual feedback corresponding to a coaching required state when a user's exercise is in the coaching required state, according to an example embodiment(s)
Figure 28:
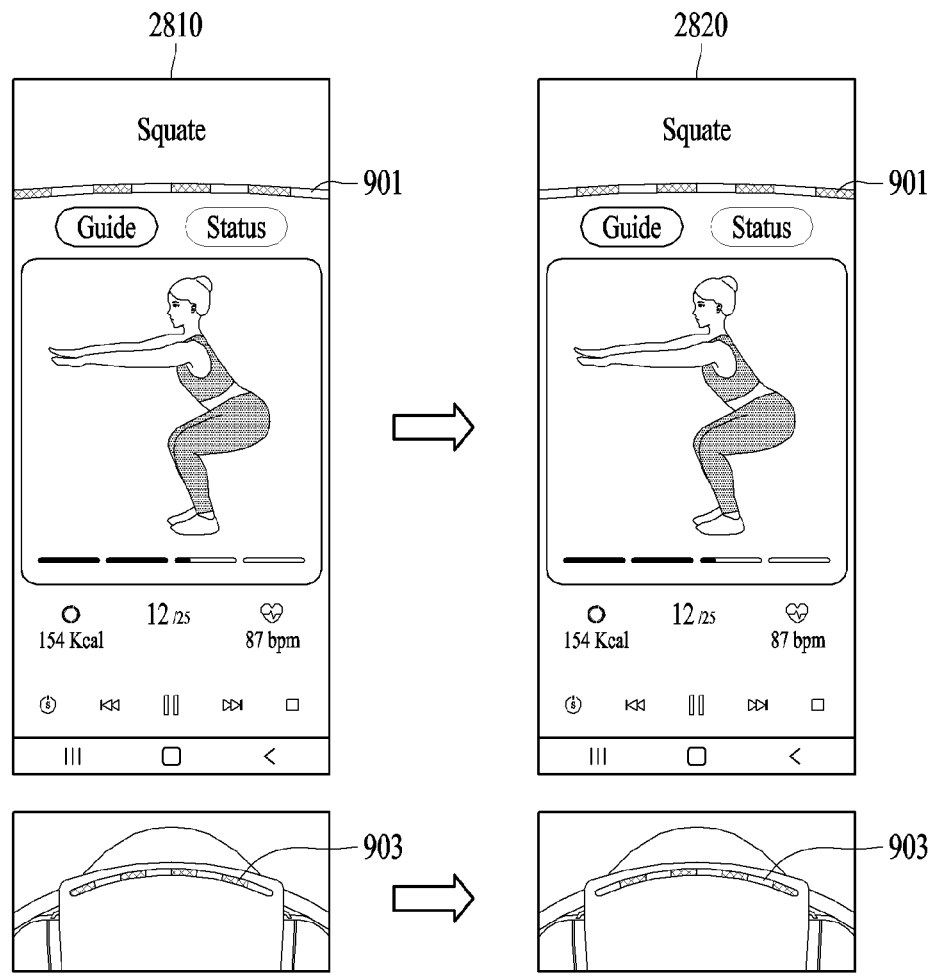

FIGS. 27 and 28 are diagrams illustrating examples of providing visual feedback corresponding to a coaching-required state when a user's exercise is in a coaching-required state, according to an embodiment.

Referring to FIG. 27, in operation 2710, the wearable device 300 may determine whether the user's exercise is in coaching-required state. For example, the wearable device 300 may determine that the user's exercise is in the coaching-required state when an exercise pose of the user is incorrect more than a predetermined number of times.

In operation 2720, the wearable device 300 may transmit, to the electronic device 400, information indicating that the user's exercise is in the coaching-required state.

In operation 2730, the electronic device 400 may provide the user with visual feedback corresponding to the coaching-required state.

In operation 2740, the wearable device 300 may provide the user with the visual feedback corresponding to the coaching-required state.

Examples of operations 2730 and 2740 are described with reference to FIG. 28.

Each of screens 2810 to 2820 of FIG. 28 may be an example of the execution screen 500 of FIG. 5.

In the example shown in FIG. 28, when the processor 410 of the electronic device 400 receives, from the wearable device 300, information indicating that the user is in the coaching-required state, the processor 410 of the electronic device 400 may control the display 440 to display the screen 2810 of the fitness application on the display 440. The first object 901, in which a partial area is represented in a tenth color (e.g., purple), may be displayed on the first area 510 of the screen 2810.

When the processor 310 of the wearable device 300 transmits, to the electronic device 400, the information indicating that the user is in the coaching-required state, the processor 310 of the wearable device 300 may control the lighting unit 903 to output light of the tenth color on the partial area of the lighting unit 903. The area where the light of the tenth color is output in the lighting unit 903 may correspond to the area where the tenth color is represented in the first object 901 of the screen 2810.

The processor 410 of the electronic device 400 may control the display 440 to provide a visual effect of moving the area where the tenth color is represented in the first object 901. Accordingly, the screen 2820 of FIG. 28 may be displayed on the display 440.

The processor 310 of the wearable device 300 may control the lighting unit 903 to provide a visual effect of moving the area where the light of the tenth color is output in the lighting unit 903.

A trainer may easily recognize that the user is in the coaching-required state by the lighting of the lighting unit 903 of the wearable device 300.

Figure 29:
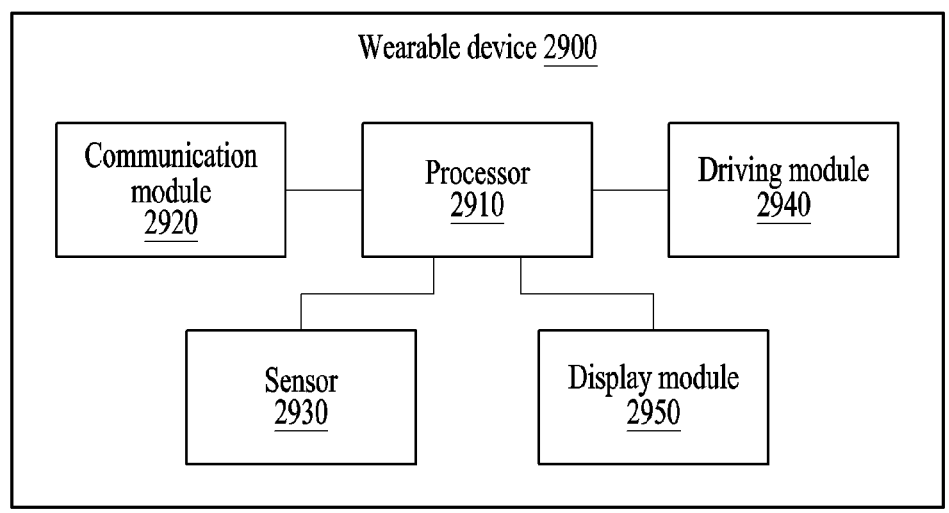
FIG. 29 illustrates an example of a wearable device according to an example embodiment.

FIG. 29 illustrates an example of a wearable device according to an embodiment.

Referring to FIG. 29, a wearable device 2900 (e.g., the wearable devices 120, 200, 300, and 300-1) may include a processor 2910 (e.g., the processor 310), a communication module 2920 (e.g., the communication module 390 comprising communication circuitry), a sensor 2930, a driving module 2940 (e.g., the driving module 30 comprising a motor and/or circuitry), and a display module 2950.

The communication module 2920 may establish a wireless communication link with the electronic device 400.

The sensor 2930 may include the IMU 360 and/or the angle sensors 320 and/or 320-1.

The sensor 2930 may acquire motion information by sensing the user's motion.

The driving module 2940 may generate torque to provide an external force to the user.

The display module 2950 may include the lighting units 60 and 903.

The processor 2910 may transmit first state information indicating that the wearable device 2900 is in a sensing state for sensing a motion of the user to the electronic device 400 through the communication module 2920. The processor 2910 may control the display module 2950 to provide visual feedback corresponding to the sensing state through the display module 2950. For the visual feedback corresponding to the sensing state, the processor 2910 may control the lighting units 60 and 903 to sequentially output light of colors.

The processor 2910 may determine control information used to generate torque by using at least some of the obtained motion information. The processor 2910 may control the driving module 2940 based on control information with respect to which it is determined to provide an external force to the user.

The processor 2910 may transmit, to the electronic device 400, second state information indicating that the wearable device 2900 is in a booting state, through the communication module 2920. The processor 2910 may control the display module 2950 to provide visual feedback corresponding to the booting state through the display module 2950 (e.g., the lighting unit 60 or 903).

The processor 2910 may transmit, to the electronic device 400, third state information indicating that the wearable device 2900 is in a state of charge through the communication module 2920. The processor 2910 may control the display module 2950 to provide visual feedback corresponding to the state of charge through the display module 2950 (e.g., the lighting unit 60 or 903).

The processor 2910 may receive, from the electronic device 400, a control signal instructing the wearable device 2900 to perform scanning for determining whether the user is in a ready state of exercise start, through the communication module 2920. The processor 2910 may transmit, to the electronic device 400, fourth state information indicating that the wearable device 2900 is in a scanning state for performing scanning, through the communication module 2920. The processor 2910 may perform the scanning based on the received control signal and control the display module 2950 to provide visual feedback corresponding to the scanning state through the display module 2950 (e.g., the lighting unit 60 or 903).

The processor 2910 may evaluate a motion pose of the user by using at least some of the obtained motion information (e.g., a measurement result of the IMU 360 or angle information of each of the angle sensors 320 and/or 320-1). The processor 2910 may transmit, to the electronic device 400, fifth state information indicating that the wearable device 2900 is in an utterance state for outputting an evaluation result of an exercise pose in an utterance voice and the evaluation result of the exercise pose, through the communication module 2920. The processor 2910 may output the utterance voice through the speaker of the wearable device 2900. The processor 2910 may control the display module 2950 to provide visual feedback corresponding to the utterance state through the display module 2950 (e.g., the lighting unit 60 or 903).

The examples described above with reference to FIGS. 1A to 28 may be applied to the wearable device of FIG. 29.

An example of controlling the wearable device 300 by the smart watch 132 is described below.

"The smart watch 132 transmits A to the wearable device 300" may include "the smart watch 132 transmits A to the electronic device 400 and the electronic device 400 transmits A to the wearable device 300". That is, "the smart watch 132 transmits A to the wearable device 300" may include "the smart watch 132 transmits A to wearable device 300 through the electronic device 400". "The wearable device 300 transmits B to the smart watch 132" may include "the wearable device 300 transmits B to the electronic device 400 and the electronic device 400 transmits B to the smart watch 132". That is, "the wearable device 300 transmits B to the smart watch 132" may include "the wearable device 300 transmits B to the smart watch 132 through the electronic device 400". However, the present disclosure is not limited thereto, and the smart watch 132 may be directly connected to the wearable device 300 through a wireless communication link.

Figure 30:
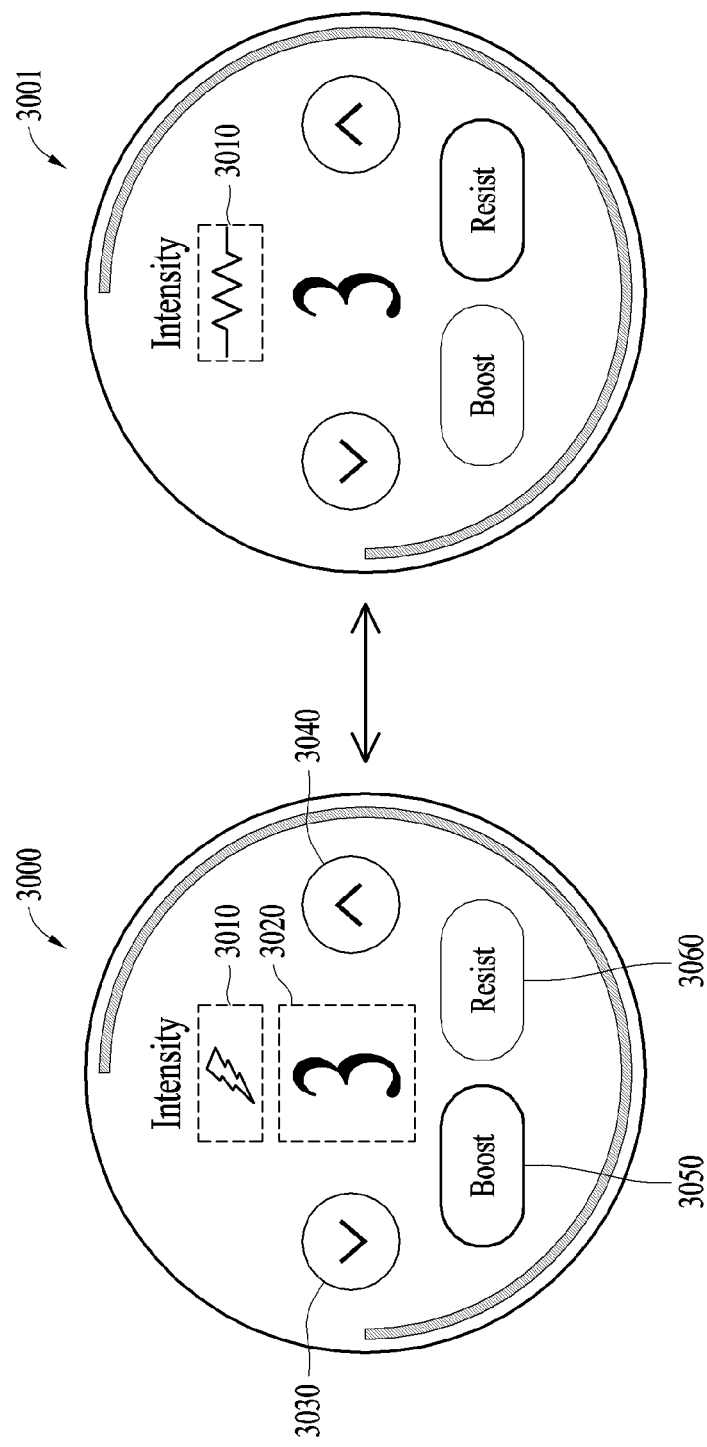
FIG. 30 is a diagram illustrating an example of controlling a wearable device by a smart watch, according to an example embodiment.

FIG. 30 is a diagram illustrating an example of controlling a wearable device by a smart watch, according to an embodiment.

Referring to FIG. 30, the smart watch 132 may display a screen 3000 for controlling (or setting) an operation mode (e.g., a boost mode or a resist mode) of the wearable device 300 on a display of the smart watch 132.

The screen 3000 may include an area 3010 displaying an object corresponding to an operation mode (e.g., a boost mode or a resist mode) of the wearable device 300, an area 3020 displaying an exercise intensity value (or a level), an intensity decrease button 3030, an intensity increase button 3040, a button 3050 for setting a boost mode, and a button 3060 for setting a resist mode.

The boost mode may indicate a mode in which the wearable device 300 provides an assistive force to the user. The resist mode may indicate a mode in which the wearable device 300 provides resistance to the user.

The smart watch 132 may display an object corresponding to the boost mode on the area 3010. A lightning-shaped object may be displayed as the object corresponding to the boost mode on the area 3010 of the screen 3000 of FIG. 30. However, this is only an example, and the object corresponding to the boost mode is not limited thereto.

The smart watch 132 may display a numerical value (or a level) of exercise intensity on the area 3020. The exercise intensity may be related to the intensity of force (e.g., a resistance force or an assistive force) provided to the user by the wearable device 300. In the example shown in FIG. 30, the numerical value (or level) of exercise intensity is 3. The maximum value may be, for example, 5, and the minimum value may be, for example, 1.

The smart watch 132 may transmit, to the wearable device 300, a control signal instructing that the exercise intensity be lowered (or the force intensity be lowered) when there is the user's input to the intensity decrease button 3030. The smart watch 132 may transmit the reduced exercise intensity to the wearable device 300. In the example shown in FIG. 30, when there is the user's input to the intensity decrease button 3030, the smart watch 132 may transmit, to the wearable device 300, a control signal instructing that the exercise intensity be lowered from 3 to 2 (or the force intensity be lowered from a force intensity corresponding to 3 to 2). According to the control signal, the wearable device 300 may lower the force intensity (e.g., an assistive force) provided to the user. That is, the smart watch 132 may transmit a reduced exercise intensity of "2" to the wearable device 300. The wearable device 300 may determine a gain according to the reduced exercise intensity of "2" and determine control information c(t) based on the determined gain, a state factor, and delay. The wearable device 300 may generate an assistive force based on the determined control information τ(t) and provide the generated assistive force to the user.

The smart watch 132 may transmit, to the wearable device 300, a control signal instructing that the exercise intensity be increased (or the force intensity be increased) when there is the user's input to the intensity increase button 3040. The smart watch 132 may transmit an increased exercise intensity to the wearable device 300. In the example shown in FIG. 30, when there is the user's input to the intensity increase button 3040, the smart watch 132 may transmit, to the wearable device 300, a control signal instructing that the exercise intensity be increased from 3 to 4 (or the force intensity be increased from a force intensity corresponding to 3 to 4). According to the control signal, the wearable device 300 may increase the force intensity provided to the user. That is, the smart watch 132 may transmit an increased exercise intensity of "4" to the wearable device 300. The wearable device 300 may determine a gain according to the increased exercise intensity of "4" and determine control information τ(t) based on the determined gain, a state factor, and delay. The wearable device 300 may generate an assistive force based on the determined control information τ(t) and provide the generated assistive force to the user.

When the exercise intensity is set and the user performs an input on the button 3060 for setting the resist mode, the smart watch 132 may transmit, to the wearable device 300, a changed operation mode of "the resist mode" and a set exercise intensity (e.g., 3) and may display a screen 3001 on its display. The smart watch 132 may display an object corresponding to the resist mode on an area 3010 of the screen 3001. Although the symbol of the resistance element is displayed as the object corresponding to the resist mode on the area 3010 of the screen 3001 of FIG. 30, this is only an example. The object corresponding to the resist mode may not be limited thereto.

When the wearable device 300 receives the changed operation mode of the "resist mode" and the set exercise intensity (e.g., 3) from the smart watch 132, the wearable device 300 may change the gain from a positive gain to a negative gain and determine the size of the negative gain according to the set exercise intensity (e.g., 3). The wearable device 300 may change the sign of the gain from positive (+) to negative (−) and determine the size of the negative gain according to the set exercise intensity (e.g., 3). The wearable device 300 may determine control information τ(t) based on the determined gain, the state factor, and the delay and generate a resistance force based on the determined the control information τ(t) to be provided to the user.

In an embodiment, the smart watch 132 may display a screen (e.g., a screen 3100 of FIG. 31A to be described below) on its display while the user is exercising. While the wearable device 300 is operating in a boost mode, the smart watch 132 may sense the user's input for adjusting an exercise intensity (or changing an operation mode of the wearable device 300). In this case, the smart watch 132 may display the screen 3000 of FIG. 30 on its display. When the smart watch 132 is displaying the screen 3000 of FIG. 30 and there is the user's input to a physical button (e.g., a physical back button), the smart watch 132 may display a screen 3220 of FIG. 31A on the display. While the wearable device 300 is operating in a resist mode, the smart watch 132 may sense the user's input for adjusting an exercise intensity (or changing an operation mode of the wearable device 300). In this case, the smart watch 132 may display the screen 3001 of FIG. 30 on its display. While the smart watch 132 is displaying the screen 3001 of FIG. 30 and the user inputs a physical button (e.g., a physical back button), the smart watch 132 may display the screen 3100 of FIG. 31A on its display.

FIGS. 31A to 33 are diagrams illustrating other examples of controlling a wearable device by a smart watch, according to an embodiment.

Figure 31A:
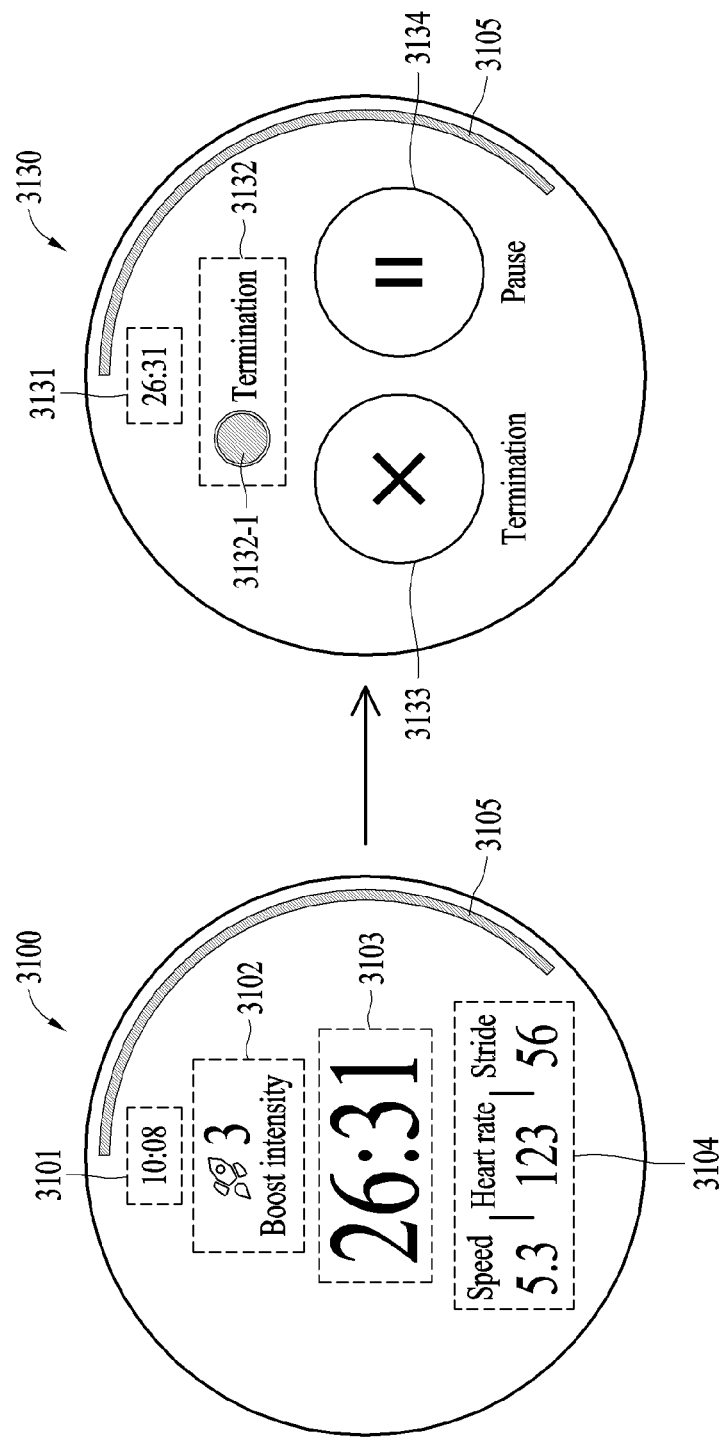
FIGS. 31A to 33 are diagrams illustrating other examples of controlling a wearable device by a smart watch, according to an example embodiment(s)

Referring to FIG. 31A, the smart watch 132 may display the screen 3100 indicating an exercise situation of the user on the display of the smart watch 132. For example, when the smart watch 132 receives, from the wearable device 300, a notification that the user is in a ready state of exercise start (or when a workout section to be described later starts), the smart watch 132 may display the screen 3100 on its display.

The screen 3100 may include an area 3101 displaying time, an area 3102 displaying an operation mode (e.g., a boost mode or a resist mode) of the wearable device 300 and an exercise intensity value, and an area 3103 displaying an exercise time, an area 3104 displaying an exercise indicator and/or biometric information (e.g., heart rate information), and a progress bar 3105 displaying an exercise progress rate of the user. The exercise indicator may indicate information used for indicating an exercise state of the user or evaluating the user's exercise. The exercise progress rate may indicate a ratio between the user's exercise time and a target time.

According to an embodiment, at least one of the area 3101, the area 3102, the area 3103, the area 3104, and the progress bar 3105 in the screen 3100 may be omitted.

The smart watch 132 may display time on the area 3101.

The smart watch 132 may display the operation mode of the wearable device 300 and the numerical value (or level) of the exercise intensity on the area 3102. In the example shown in FIG. 31A, the operation mode of the wearable device 300 may be a boost mode and provide an assistive force corresponding to an exercise intensity of "3" in the boost mode. The smart watch 132 may display the exercise intensity of 3 and an object (e.g., a rocket-shaped object) corresponding to the boost mode on the area 3102.

The smart watch 132 may display the user's exercise time on the area 3103.

The smart watch 132 may display an exercise index of the user and/or biometric information of the user on the area 3104. The exercise index may include, for example, an exercise speed (e.g., a motion speed, a walking speed, and the like), a stride, a walking distance (or a distance the user moves during an exercise), a step count, a gait symmetry index, a gait variability index, and the like but the exercise index is not limited thereto. The gait symmetry index may represent, for example, a difference between a left stride and a right stride of the user or a difference between a walking time of the user's left stride and a walking time of the user's right stride. The gait variability index may represent, for example, regularity or variability of the user's repetitive walking motion.

The smart watch 132 may obtain heart rate information of the user by using a heart rate sensor and display the obtained heart rate information on the area 3104. The smart watch 132 may receive an exercise index (e.g., a walking speed and a stride) of the user from the wearable device 300 and display the received exercise index on the area 3104.

When there is the user's input (or the user's gesture input) (e.g., a swipe input in a first direction) to the screen 3100, the smart watch 132 may display a screen 3130 on the display of the smart watch 132. The first direction may indicate, for example, a direction from right to left but is not limited thereto. According to implementation, the first direction may represent a direction from left to right.

The screen 3130 may include an area 3131 displaying an exercise time of the user, an area 3132 displaying a name of an exercise (an exercise program) performed by the user and/or an object corresponding to an exercise, a termination button 3133, a pause button 3134, and a progress bar 3105.

The smart watch 132 may display the user's exercise time on the area 3131.

On the area 3132, the smart watch 132 may display a name of an exercise (or an exercise program) being performed by the user and/or an object 3132-1 corresponding to an exercise. For example, the user may be performing a walking exercise. On the area 3132, the smart watch 132 may display an object corresponding to the walking exercise and "walking exercise," which is the name of the exercise being performed by the user.

When there is the user's input to the termination button 3133, the smart watch 132 may transmit a signal indicating operation suspension (e.g., suspension of providing an assistive force or a resistance force to the user) of the wearable device 300. According to the signal, the wearable device 300 may terminate or suspend the provision of force.

When there is the user's input to the termination button 3133, the smart watch 132 may display a screen for an exercise performance result (or a screen for exercise termination) (e.g., a screen 3300 of FIG. 33 to be described below).

When there is the user's input to the pause button 3134, the smart watch 132 may transmit, to the wearable device 300, a signal instructing that the provision of force (e.g., an assistive force or a resistance force) be paused. According to the signal, the wearable device 300 may pause the provision of the force.

Figure 31B:
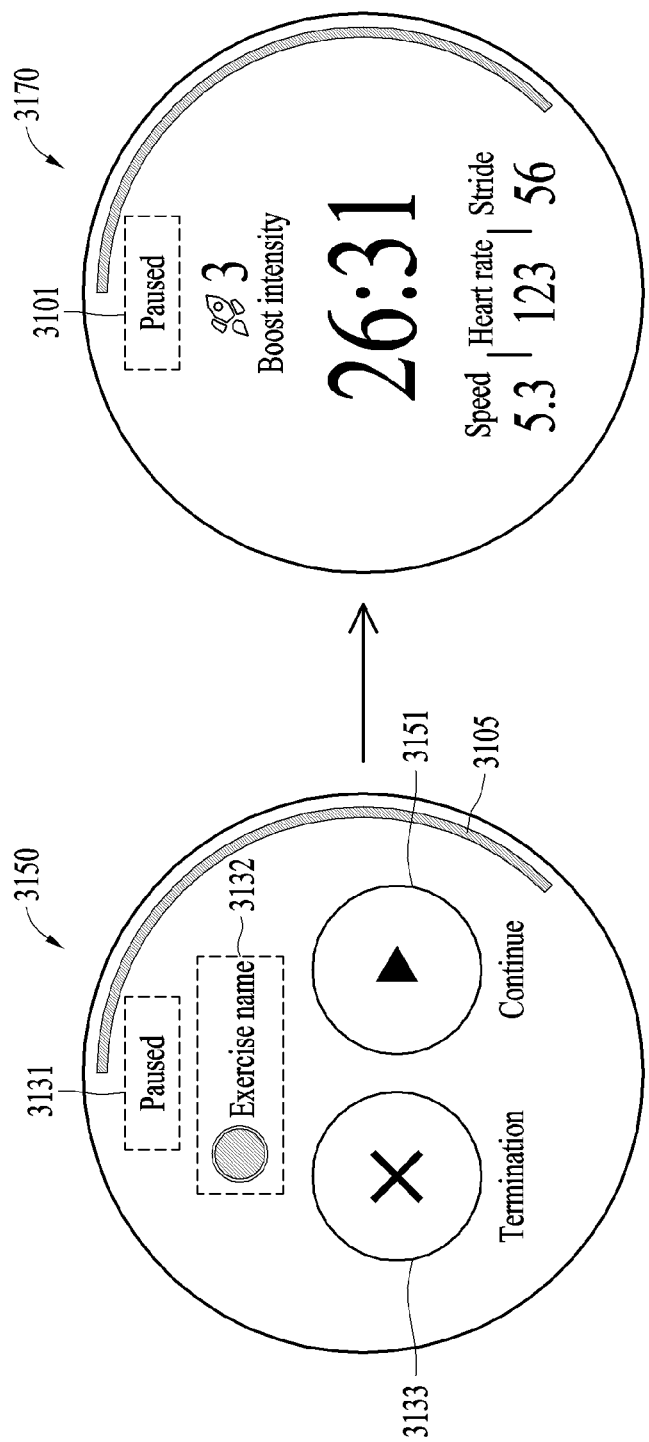

When there is the user's input to the pause button 3134, the smart watch 132 may display a screen 3150 of FIG. 31B on the display of the smart watch 132.

On the screen 3150, the smart watch 132 may display text "pause" on an area 3131. When there is the user's input to the pause button 3134, the smart watch 132 may display the text "pause" instead of the user's exercise time on the area 3131. However, the scope is not limited thereto, and the smart watch 132 may display the text "pause" and time (e.g., a current time or the user's exercise time) on the area 3131 of the screen 3150.

On the screen 3150, the smart watch 132 may display a continue button 3151.

When there is the user's input to the continue button 3151, the smart watch 132 may transmit, to the wearable device 300, a signal instructing the provision of force (e.g., an assistive force or a resistance force) be resumed. According to the signal, the wearable device 300 may resume the provision of the force.

The smart watch 132 may display a screen 3170 on the display of the smart watch 132 when there is no user's input to the continue button 3151 and there is the user's input (or the user's gesture input) (e.g., a swipe input in a second direction) to the screen 3150. The second direction may be opposite to the first direction. The second direction may indicate, for example, a direction from left to right but is not limited thereto. According to implementation, the second direction may represent a direction from right to left.

The smart watch 132 may display text "pause" on an area 3101 of the screen 3170. Since it is a state where there is the user's input to the pause button 3134, the smart watch 132 may display the text "pause" instead of time on the area 3101. However, the present disclosure is not limited thereto, and the smart watch 132 may display the text "pause" and the time on the area 3101 of the screen 3170.

Figure 32:
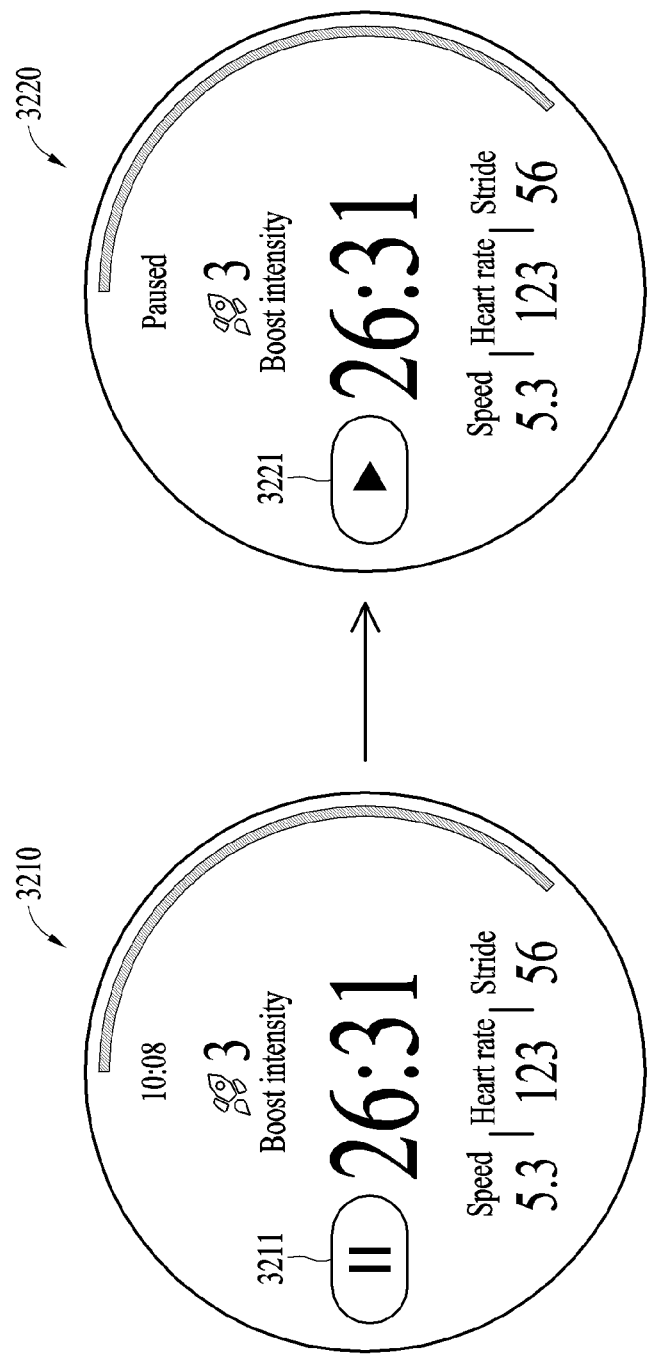

In an embodiment, the smart watch 132 may display a screen 3210 of FIG. 32 on the display of the smart watch 132 when there is the user's input to a partial area (e.g., a partial area other than the area 3104) of the screen 3100 of FIG. 31A.

The screen 3210 of FIG. 32 may be the same as the screen 3100 of FIG. 31A and may further include a pause button 3211.

When there is the user's input to the pause button 3211, the smart watch 132 may transmit, to the wearable device 300, a signal instructing that the provision of force (e.g., an assistive force or a resistance force) be paused. According to the signal, the wearable device 300 may pause the provision of the force.

The smart watch 132 may display the screen 3220 of FIG. 32 on the display of the smart watch 132 when there is the user's input to the pause button 3211.

The screen 3220 may be the same as the screen 3170 of FIG. 31B and may further include a continue button 3221. When there is the user's input to the continue button 3221, the smart watch 132 may transmit, to the wearable device 300, a signal instructing the provision of force (e.g., an assistive force or a resistance force) be resumed. According to the signal, the wearable device 300 may resume the provision of the force.

In an embodiment, the smart watch 132 may display a screen 3300 indicating an exercise performance result on the display of the smart watch 132 when there is the user's input to the termination button 3133 of the screen 3130 of FIG. 31A. When there is the user's input to the termination button 3133, a workout section may terminate and the smart watch 132 may display the screen 3300 indicating the exercise performance result of the user on the display of the smart watch 132.

The workout section may correspond to a target time set for the user to perform an exercise according to an exercise program (or a target exercise program). The workout section may be, for example, a time period from the start of the target time to the end of the target time. For example, when the target time is set to 30 minutes, the workout section may be a target time of 30 minutes. According to an embodiment, the exercise may terminate in the middle of the target time. When there is the user's input to the termination button 3133, the exercise may terminate in the middle of the target time. In this case, a time period from the start of the target time to the end of the exercise may correspond to the workout section.

The sensing state and/or the utterance state of the wearable device 300 described above may be included in the workout section.

A section other than the workout section may be referred to as a non-workout section. For example, at least some or all of the booting state, the state of charge, and the scanning state of the wearable device 300, which are described above, may be included in the non-workout section.

Figure 33:
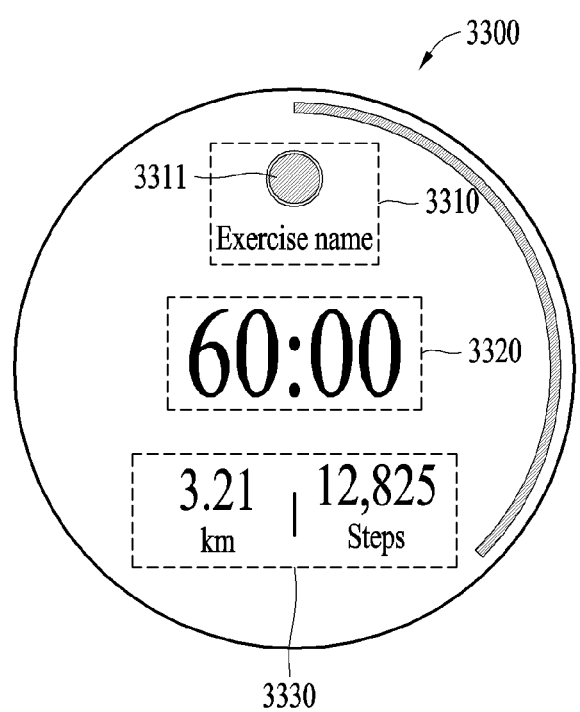

In the example shown in FIG. 33, the screen 3300 may include an area 3310 displaying a name of an exercise (or an exercise program) performed by the user in the workout section and/or an area 3311 displaying an object corresponding to an exercise; an area 3320 displaying time corresponding to the workout section; and an area 3330 displaying an exercise index (e.g., the total distance traveled by the user during an exercise, a step count, and the like) in the workout section.

As described in detail with reference to FIGS. 54 to 59, when the workout section terminates, the smart watch 132 may receive an exercise index during the workout section from the wearable device 300 and display the received exercise index on the area 3330.

FIGS. 34 to 37 are diagrams illustrating examples of displaying information of a smart watch, according to an embodiment.

Figure 34:
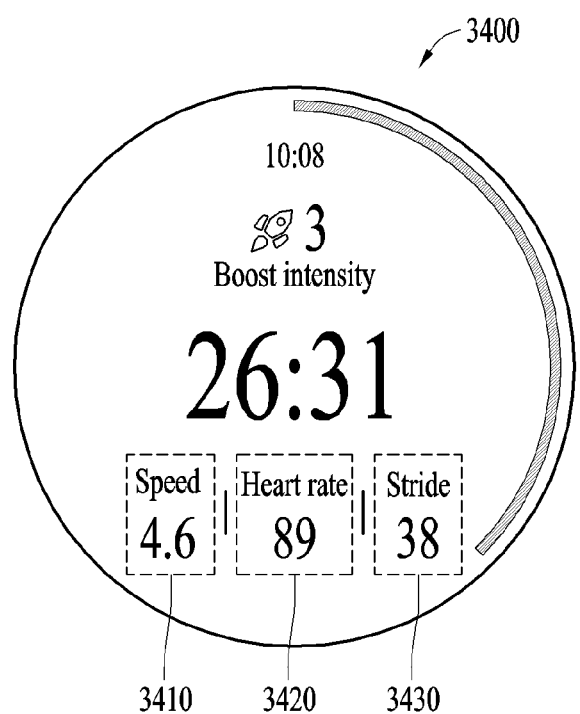
FIGS. 34 to 37 are diagrams illustrating examples of displaying information of a smart watch, according to an example embodiment(s)

Referring to FIG. 34, the smart watch 132 may display a screen 3400 (e.g., the screen 3100 of FIG. 31A) on the display of the smart watch 132 while the user is exercising. The screen 3400 may be a basic screen of the smart watch 132 while the user is exercising.

The smart watch 132 may display an exercise index and/or biometric information on an area (e.g., the area 3104 of FIG. 31A). For example, the area 3104 of FIG. 31A may include areas 3410, 3420, and 3430 of the screen 3400 of FIG. 34. The smart watch 132 may receive walking speed information (e.g., a walking speed value) and stride information (e.g., a stride value) of the user from the wearable device 300. The smart watch 132 may display the walking speed information on the area 3410 and the stride information on the area 3430. The smart watch 132 may display heart rate information acquired through a heart rate sensor on the area 3420.

According to an embodiment, information displayed on each of the areas 3410, 3420, and 3430 may be different according to the type of an exercise performed by the user. For example, the user may perform a split lunge exercise. The smart watch 132 may receive left and right stability and/or rotational stability of a motion of the user from the wearable device 300. The left and right stability may indicate, for example, a degree of the user's pelvis tilted left and right during an exercise and the rotational stability may indicate, for example, a degree of the user's pelvis rotated during exercise. The smart watch 132 may display the left and right stability, for example, on the area 3410, the rotational stability, for example, on the area 3430, and the heart rate information on the area 3420.

In an embodiment, the smart watch 132 may change the screen 3400 to the screen 3130 of FIG. 31A when there is the user's input to a physical button (e.g., a physical back button) of the smart watch 132.

When there is the user's input to the area 3410 or when there is a first scroll input to the screen 3400, the smart watch 132 may display a screen (e.g., a screen 3500 of FIG. 35) for an exercise index (e.g., a walking speed) on the display of the smart watch 132. Here, the first scroll input may indicate a swipe input in a third direction (e.g., a top-to-bottom direction).

Figure 35:
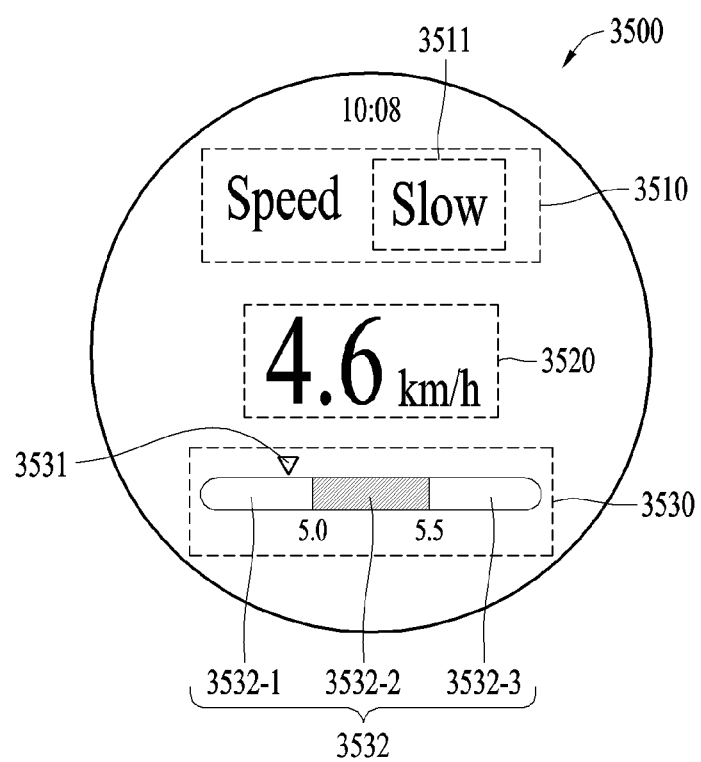

In the example shown in FIG. 35, the progress bar 3105 (e.g., see bar 3105 in FIGS. 31A-31B) may be omitted from the screen 3500. Without being limited thereto, the screen 3500 may include the progress bar 3105.

The smart watch 132 may display an evaluation level (e.g., slow, normal, or fast) of an exercise index (e.g., a walking speed) on an area 3510 of the screen 3500. The smart watch 132 may compare a walking speed value to a target speed range (e.g., 5.0 km/h to 5.5 km/h). The smart watch 132 may display "speed Normal" on the area 3510 when the walking speed value is within the target speed range, display "speed Slow" on the area 3510 when the walking speed value is less than the target speed range, and display "speed Fast" on the area 3510 when the walking speed value is greater than the target speed range.

The smart watch 132 may display a walking speed value (e.g., 4.6 km/h) on an area 3520 of the screen 3500.

On an area 3530 of the screen 3500, the smart watch 132 may display a walking speed state graph 3532 (e.g., a bar graph) and an indicator 3531 indicating where the user's walking speed value is in the walking speed state graph 3532. In the walking speed state graph 3532, a first section 3532-1 may be a section corresponding to "speed Slow" and a second section 3532-2 may be a section corresponding to "speed Normal" (or a target speed range), and a third section 3532-3 may be a section corresponding to "speed Fast".

In an embodiment, the first section 3532-1, the second section 3532-2, and the third section 3532-3 may have a different color. Without being limited thereto, the color of the first section 3532-1 may be the same as the color of the third section 3532-3 and the color of the second section 3532-2 may be different from that of the first section 3532-1 and that of the third section 3532-3.

In an embodiment, the color of text "Slow 3511" in the area 3510 may be the same color as the first section 3532-1. When the user's walking speed value is within the target speed range, "speed Normal" may be displayed on the area 3510. In this case, the color of text "Normal" may be the same as the color of the second section 3532-2. When the user's walking speed value is greater than the target speed range, "Fast" may be displayed on the area 3510. In this case, the color of the text "Fast" may be the same as the color of the third section 3532-3.

In an embodiment, the smart watch 132 may display the screen 3400 of FIG. 34 on its display when there is a second scroll input to the screen 3500. Here, the second scroll input may indicate a swipe input in a fourth direction (e.g., a bottom-to-top direction).

In an embodiment, the smart watch 132 may switch the screen 3500 to the screen 3400 of FIG. 34 when there is the user's input to a physical button (e.g., a physical back button) of the smart watch 132.

In an embodiment, the smart watch 132 may display a screen (e.g., a 3600 of FIG. 36) of biometric information (e.g., a heart rate) on the display of the smart watch 132 when there is the user's input to the area 3420 of FIG. 34 or there is the first scroll input to the screen 3500 of FIG. 35.

Figure 36:
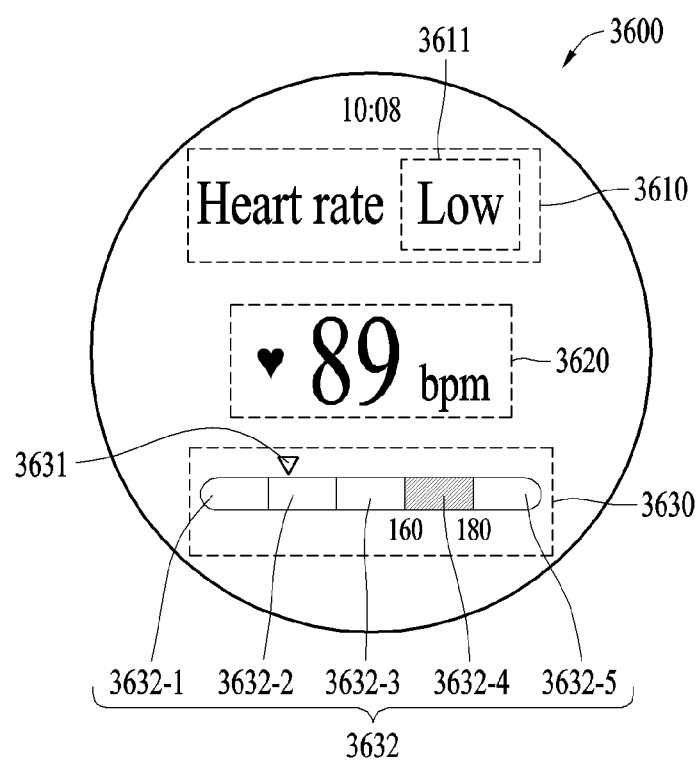

In the example shown in FIG. 36, the progress bar 3105 (e.g., see bar 3105 in FIGS. 31A-31B) may be omitted from the screen 3600. Without being limited thereto, the screen 3600 may include the progress bar 3105.

The smart watch 132 may display a heart rate evaluation level (e.g., low, good, or high) on an area 3610 of the screen 3600. The smart watch 132 may compare the user's heart rate with a target heart rate range (e.g., 160 bpm to 180 bpm). The smart watch 132 may display "heart rate Good" on the area 3610 when the user's heart rate is within the target heart rate range, display "heart rate Low" on the area 3610 when the user's heart rate is less than the target heart rate range, and display "heart rate High" on the area 3610 when the user's heart rate is greater than the target heart rate range.

The smart watch 132 may display the user's heart rate on an area 3620 of the screen 3600. A heart-shaped object in the area 3620 may refer to the smart watch 132 measuring the user's heart rate. When the smart watch 132 is not measuring the user's heart rate, there may be no heart-shaped object or a color may not be filled in the heart-shaped object.

The smart watch 132 may display, on an area 3630 of the screen 3600, a heart rate state graph 3632 (e.g., a bar graph) and an indicator 3631 indicating where the user's heart rate is in the heart rate state graph 3632. In the heart rate state graph 3632, first to third sections 3632-1 to 3632-3 may be sections corresponding to "heart rate Low", a fourth section 3632-4 may be a section corresponding to "heart rate Good" (or in a target heart rate range), and a fifth section 3632-5 may be a section corresponding to "heart rate High".

In an embodiment, the first to fifth sections 3632-1 to 3632-5 may have different colors. Without being limited thereto, colors of sections other than the fourth section 3632-4 among the first to fifth sections 3632-1 to 3632-5 may be the same and the color of the fourth section 3632-4 may be different from the colors of the remaining sections.

In an embodiment, the color of text "Low 3611" in the area 3610 may be the same as the color of the first to third sections 3632-1 to 3632-3. When the user's heart rate is within the target heart rate range, "heart rate Good" may be displayed on the area 3610. In this case, the color of the text "Good" may be the same as the color of the fourth section 3632-4. When the user's heart rate is greater than the target heart rate range, "heart rate High" may be displayed on the area 3610. In this case, the color of the text "High" may be the same as the color of the fifth section 3632-5.

In an embodiment, the first to fifth sections 3632-1 to 3632-5 may be determined based on the user's maximum heart rate. For example, the first section 3632-1 may correspond to a section of 50 to 60% of the user's maximum heart rate, and the second section 3632-2 may correspond to a section of 60 to 70% of the user's maximum heart rate, and the third section 3632-3 may correspond to a section of 70 to 80% of the user's maximum heart rate. The fourth section 3632-4 may correspond to a section of 80 to 90% of the user's maximum heart rate, and the fifth section 3632-5 may correspond to a section of 90% or more of the user's maximum heart rate.

In an embodiment, the smart watch 132 may display the screen 3500 of FIG. 35 on its display when there is the second scroll input to the screen 3600.

In an embodiment, the smart watch 132 may switch the screen 3600 to the screen 3400 of FIG. 34 when there is the user's input to a physical button (e.g., a physical back button) of the smart watch 132. Without being limited thereto, the smart watch 132 may return to a previous screen (e.g., the 3500 of FIG. 35) when there is the user's input to a physical button (e.g., a physical back button) of the smart watch 132.

In an embodiment, the smart watch 132 may display a screen (e.g., a screen 3700 of FIG. 37) of an exercise index (e.g., a stride) on the display of the smart watch 132 when there is the user's input to the area 3430 of FIG. 34 or there is the first scroll input to the screen 3600 of FIG. 36.

Figure 37:
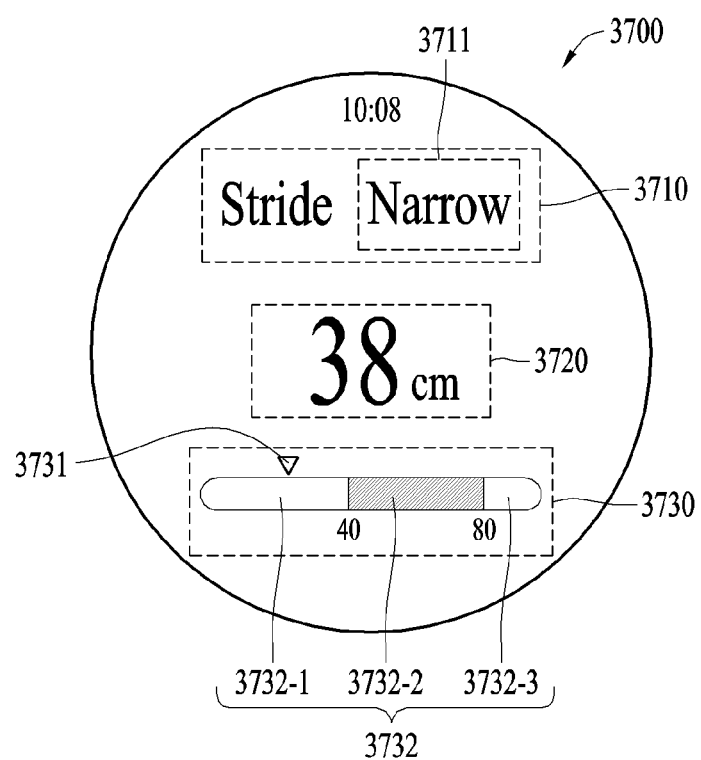

In the example shown in FIG. 37, the progress bar 3105 (e.g., see bar 3105 in FIGS. 31A-31B) may be omitted from the screen 3700. Without being limited thereto, the screen 3700 may include the progress bar 3105.

The smart watch 132 may display an evaluation level (e.g., narrow, normal, or wide) of the user's stride value on an area 3710 of the screen 3700. The smart watch 132 may compare the user's stride value to a target stride range. The smart watch 132 may display "stride Normal" on the area 3710 when the user's stride value is within the target stride range, display "stride Narrow" on the area 3710 when the user's stride value is less than the target stride range, and display "stride Wide" on the area 3710 when the user's stride value is greater than the target stride range.

The target stride range may be determined by the smart watch 132, the electronic device 400, or the server 140 based on the height of the user. For example, among "the user's height*0.45", "the user's height*0.37", and "the user's height −100", a range between a maximum/high value and a minimum/low value may be determined to be the target stride range.

The smart watch 132 may display a stride value (e.g., 38 cm) on an area 3720 of the screen 3700.

The smart watch 132 may display, on an area 3730 of the screen 3700, a stride state graph 3732 (e.g., a bar graph) and an indicator 3731 indicating where the user's stride value is in the stride state graph 3732. In the stride state graph 3732, a first section 3732-1 may be a section corresponding to "stride Narrow", a second section 3732-2 may be a section corresponding to "stride Normal" (or a target stride range), and a third section 3732-3 may be a section corresponding to "stride Wide".

In an embodiment, the first section 3732-1, the second section 3732-2, and the third section 3732-3 may each have a different color. Without being limited thereto, the color of the first section 3732-1 may be the same as the color of the third section 3732-3 and the color of the second section 3732-2 may be different from the colors of the first section 3732-1 and the third section 3732-3.

In an embodiment, the color of text "Narrow 3711" in the area 3710 may be the same as the color of the first section 3732-1. When the user's stride value is within the target stride range, "stride Normal" may be displayed on the area 3710. In this case, the color of the text "Normal" may be the same as the color of the second section 3732-2. When the user's stride value is greater than the target stride range, "stride Wide" may be displayed on the area 3710. In this case, the color of the text "Wide" may be the same as that of the third section 3732-3.

In an embodiment, the smart watch 132 may display the screen 3600 of FIG. 36 on its display when there is the second scroll input to the screen 3700.

In an embodiment, the smart watch 132 may switch the screen 3700 to the screen 3400 of FIG. 34 when there is the user's input to a physical button (e.g., a physical back button) of the smart watch 132. Without being limited thereto, the smart watch 132 may return to a previous screen (e.g., the 3600 of FIG. 36) when there is the user's input to a physical button (e.g., a physical back button) of the smart watch 132.

FIGS. 38 to 53 are diagrams illustrating examples of operations of a smart watch according to an embodiment.

In an embodiment, the smart watch 132 may determine that the user's heart rate is in an abnormality state when the user's heart rate is greater than a predetermined level while the user is exercising in a workout section. The smart watch 132 may transmit a notification indicating that the user's heart rate is in the abnormality state to the wearable device 300. Based on such a notification, the wearable device 300 may suspend or terminate the provision of force to the user. The wearable device 300 may transmit, to the smart watch 132, a message (hereinafter, a first message) indicating the suspension of providing force to the user.

Figure 38:
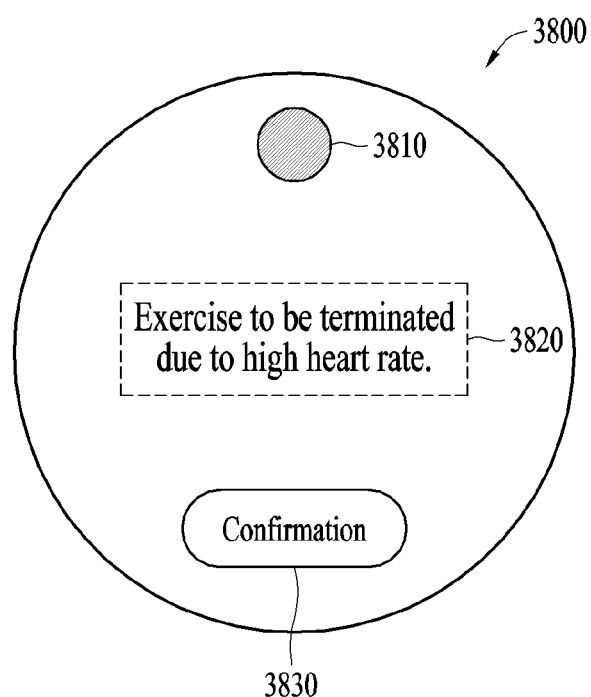
FIGS. 38 to 53 are diagrams illustrating examples of operations of a smart watch according to an example embodiment(s)

Upon receipt of the first message from the wearable device 300, the smart watch 132 may display a screen 3800 of FIG. 38 on the display of the smart watch 132.

In the example shown in FIG. 38, the smart watch 132 may display an object (or an icon) corresponding to the abnormal heart rate of the user (or suspension of driving the wearable device 300) on an area 3810. The smart watch 132 may display a message indicating the abnormal heart rate of the user and suspension of driving of the wearable device 300 (e.g., text and/or an image of "Exercise to be terminated due to high heart rate") on an area 3820. When there is the user's input to a confirmation button 3830, the smart watch 132 may display a screen (e.g., the screen 3300 of FIG. 33) with respect to an exercise result.

In an embodiment, the smart watch 132 may receive information about a state of charge of the wearable device 300 from the wearable device 300. The smart watch 132 may display a screen 3900 on its display when the information (e.g., 10%) about the state of charge of the wearable device 300 is below a predetermined level.

Figure 39:
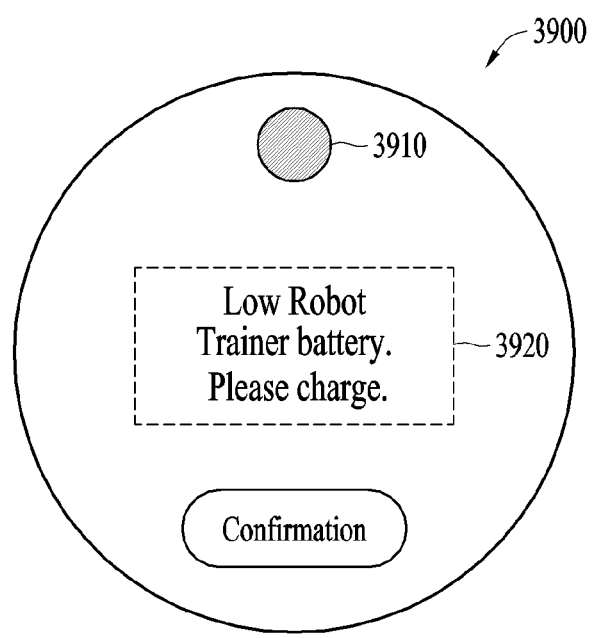

In the example shown in FIG. 39, the smart watch 132 may display an object (or an icon) corresponding to low battery of the wearable device 300 on an area 3910. The smart watch 132 may display a message (e.g., text and/or an image of "Low Robot Trainer battery. Please charge.") indicating a low battery condition and charging notification on an area 3920. Here, the Robot Trainer may represent the wearable device 300. The smart watch 132 may display a previous screen of the screen 3900 on its display when there is the user's input to a confirmation button. For example, the previous screen of the screen 3900 may be the screen 3400 of FIG. 34. The smart watch 132 may switch the screen 3900 to the screen 3400 when there is the user's input to a confirmation button.

Figure 40:
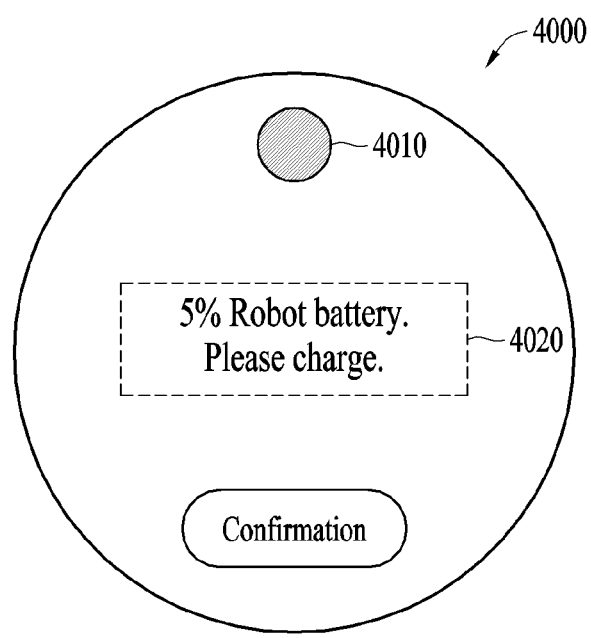

In the example shown in FIG. 40, the smart watch 132 may receive information (e.g., 5%) about the state of charge of the wearable device 300 from the wearable device 300 and display a screen 4000 on its display. The smart watch 132 may display an object (or an icon) corresponding to the low battery of the wearable device 300 on an area 4010. The smart watch 132 may display, on an area 4020, a message (e.g., text and/or an image of "5% Robot battery. Charge required.") indicating a low battery condition and a charging notification. Here, the Robot may represent the wearable device 300. The smart watch 132 may display a previous screen of the screen 4000 on the display when there is the user's input to a confirmation button. For example, the previous screen of the screen 4000 may be the screen 3400 of FIG. 34. The smart watch 132 may switch the screen 4000 to the screen 3400 when there is the user's input to a confirmation button.

Figure 41:
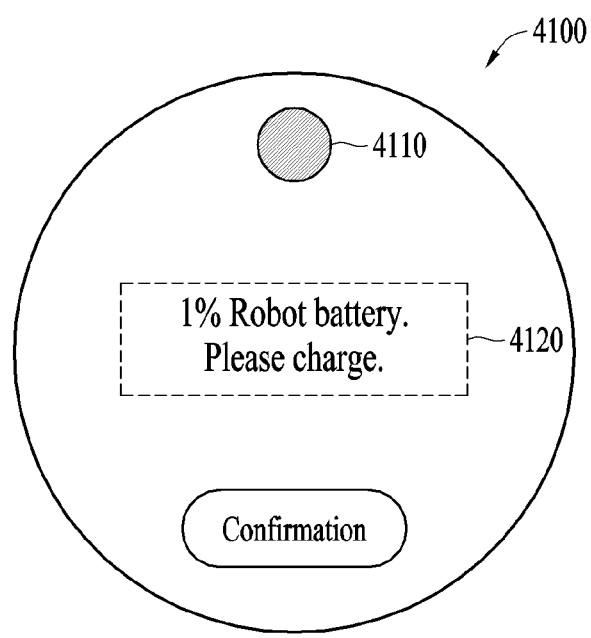

In the example shown in FIG. 41, the smart watch 132 may receive information (e.g., 1%) about the state of charge of the wearable device 300 from the wearable device 300 and display a screen 4100 on its display. The smart watch 132 may display an object (or an icon) corresponding to the low battery of the wearable device 300 on an area 4110. The smart watch 132 may display, on an area 4120, a message (text and/or an image of "1% Robot battery. Please charge.") indicating a low battery condition and a charging notification. The smart watch 132 may display a previous screen of the screen 4100 on its display when there is the user's input to a confirmation button.

The screen 4100 of FIG. 41 may be displayed on the display of the smart watch 132 when the information (e.g., 1%) about the state of charge of the wearable device 300 is less than a predetermined level in a non-workout section. When the wearable device 300 is in a workout section and the information (e.g., 1%) about the state of charge of the wearable device 300 is less than a predetermined level, the smart watch 132 may display a screen 4200 of FIG. 42 on its display.

Figure 42:
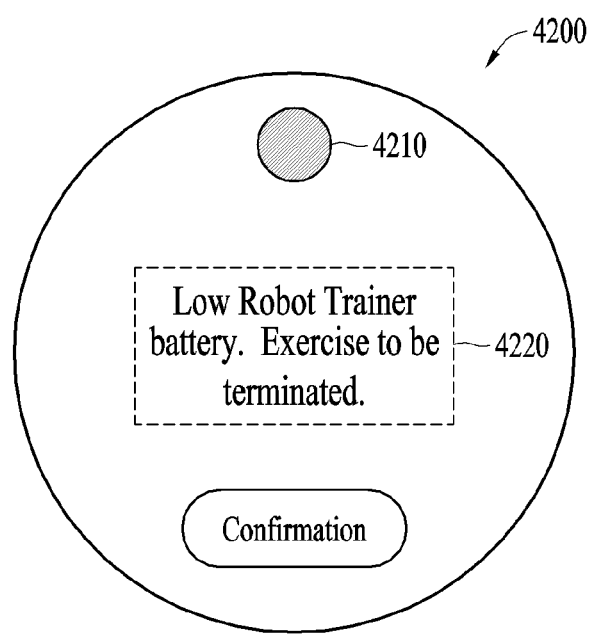

In the example shown in FIG. 42, the smart watch 132 may display an object (or an icon) corresponding to the low battery of the wearable device 300 on an area 4210. The smart watch 132 may display, on an area 4220, a message (e.g., text and/or an image of "Low Robot Trainer battery. Exercise to be terminated.") indicating a low battery condition and suspension of the driving. The smart watch 132 may display a screen (e.g., the screen 3300 of FIG. 33) for an exercise performance result when there is the user's input to a confirmation button.

In an embodiment, the wearable device 300 may sense that there is no motion of the user for a predetermined period during a workout section. That is, within a target time, the wearable device 300 may sense that there is no motion of the user for a predetermined period. In this case, the wearable device 300 may transmit a notification of suspension of the driving to the smart watch 132. Based on such a notification, the smart watch 132 may display a screen 4300 of FIG. 43 on its display.

Figure 43:
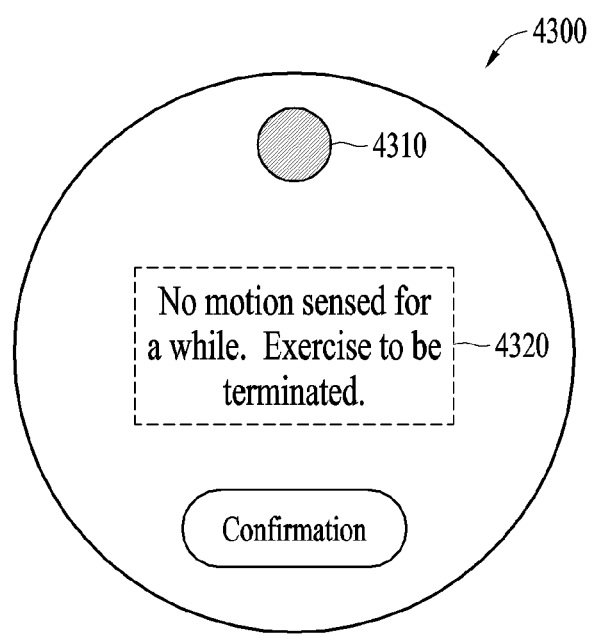

In the example shown in FIG. 43, the smart watch 132 may display, on an area 4310, an object (or an icon) corresponding to the suspension of the driving of the wearable device 300 and may display, on an area 4320, a message (e.g., text and/or an image of "No motion sensed for a while. Exercise to be terminated.") indicating the driving termination of the wearable device 300 due to no use of the wearable device 300 by the user. The smart watch 132 may display a screen (e.g., the screen 3300 of FIG. 33) for an exercise performance result when there is the user's input to a confirmation button.

In an embodiment, the wearable device 300 may sense that there is no use of the wearable device 300 for a predetermined period in a non-workout section. In this case, the wearable device 300 may transmit a notification of entering a power saving state to the smart watch 132. Based on such a notification, the smart watch 132 may display a screen 4400 of FIG. 44 on its display.

Figure 44:
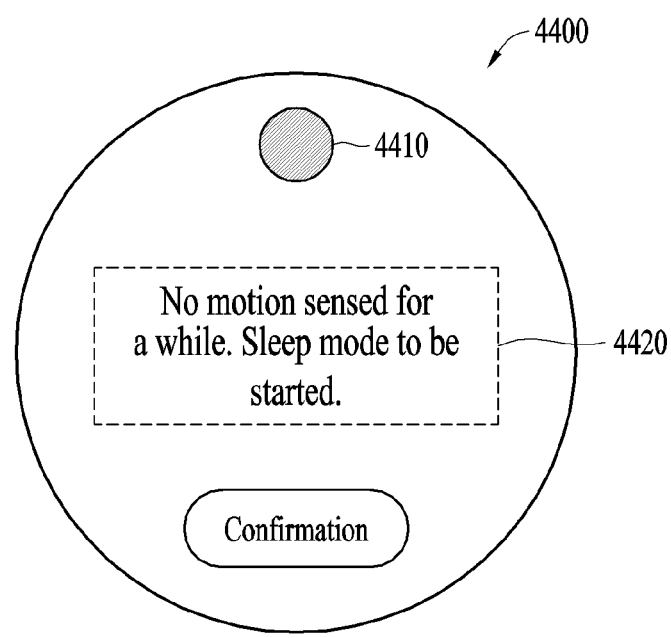

In the example shown in FIG. 44, the smart watch 132 may display, on an area 4410, an object (or an icon) corresponding to the power saving state of the wearable device 300 and display, on an area 4420, a message (e.g., text and/or an image of "No motion sensed for a while. Sleep mode to be started.") indicating the entrance of the saving state due to no use of the wearable device 300 by the user. The smart watch 132 may display a previous screen of the screen 4400 when there is the user's input to a confirmation button.

In an embodiment, the wearable device 300 may sense that the user is improperly wearing the wearable device 300. In this case, the wearable device 300 may transmit, to the smart watch 132, a notification indicating that the user is improperly wearing the wearable device 300. Based on such a notification, the smart watch 132 may display a screen 4500 of FIG. 45 on its display.

Figure 45:
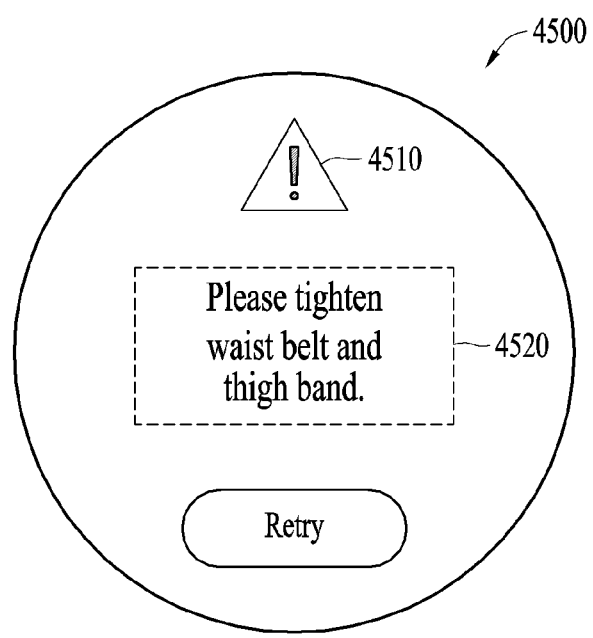

In the example shown in FIG. 45, the smart watch 132 may display, on an area 4520, a warning icon on an area 4510 and a message (e.g., text and/or an image of "Please tighten waist belt and thigh band") notifying how to properly wear the wearable device 300. When there is the user's input to a retry button, the smart watch 132 may request the wearable device 300 to determine whether the wearable device 300 is properly worn by the user. When it is determined that the wearable device 300 is properly worn by the user, the wearable device 300 may transmit a notification indicating that the wearable device 300 is properly worn by the user to the smart watch 132. Based on such a notification, the smart watch 132 may display a message requesting the user to make a predetermined pose (e.g., a pose of standing with the user's back straight and the user's feet together) on its display.

The wearable device 300 may determine whether the user is in a predetermined pose through the IMU 360 and/or the angle sensors 320 and 320-1. When it is determined that the user is not in the predetermined pose, the wearable device 300 may transmit a notification indicating that the user is not taking the predetermined pose to the smart watch 132. Based on such a notification, the smart watch 132 may display a screen 4600 of FIG. 46 on its display.

Figure 46:
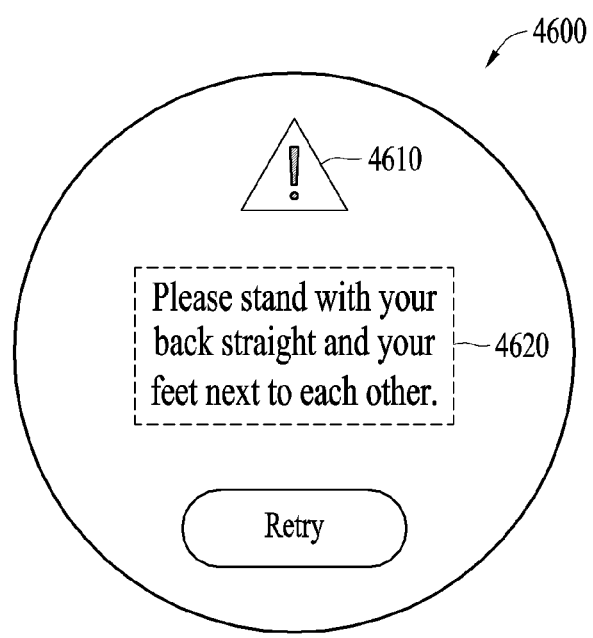

In the example shown in FIG. 46, the smart watch 132 may display a warning icon on an area 4610 and display a message requesting the user to make the predetermined pose on an area 4620. When there is the user's input to a retry button, the smart watch 132 may request the wearable device 300 to determine whether the user is in the predetermined pose. When the wearable device 300 determines that the user is in the predetermined pose, the wearable device 300 may transmit a notification indicating that the wearable device 300 is properly worn by the user to the smart watch 132. Based on such a notification, the smart watch 132 may display the name of an exercise program and a target time on its display. When there is the user's input with respect to the target time, the smart watch 132 may display a screen for setting the target time on the display. The user may input a time on the screen for setting the target time and the smart watch 132 may set the input time as a target time.

In an embodiment, the wearable device 300 may sense that the user takes off the wearable device 300 during a workout section. The wearable device 300 may notify the smart watch 132 that the user takes off the wearable device 300. Based on such a notification, the smart watch 132 may display a screen 4700 of FIG. 47 on its display.

Figure 47:
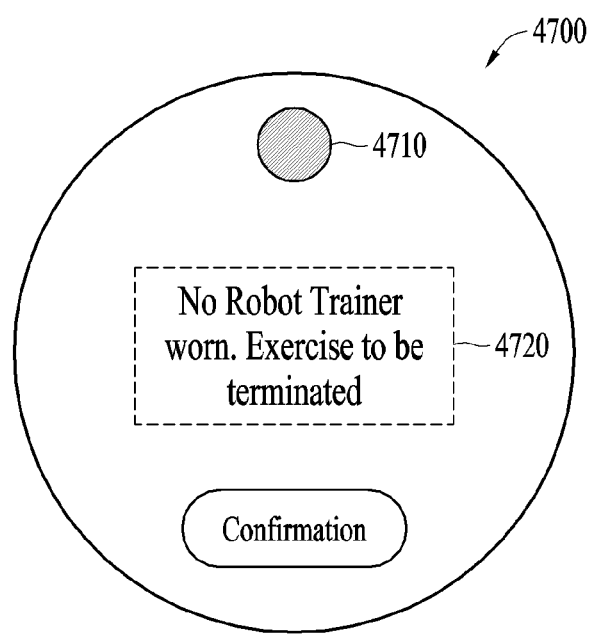

In the example shown in FIG. 47, an object (or an icon) corresponding to a state in which the wearable device 300 is separated from the user may be displayed on an area 4710 of the smart watch 132. The smart watch 132 may display, on an area 4720, a message (e.g., text and/or an image of "No Robot Trainer worn. Exercise to be terminated.") indicating that the user is not wearing the wearable device 300, so that the exercise is terminated. The smart watch 132 may display a screen (e.g., the screen 3300 of FIG. 33) for an exercise performance result on its display when there is the user's input to a confirmation button (or when a predetermined time elapses).

In an embodiment, the wearable device 300 may sense that the user's motion deviates greatly from an exercise motion through the IMU 360 and/or the angle sensors 320 and 320-1 during a workout section. The wearable device 300 may sense the user's abnormal motion or abnormal pose during the workout section. In this case, the wearable device 300 may suspend its driving and may transmit a notification of the suspension of the driving to the smart watch 132. Based on such a notification, the smart watch 132 may display a screen 4800 of FIG. 48 on its display.

Figure 48:
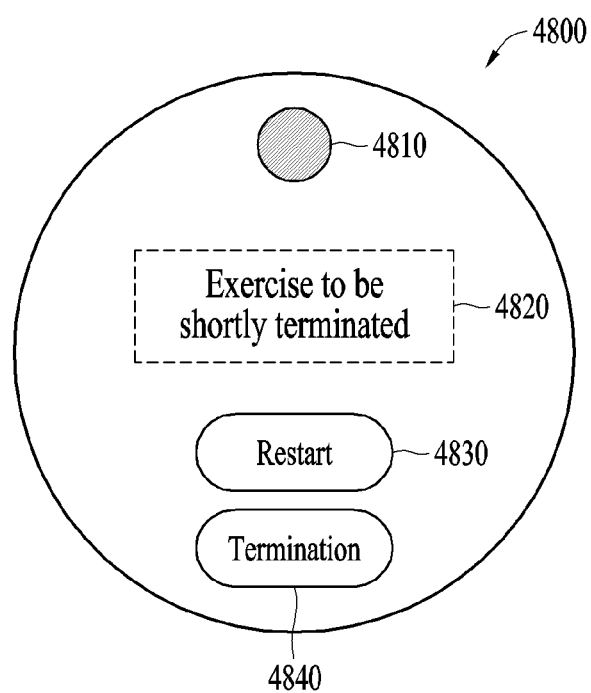

In the example shown in FIG. 48, the smart watch 132 may display an object (or an icon) corresponding to the sensed abnormal motion on an area 4810. The smart watch 132 may display, on an area 4820, a message (e.g., text and/or message "Exercise to be shortly terminated") indicating that the driving is suspended by the abnormal motion sensed during the workout section. When there is the user's input to a restart button 4830, the smart watch 132 may transmit, to the wearable device 300, a signal instructing that the driving be restarted. Based on such a signal, the wearable device 300 may restart its driving and the provision of force to the user when the user moves. When there is the user's input to a termination button 4840, the smart watch 132 may display a screen (e.g., the screen 3300 of FIG. 33) for an exercise performance result on its display.

According to an embodiment, the wearable device 300 may sense the user's abnormal motion (or an abnormal pose) during a workout section but may determine that such an abnormal motion is a motion of sitting. In this case, the wearable device 300 may temporarily suspend its driving and notify the smart watch 132 that the user is to sit. Based on such a notification, the smart watch 132 may display a screen 4900 of FIG. 49 on its display.

Figure 49:
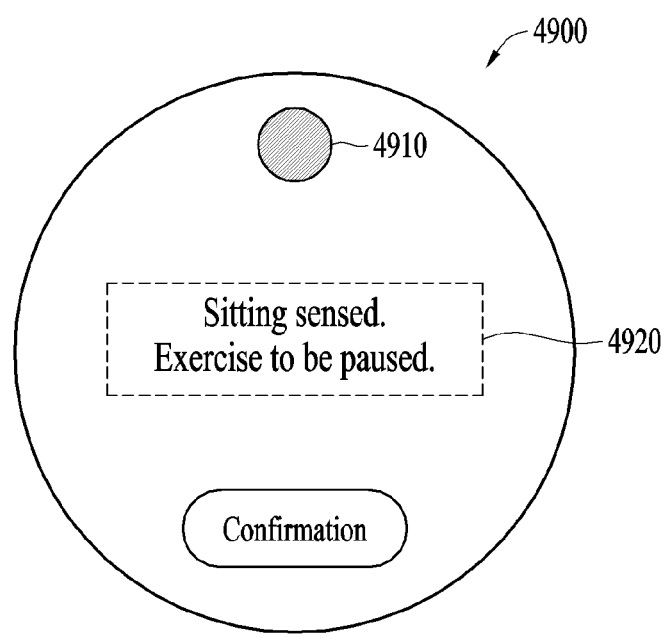

In the example shown in FIG. 49, the smart watch 132 may display an object (or an icon) corresponding to the sensed sitting on an area 4910. The smart watch 132 may display, on an area 4920, a message (e.g., text and/or an image of "Sitting sensed. Exercise to be paused.") notifying that sitting is sensed, so the driving is paused. The smart watch 132 may display a previous screen of the screen 4900 on its display when there is the user's input to a confirmation button.

In an embodiment, in a non-workout section, the wearable device 300 may sense that the wearable device 300 is in an error state (e.g., a system error state). In this case, the wearable device 300 may transmit a notification indicating that the wearable device 300 is in the error state to the smart watch 132. Based on such a notification, the smart watch 132 may display a screen 5000 of FIG. 50.

Figure 50:
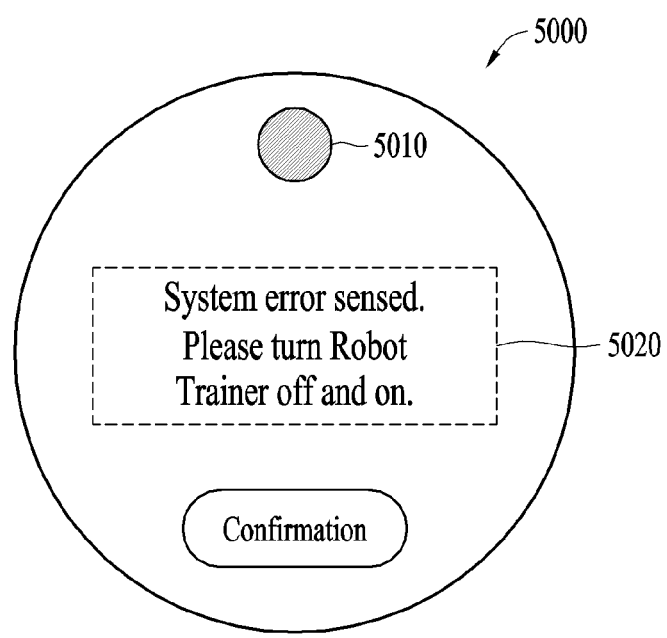

In the example shown in FIG. 50, the smart watch 132 may display an object (or an icon) corresponding to the error state on an area 5010. The smart watch 132 displays, on an area 5020, a message (e.g., text and/or an image of "System error sensed. Please turn Robot Trainer off and on." notifying the error state and an error solving method. The smart watch 132 may display a previous screen of the screen 5000 on the display when there is the user's input to a confirmation button.

In an embodiment, in a workout section, the wearable device 300 may sense that the wearable device 300 is in an error state (e.g., a system error state). In this case, the wearable device 300 may transmit a notification indicating that the wearable device 300 is in the error state to the smart watch 132. Based on such a notification, the smart watch 132 may display a screen 5100 of FIG. 51.

Figure 51:
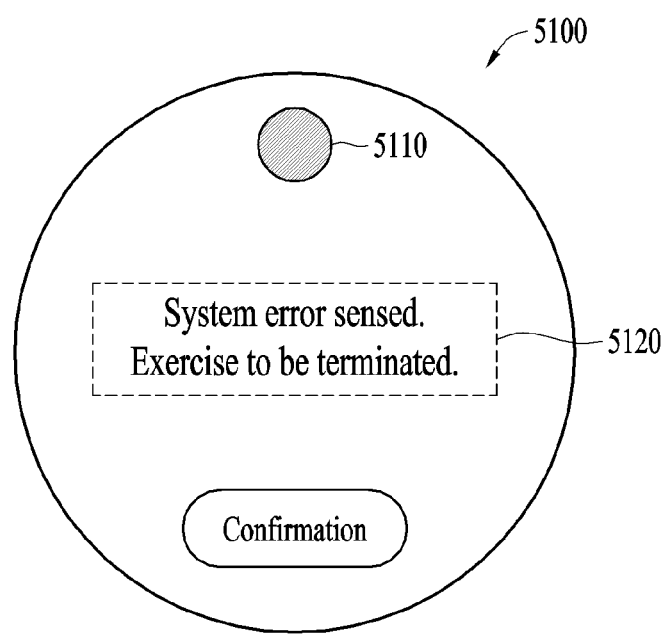

In the example shown in FIG. 51, the smart watch 132 may display an object (or an icon) corresponding to the error state on an area 5110. The smart watch 132 may display, on an area 5120, the error state in the workout section and a message (e.g., text and/or an image of "System error sensed. Exercise to be terminated.") notifying the error state in the workout section and termination of the driving. The smart watch 132 may display a screen (e.g., the screen 3300 of FIG. 33) for an exercise performance result on its display when there is the user's input to a confirmation button.

In an embodiment, in a non-workout section, the wearable device 300 may sense that the temperature of the wearable device 300 is equal to or higher than a predetermined temperature. In this case, the wearable device 300 may transmit a notification indicating that the wearable device 300 is in a high temperature state (or overheat state) to the smart watch 132. Based on such a notification, the smart watch 132 may display a screen 5200 of FIG. 52.

Figure 52:
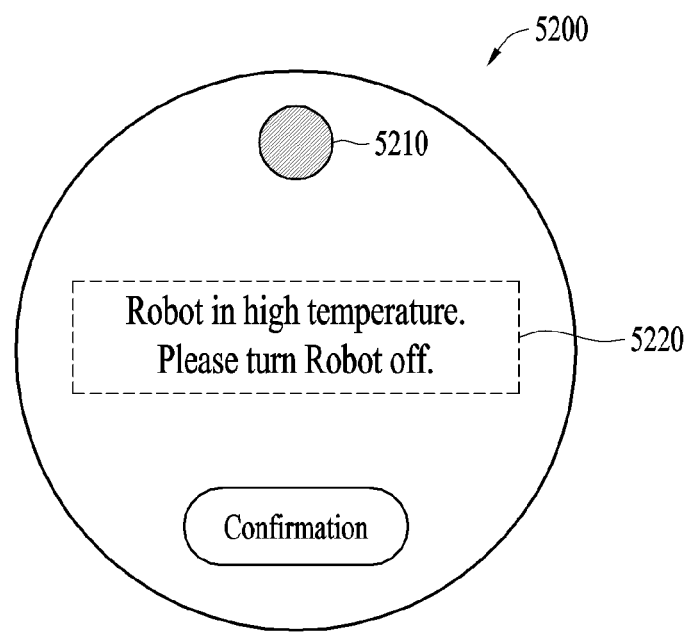

In the example shown in FIG. 52, the smart watch 132 may display an object (or an icon) corresponding to the high temperature state of the wearable device 300 on an area 5210. The smart watch 132 may display, on an area 5220, a message (e.g., text and/or an image of "Robot in high temperature. Please turn Robot off.") notifying the high temperature state and a method of mitigating (or relieving) the high temperature condition. The smart watch 132 may display a previous screen of the screen 5200 on the display when there is the user's input to a confirmation button.

In an embodiment, the wearable device 300 may sense that the temperature of the wearable device 300 is equal to or higher than a predetermined temperature in a workout section. In this case, the wearable device 300 may transmit a notification indicating that the wearable device 300 is in a high temperature state (or an overheating state) to the smart watch 132. Based on such a notification, the smart watch 132 may display a screen 5300 of FIG. 53.

Figure 53:
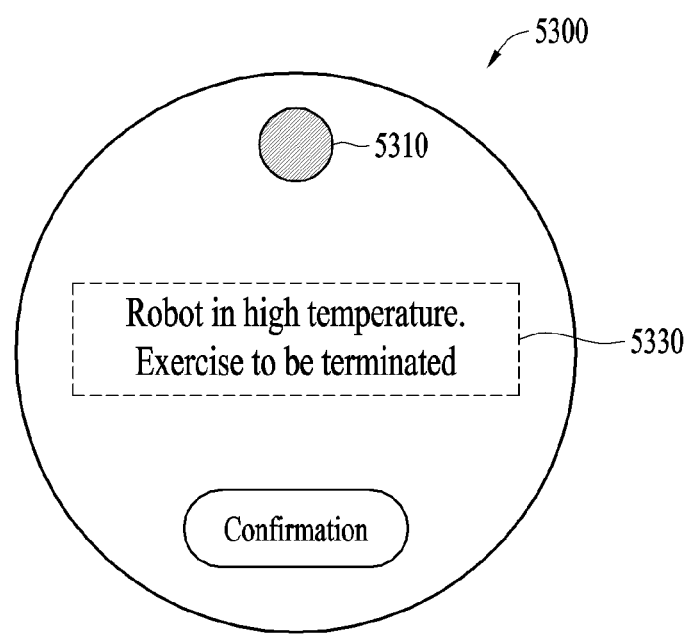

In the example shown in FIG. 53, the smart watch 132 may display an object (or an icon) corresponding to the high temperature state of the wearable device 300 on an area 5310. The smart watch 132 may display, on an area 5330, a message (e.g., Robot in high temperature. Exercise to be terminated.") notifying the high temperature state and the suspension of the driving. The smart watch 132 may display a screen (e.g., the screen 3300 of FIG. 33) for an exercise performance result on its display when there is the user's input to a confirmation button.

In an embodiment, the smart watch 132 may receive, from the electronic device 400, a notification indicating that a wireless communication link between the electronic device 400 and the wearable device 300 is disconnected during a workout section. Based on such a notification, the smart watch 132 may display, on its display, a confirmation button and a message indicating the state, in which the wireless communication link between the electronic device 400 and the wearable device 300 is disconnected, and the suspension of the driving of the wearable device 300. The smart watch 132 may display a screen (e.g., the screen 3300 of FIG. 33) for an exercise performance result on its display when there is the user's input to a confirmation button.

In an embodiment, the smart watch 132 may receive, from the electronic device 400, a notification indicating that a wireless communication link between the electronic device 400 and the wearable device 300 is disconnected in a non-workout section. Based on such a notification, the smart watch 132 may display, on its display, a message indicating the disconnection state of the wireless communication link between the electronic device 400 and the wearable device 300 and a confirmation request for the connection state. The user may cause the electronic device 400 to be connected to the wearable device 300 again through the wireless communication link.

In an embodiment, the smart watch 132 may sense that the wireless communication link between the electronic device 400 and the smart watch 132 is disconnected. In this case, the smart watch 132 may display, on its display, a message indicating a confirmation request for a connection state between the electronic device 400 and the smart watch 132. The user may cause the electronic device 400 to be connected to the smart watch 132 again through the wireless communication link.

FIGS. 54 to 59 are diagrams illustrating examples of displaying information by a smart watch after a user's exercise is completed, according to an embodiment.

Figure 54:
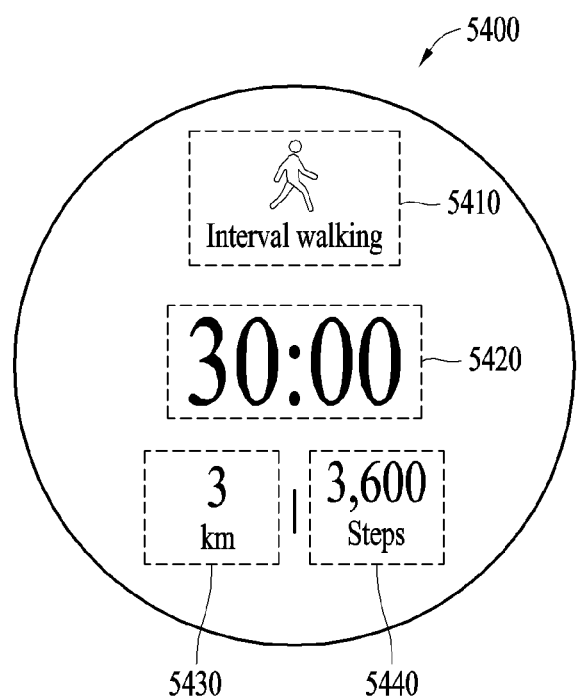
FIGS. 54 to 59 are diagrams illustrating examples of displaying information by a smart watch after a user's exercise is completed, according to an example embodiment(s)

Referring to FIG. 54, when an exercise termination event (e.g., the elapse of a target time or exercise termination (or suspension of the driving) before a target time) occurs, the smart watch 132 may display, on the display of the smart watch 132, a screen 5400 for a result of an exercise performed during a workout section (e.g., a target time or a section from a starting time point of the target time to a time point of exercise termination).

The wearable device 300 may generate result information of an exercise performed by the user during a workout section and transmit the generated result information to the smart watch 132. The result information may include, for example, an exercise index (e.g., an average stride value and an average walking speed value during the workout section) and calories consumed by the user during the workout section but is not limited thereto.

The smart watch 132 may display, on an area 5410, the name of an exercise (or an exercise program) performed by the user during the workout section and/or an object corresponding to the exercise. The smart watch 132 may display a time corresponding to the workout section on an area 5420. For example, when the user exercises for a set target time (e.g., 30 minutes), the smart watch 132 may display the time corresponding to the workout section (e.g., 30 minutes) on the area 5420. When the user performs an exercise for 20 minutes and terminates the exercise before a set target time (e.g., 30 minutes), the smart watch 132 may display the time (e.g., 20 minutes) corresponding to the workout section on the area 5420. The smart watch 132 may schematically display result information on areas 5430 and 5440. In the example shown in FIG. 54, the smart watch 132 may display a total distance traveled by the user during the workout section on the area 5430 and display the number of strides of the user during the workout section on the area 5440.

Figure 55:
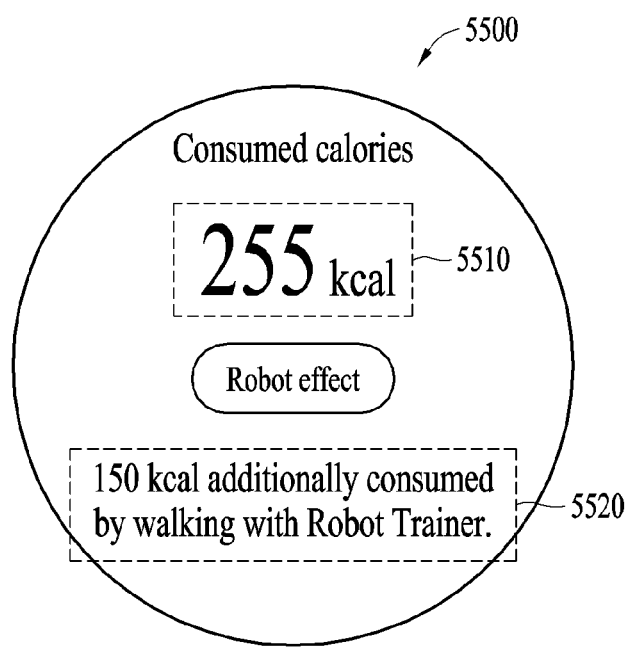

The smart watch 132 may display a screen 5500 of FIG. 55 on its display when there is the user's input (or the user's gesture input) to the screen 5400 (e.g., the first scroll input).

Referring to FIG. 55, the smart watch 132 may display the screen 5500 about calories consumed by the user during the workout section, on its display.

In the example shown in FIG. 55, the smart watch 132 may display the user's consumed calories (e.g., 255 kcal) during the workout section on an area 5510. The smart watch 132 may display, on an area 5520, the number of calories further consumed by the user using the wearable device 300 (hereinafter, referred to as "calories consumed by a robot effect") (e.g., 150 kcal). For example, the wearable device 300 may calculate an estimated value (e.g., 105 kcal) of calorie consumption when the user exercises in a workout section without wearing the wearable device 300. The wearable device 300 may calculate consumed calories (e.g., 255 kcal) while the user is exercising with the wearable device 300 worn on the user's body during the workout section. The wearable device 300 may determine a difference between the calculated calories (e.g., 255 kcal) and the calculated estimated value (e.g., 150 kcal), to be calories consumed by the robot effect and may transmit the calories consumed by the robot effect to the smart watch 132. The smart watch 132 may display the calories consumed by the robot effect on an area 5520.

In an embodiment, the smart watch 132 may display the screen 5400 of FIG. 54 on its display when there is the user's input (or the user's gesture input) (e.g., the second scroll input) to the screen 5500. The smart watch 132 may display the screen 5600 of FIG. 56 on its display when there is the user's input (or the user's gesture input) (e.g., the first scroll input) to the screen 5500.

Figure 56:
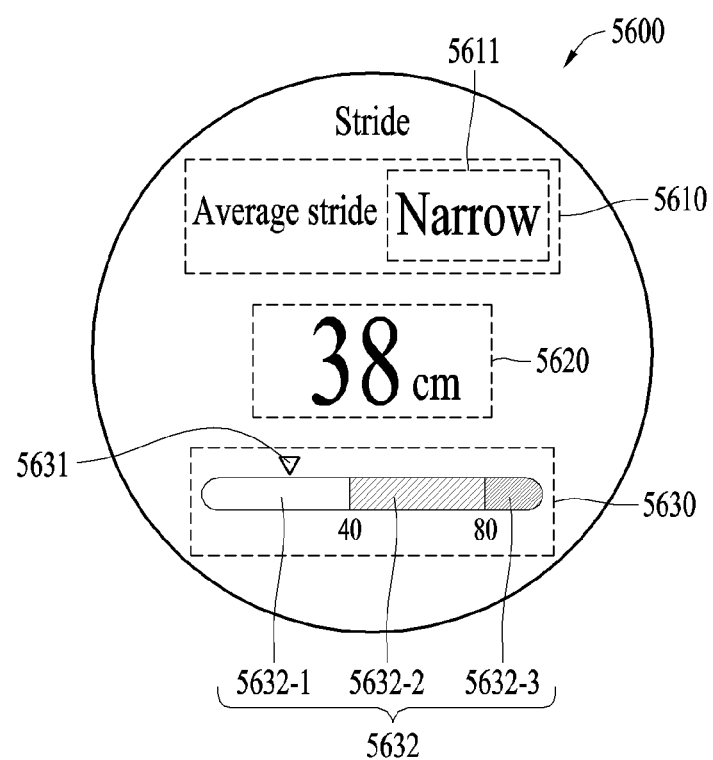

Referring to FIG. 56, the smart watch 132 may display, on its display, the screen 5600 about the user's walking index (e.g., an average stride) during a workout section.

In the example shown in FIG. 56, the smart watch 132 may display, on an area 5610, an evaluation level (e.g., narrow, normal, or wide) of an average stride value of the user. The smart watch 132 may compare the user's average stride value to a target stride range. The smart watch 132 may display "(average) stride Normal" on the area 5610 when the user's average stride value is within the target stride range, display "(average) stride Narrow" on the area 5610 when the user's average stride value is less than the target stride range, and display "(average) stride Wide" on the area 5610 when the average stride value of the user is greater than the target stride range.

The smart watch 132 may display an average stride value (e.g., 38 cm) on an area 5620.

The smart watch 132 may display, on an area 5630, a stride state graph 5632 (e.g., a bar graph) and an indicator 5631 indicating where the user's average stride value is in the stride state graph 5632. In the stride state graph 5632, a first section 5632-1 may be a section corresponding to "stride Narrow", a second section 5632-2 may be a section corresponding to "stride Normal" (or a target stride range), and a third section 5632-3 may be a section corresponding to "stride Wide".

The first section 5632-1, the second section 5632-2, and the third section 5632-3 may each have a different color. Without be limited thereto, the color of the first section 5632-1 may be the same as the color of the third section 5632-3 but may be different from that of the second section 5632-2. The colors of the first section 5632-1, the second section 5632-2, and the third section 5632-3 may be the same.

In an embodiment, the color of text "Narrow 5611" in the area 5610 may be the same as the color of the first section 5632-1. When the user's average stride value is within the target stride range, "(average) stride Normal" may be displayed on the area 5610. In this case, the color of text "Normal" may be the same as the color of the second section 5632-2. When the user's average stride value is greater than the target stride range, "(average) stride Wide" may be displayed on the area 5610. In this case, the color of the text "Wide" may be the same as the color of the third section 5632-3.

In an embodiment, the smart watch 132 may display the screen 5500 of FIG. 55 on its display when there is the second scroll input to the screen 5600. The smart watch 132 may display a screen 5700 of FIG. 57 on its display when there is the user's input (or the user's gesture input) (e.g., the first scroll input) to the screen 5600.

Figure 57:
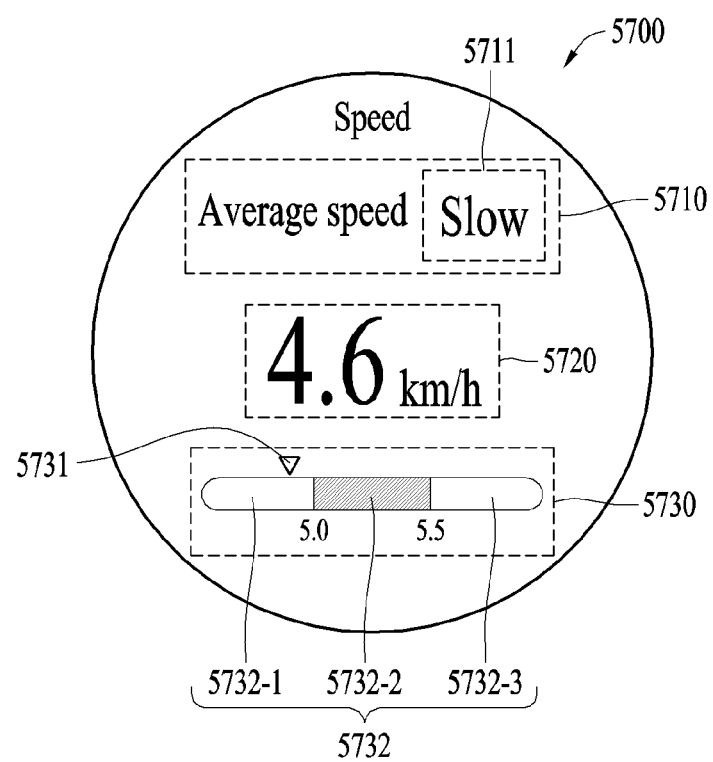

Referring to FIG. 57, the smart watch 132 may display the screen 5700 for the user's walking index (e.g., an average stride speed) during a workout section on its display.

In the example shown in FIG. 57, the smart watch 132 may display an evaluation level (e.g., slow, normal, or fast) of an exercise index (e.g., an average walking speed value) on an area 5710 of the screen 5700. The smart watch 132 may compare the average walking speed value of the user to a target speed range (e.g., 5.0 km/h to 5.5 km/h). The smart watch 132 may display "(average) speed Normal" on the area 5710 when the average walking speed value is within the target speed range, display "(average) speed Slow" on the area 5710 when the average walking speed value is less than the target speed range, and display "(average) speed Fast" on the area 5710 when the average walking speed value is greater than the target speed range.

The smart watch 132 may display an average walking speed value (e.g., 4.6 km/h) on an area 5720 of the screen 5700.

The smart watch 132 may display a walking speed state graph 5732 (e.g., a bar graph) and an indicator 5731 indicating where the user's average walking speed is in the walking speed state graph 5732, on an area 5730 of the screen 5700. In the walking speed state graph 5732, a first section 5732-1 may be a section corresponding to "speed SLOW", and a second section 5732-2 may be a section corresponding to "speed NORMAL" (or a target speed range), and a third section 5732-3 may be a section corresponding to "speed FAST".

In an embodiment, the colors of the first section 5732-1, the second section 5732-2, and the third section 5732-3 may each be different. Without being limited thereto, the color of the first section 5732-1 may be the same as the color of the third section 5732-3 and may be different from that of the second section 5732-2. The colors of the first section 5732-1, the second section 5732-2, and the third section 5732-3 may be the same.

In an embodiment, the color of text "Slow" 5711 in the area 5710 may be the same as the color of the first section 5732-1. When the user's average walking speed value is within the target speed range, "(average) speed Normal" may be displayed on the area 5710. In this case, the color of the text "Normal" may be the same as the color of the second section 5732-2. When the average walking speed value of the user is greater than the target speed range, "(average) speed Fast" may be displayed on the area 5710. In this case, the color of the text "Fast" may be the same as the color of the third section 5732-3.

In an embodiment, the smart watch 132 may display the screen 5600 of FIG. 56 on the display when there is the second scroll input to the screen 5700. The smart watch 132 may display a screen 5800 of FIG. 58 on the display when there is the first scroll input to the screen 5700.

Figure 58:
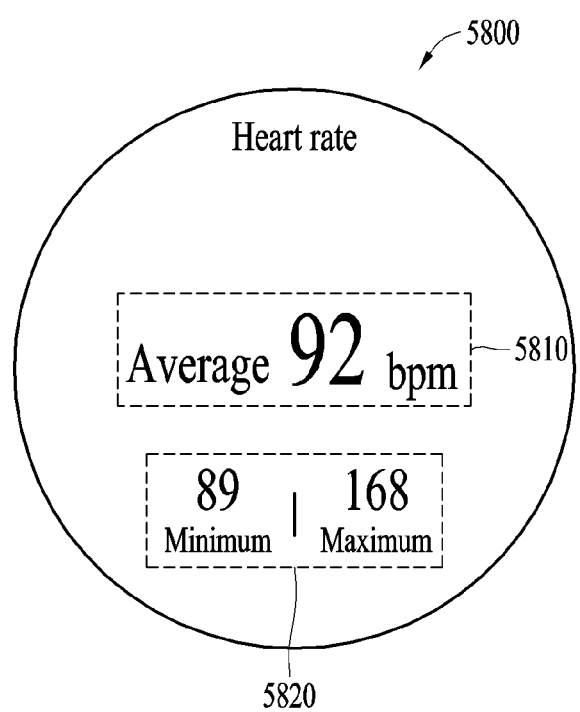

Referring to FIG. 58, the smart watch 132 may display the screen 5800 of the user's biometric information (e.g., an average heart rate) during the workout section, on its display.

In the example shown in FIG. 58, the smart watch 132 may display an average heart rate (e.g., 92 bpm) of the user during a workout section on an area 5810. The smart watch 132 may display the user's lowest heart rate (e.g., 89 bpm) and the user's maximum heart rate (e.g., 168 bpm) during the workout section on an area 5820.

In an embodiment, the smart watch 132 may display the screen 5700 of FIG. 57 on its display when there is the second scroll input to the screen 5800. The smart watch 132 may display a screen 5900 of FIG. 59 on its display when there is the first scroll input to the screen 5800.

Figure 59:
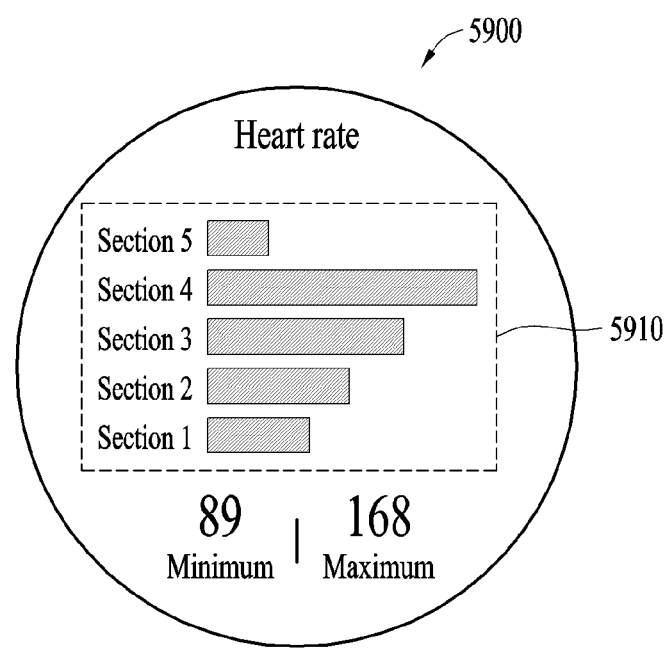

Referring to FIG. 59, the smart watch 132 may display, on an area 5910, a time during which the user's heart rate stays in each of heart rate sections (or the user's exercise performance time).

For example, sections 1 to 5 shown in FIG. 59 may correspond to the first to fifth sections 3632-1 to 3632-5 of FIG. 36, respectively. In the example shown in FIG. 59, the smart watch 132 may display a graph corresponding to a time during which the user's heart rate stays (or the user's exercise time) in the section 1 (e.g., the first section 5632-1) on the area 5910. The smart watch 132 may display a graph (e.g., a bar graph) corresponding to a time during which the user's heart rate stays (or the user's exercise time) in the section 2 (e.g., the second section 5632-2) on the area 5910. The smart watch 132 may display a graph (e.g., a bar graph) corresponding to a time during which the user's heart rate stays (or the user's exercise time) in the section 3 (e.g., the third section 5632-3) on the area 5910. The smart watch 132 may display a graph (e.g., a bar graph) corresponding to a time during which the user's heart rate stays (or the user's exercise time) in the section 4 (e.g., the fourth section 5632-4) on the area 5910. The smart watch 132 may display a graph (e.g., a bar graph) corresponding to a time during which the user's heart rate stays (or the user's exercise time) in the section 5 (e.g., the fifth section 5632-5) on the area 5910.

The length of the bar graph for each of the sections 1 to 5 shown in FIG. 59 may indicate the time during which user's heart rate stays (or the user's exercise time) in each of the sections 1 to 5. In the example shown in FIG. 59, the length of the bar graph for the section 5 is shortest and the length of the bar graph for the section 4 is longest. This may refer to that the time during which the user's heart rate stays in the section 5 is shortest and the time during which the user's heart rate stays in the section 4 is longest during the workout section.

In the example shown in FIG. 59, the color of the graph for each of the sections 1 to 5 may be different. Without being limited thereto, the color of the graph for each of the sections 1 to 5 may be the same.

The graph of FIG. 59 is just an example, and the smart watch 132 may generate and display the time during which the user's heart rate stays in each of the heart rate sections in the form of a pie chart.

Although five heart rate sections are shown in FIG. 59, they are only examples and are not limited to five.

In an embodiment, the smart watch 132 may display the screen 5800 of FIG. 58 on its display when there is the second scroll input to the screen 5900.

The operation of the smart watch 132 described with reference to FIGS. 30 to 59 may be applied to other electronic devices (e.g., glasses-type electronic devices and the like). In addition, the operation of the smart watch 132 described with reference to FIGS. 30 to 59 may be applied to the electronic device 400.

Figure 60:
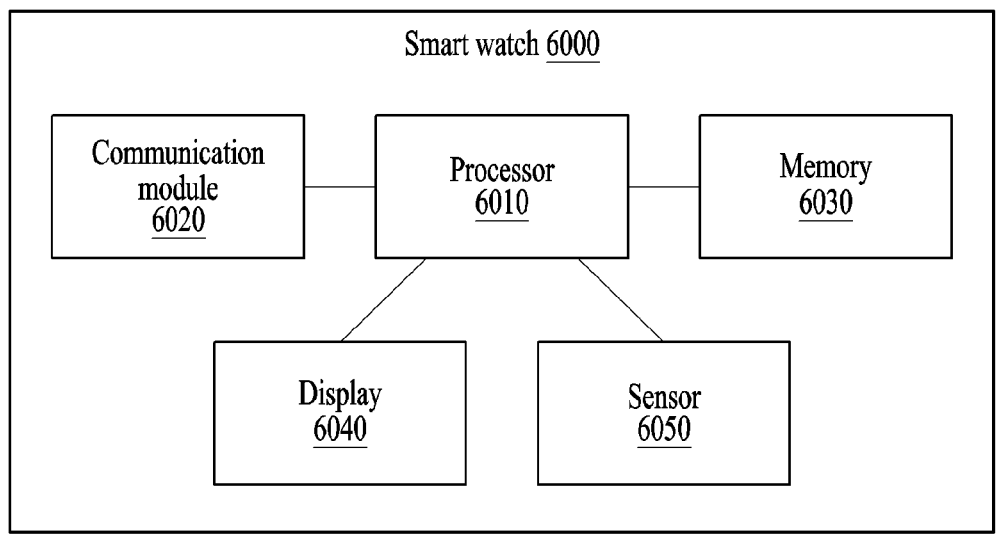
FIG. 60 is a block diagram of a smart watch according to an example embodiment.

FIG. 60 is a block diagram of a smart watch according to an embodiment.

Referring to FIG. 60, a smart watch 6000 (e.g., the smart watch 132) according to an embodiment may include a processor 6010, a communication module 6020, a memory 6030, a display 6040, and a sensor 6050.

The processor 6010 may control the overall operation of the smart watch 6000.

In an embodiment, the communication module 6020 may establish a wireless communication link with the electronic device 400 (or a user terminal). The communication module 6020 may communicate with the wearable device 300 through the electronic device 400.

In an embodiment, the memory 6030 may store a fitness application. The fitness application, for example, may be an application for implementing at least some or all of controlling the wearable device 300, displaying information (e.g., an exercise indicator and the like) received from the wearable device 300, and displaying biometric information (e.g., heart rate information) obtained by the sensor 6050 (e.g., a heart rate sensor). According to an embodiment, the fitness application stored in the memory 6030 may implement the same functions as the fitness application of the electronic device 400.

In an embodiment, the processor 6010 may execute the fitness application and control the display 6040 to display a first screen (e.g., the screen 3000 or the screen 3001 of FIG. 30) of the executed fitness application on the display 6040.

The processor 6010 may cause, to be displayed on the first screen, an object corresponding to an operation mode of the wearable device 300, an exercise intensity, a button (e.g., the buttons 3030 and 3040 of FIG. 30) for changing the exercise intensity, a button (e.g., the button 3050 of FIG. 30) for setting an operation mode to a first operation mode (e.g., a boost mode), and a button (e.g., the button 3060 of FIG. 30) for setting the operation mode to a second operation mode (e.g., a resist mode).

In an embodiment, the processor 6010 may control the display 6040 to display a second screen (e.g., the screen 3100 of FIG. 31A or the screen 3300 of FIG. 34) of the executed fitness application on the display 6040. For example, the processor 6010 may control the display 6040 to display the second screen on the display 6040 when the processor 6010 receives, from the wearable device 300, a notification that the user is in a ready state of exercise start (or when a workout section starts).

The processor 6010 may cause, to be displayed on the second screen, an object corresponding to an operation mode of the wearable device 300, an exercise intensity, an exercise time of the user, an exercise index of the user, and biometric information of the user.

In an embodiment, when there is the user's input (e.g., a swipe input in a first direction) to the second screen, the processor 6010 may control the display 6040 to display, on the display 6040, a control screen (e.g., the screen 3130 of FIG. 31A) for controlling operation (driving) of the wearable device 300 by switching a screen.

In an embodiment, when there is the user's input to the termination button 3133 on the control screen, the processor 6010 may control the communication module 6020 to transmit, to the wearable device 300, a signal for suspending operation (or driving) of the wearable device 300 and may control the display 6040 to display a screen (e.g., the screen 3300 of FIG. 33) for an exercise performance result and the screen 5400 of FIG. 54 on the display 6040.

In an embodiment, when there is the user's input to the pause button 3134 on the control screen, the processor 6010 may control the communication module 6020 to transmit, to the wearable device 300, a signal for pausing operation (or driving) of the wearable device 300. When there is the user's input to the pause button 3134, the processor 6010 may cause the continue button 3151 to be displayed on the control screen. When there is the user's input to the continue button 3151, the processor 6010 may control the communication module 6020 to transmit, to the wearable device 300, a signal for resuming operation (or driving) of the wearable device 300.

In an embodiment, when there is the user's input to the second screen with respect to the user's exercise index, the processor 6010 may control the display 6040 to display a screen (e.g., the screen 3500 of FIG. 35 or the screen 3700 of FIG. 37) for the user's exercise index on the display 6040. An evaluation of the user's exercise index may be displayed on the screen for the exercise index.

In an embodiment, when there is the user's input to the second screen with respect to biometric information, the processor 6010 may control the display 6040 to display a screen (e.g., the screen 3600 of FIG. 36) for the user's biometric information on the display 6040. An evaluation of the user's biometric information may be displayed on the screen for the user's biometric information.

In an embodiment, the processor 6010 may control the display 6040 to display, on the display 6040, a message corresponding to a state (e.g., a state of charge, an error state, an overheating state, a state of whether the wearable device 300 is correctly worn by the user, and the like) of the wearable device 300. The processor 6010 may control the display 6040 to display, on the display 6040, a message corresponding to the user's state (e.g., the user's heart rate state, a state of whether the user is in a predetermined pose, a state of the user's abnormal motion, and the like). Since these embodiments have been described with reference to FIGS. 38 to 53, a detailed description thereof is omitted.

In an embodiment, the processor 6010 may control the display 6040 to display a third screen (e.g., the screen 3300 of FIG. 33 or the screen 5400 of FIG. 54) of the executed fitness application on the display 6040. For example, when an exercise termination event occurs, the processor 6010 may control the display 6040 to display the third screen on the display 6040. The processor 6010 may cause, to be displayed on the third screen, the user's exercise index during a workout section, a time corresponding to a workout section, and the user's biometric information in the workout section. Since these embodiments have been described with reference to FIGS. 54 to 59, a detailed description thereof is omitted.

The examples described with reference to FIGS. 1 to 59 may apply to the smart watch 6000 of FIG. 60.

According to an embodiment, an electronic device 400 communicating with a wearable device 300 applying an external force to a user, the electronic device may include a communication module 420 configured to establish a wireless communication link with the wearable device; a display 440; a memory 430 configured to store a fitness application; and a processor 410 configured to execute the fitness application and control the display to display a screen of the executed fitness application including a first area on the display.

The processor may be configured to receive first state information indicating that the wearable device is in a sensing state for sensing a motion of the user through the communication module, recognize a state of the wearable device as the sensing state according to the received first state information, and control the display to provide visual feedback corresponding to the sensing state through the first area.

For the visual feedback corresponding to the sensing state, the processor may be configured to control the display to sequentially represent each of a plurality of colors on a user interface (UI) of the first area.

The colors may be configured by the user.

The processor may be configured to receive second state information indicating that the wearable device is in a booting state from the wearable device through the communication module, recognize the state of the wearable device as the booting state according to the received second state information, and control the display to provide visual feedback corresponding to the booting state through the first area.

For the visual feedback corresponding to the booting state, the processor may be configured to control the display to represent a first color on the UI of the first area and control the display to change the first color of the UI to a second color.

The processor may be configured to receive third state information indicating that the wearable device is in a state of charge from the wearable device through the communication module, recognize the state of the wearable device as the state of the charge according to the received third state information, and control the display to provide visual feedback corresponding to the state of charge through the first area.

For the visual feedback corresponding to the state of the charge, the processor may be configured to determine an area where the first color is to be represented on the UI of the first area by using a charging rate of the wearable device, control the display to represent the first color on the determined area, and control the display to provide a visual effect of moving the area where the first color is represented according to an increase in the charging rate.

When there is an exercise start instruction of the user, the processor may be configured to transmit, to the wearable device, a control signal instructing that scanning for determining whether the user is in a ready state of exercise start be performed, receive, from the wearable device, fourth state information indicating that the wearable device is in a scanning state for performing the scanning, recognize the state of the wearable device as the scanning state according to the received fourth state information, and control the display to provide visual feedback corresponding to the scanning state through the first area.

For the visual feedback corresponding to the scanning state, the processor may be configured to control the display to provide a visual effect of moving an area where the second color is represented on the UI of the first area.

The processor may be configured to receive, from the wearable device, an evaluation result of an exercise pose of the user and fifth state information indicating that the wearable device is in an utterance state for outputting the evaluation result in an utterance voice, recognize the state of the wearable device as the utterance state according to the received fifth state information, and control the display to provide visual feedback corresponding to the utterance state through the first area.

For the visual feedback corresponding to the utterance state, the processor may be configured to control the display to repeatedly extend and reduce the area where the second color is represented on the UI of the first area.

When the electronic device establishes a wireless communication link with wireless earphones through the communication module, the processor may be configured to control the wearable device not to output the utterance voice, generate the utterance voice based on the received evaluation result, and transmit the generated utterance voice to the wireless earphones so that the generated utterance is output by the wireless earphones.

The processor may be configured to receive motion information obtained by sensing the motion from the wearable device through the communication module, transmit the motion information, position information of the user, biometric information of the user, and exercise amount information of the user to a server, receive, from the server, guide information about an exercise of the user, the guide information determined based on the motion information, the position information, the biometric information, the exercise amount information, and environment information about an area where the user is, and control the display to provide the received guide information through the first area.

According to an embodiment, an operating method of an electronic device 400 communicating with a wearable device 300 applying an external force to a user includes: receiving first state information indicating that the wearable device is in a sensing state for sensing a motion of the user from the wearable device; recognizing a state of the wearable device as the sensing state according to the received first state information; and providing visual feedback corresponding to the sensing state through a first area of a screen of a fitness application.

The providing may include sequentially representing (or outputting) each of a plurality of colors on a UI of the first area for the visual feedback corresponding to the sensing state.

The colors may be configured by the user.

The operating method may include: receiving second state information indicating that the wearable device is in a booting state from the wearable device; recognizing the state of the wearable device as the booting state according to the received second state information; and providing visual feedback corresponding to the booting state through the first area.

The providing may include representing (or outputting) a first color on the UI of the first area for the visual feedback corresponding to the booting state and changing the first color of the UI to a second color.

The operating method may include: receiving third state information indicating that the wearable device is in a state of charge from the wearable device; recognizing the state of the wearable device as the state of charge according to the received third state information; and providing visual feedback corresponding to the state of charge through the first area.

The providing may include: determining an area where the first color is to be represented on the UI of the first area by using a charging rate of the wearable device for the visual feedback corresponding to the state of charge; representing the first color on the determined area; and providing a visual effect of moving the area where the first color is represented according to an increase in the charging rate.

When there is an exercise start instruction of the user, the operating method may include: transmitting, to the wearable device, a control signal instructing the wearable device to perform scanning for determining whether the user is in a ready state of exercise start; receiving, from the wearable device, fourth state information indicating that the wearable device is in a scanning state for performing the scanning; recognize the state of the wearable device as the scanning state according to the received fourth state information; and providing visual feedback corresponding to the scanning state through the first area.

The providing may include providing a visual effect of moving an area where the second color is represented on the UI of the first area for visual feedback corresponding to the scanning state.

The operating method may include: receiving an evaluation result of an exercise pose of the user and fifth state information indicating that the wearable device is in an utterance state for outputting the evaluation result in an utterance voice; recognizing the state of the wearable device as the utterance state according to the received fifth state information; and providing visual feedback corresponding to the utterance state through the first area.

The providing may include repeatedly extending and reducing the area where the second color is represented on the UI of the first area for the visual feedback corresponding to the utterance state.

When the electronic device establishes a wireless communication with wireless earphones, the operating method may include: controlling the wearable device not to output the utterance voice; generating the utterance voice based on the received evaluation result; and transmitting the generated utterance voice to the wireless earphones so that the generated utterance is output by the wireless earphones.

The operating method may include: receiving motion information obtained by sensing the motion from the wearable device; transmitting the motion information, position information of the user, biometric information of the user, and exercise amount information of the user to a server; receiving, from the server, guide information about an exercise of the user, wherein the guide information is determined based on the motion information, the position information, the biometric information, the exercise amount information, and environment information about an area where the user is; and providing the received guide information through the first area.

According to an embodiment, a watch-type electronic device 132 or 6000 may communicate with a wearable device 300 applying an external force to a user. The watch-type electronic device 132 or 6000 may include a communication module 6020 configured to establish a wireless communication link with a user terminal 400 and communicate with the wearable device through the user terminal, a display 6040, a memory 6030 configured to store a fitness application, a processor 6010 configured to execute the fitness application and control the display to display a first screen of the executed fitness application on the display.

The processor may be configured to cause, to be displayed on the first screen, an object corresponding to an operation mode of the wearable device, an exercise intensity, a button for changing the exercise intensity, a button for setting the operation mode to a first operation mode where the wearable device provides assistive power to the user, and a button for setting the operation mode to a second mode where the wearable device provides resistance power to the user.

The processor may be configured to control the display to display a second screen of the executed fitness application on the display and cause, to be displayed on the second screen, the object corresponding to the operation mode of the wearable device, the exercise intensity, an exercise performance time of the user, an exercise index of the user, and biometric information of the user.

The processor may be configured to control the display to display a third screen of the executed fitness application on the display and cause, to be displayed on the third screen, an exercise index of the user during a workout section, a time corresponding to the workout section, and biometric information of the user during the workout section.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions. Each "processor" herein comprises processing circuitry. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Accordingly, other implementations are within the scope of the following claims.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment (s) described herein may be used in conjunction with any other embodiment(s) described herein.

What is claimed is:

1. An electronic device for communicating with a wearable device for applying an external force to a user, the electronic device comprising:
   a communication module, comprising communication circuitry, configured to establish a wireless communication link with the wearable device;
   a display;
   a memory configured to store a fitness application; and
   at least one processor, comprising processing circuitry, configured individually and/or collectively to execute the fitness application and control the display so that a screen of the executed fitness application comprising a first area is displayed on the display,
   wherein the at least one processor is configured individually and/or collectively to:
      receive first state information indicating that the wearable device is in a sensing state for sensing a motion of the user through the communication module; and
      control the display to provide visual feedback through the first area based on the first state information, wherein the visual feedback corresponds to light, that is output by the wearable device, indicating that the wearable device is in the sensing state.

2. The electronic device of claim 1, wherein, for the visual feedback corresponding to the sensing state, the at least one processor is configured individually and/or collectively to control the display to sequentially represent each of a plurality of colors on a user interface (UI) of the first area.

3. The electronic device method of claim 2, wherein the colors are configurable by the user.

4. The electronic device of claim 1, wherein the at least one processor is configured individually and/or collectively to:
   receive, from the wearable device through the communication module, second state information indicating that the wearable device is in a booting state;
   recognize the state of the wearable device as the booting state according to the received second state information; and
   control the display to provide visual feedback corresponding to the booting state through the first area.

5. The electronic device of claim 4, wherein, for the visual feedback corresponding to the booting state, the at least one processor is configured individually and/or collectively to control the display to represent a first color on the UI of the first area and control the display to change the first color of the UI to a second color.

6. The electronic device of claim 1, wherein the at least one processor is configured individually and/or collectively to:
   receive, from the wearable device through the communication module, third state information indicating that the wearable device is in a state of charge from the wearable device through the communication module;
   recognize the state of the wearable device as the state of the charge according to the received third state information; and
   control the display to provide visual feedback corresponding to the state of charge through the first area.

7. The electronic device of claim 6, wherein, for the visual feedback corresponding to the state of the charge, the at least one processor is configured individually and/or collectively to:
   determine an area where the first color is to be represented on the UI of the first area by using a charging rate of the wearable device;
   control the display to represent the first color on the determined area; and
   control the display to provide a visual effect of moving the area where the first color is represented according to an increase in the charging rate.

8. The electronic device of claim 1, wherein the at least one processor is configured individually and/or collectively to, when there is an exercise start instruction of the user:
   control to transmit, to the wearable device, a control signal instructing that scanning for determining whether the user is in a ready state of exercise start be performed;
   receive, from the wearable device, fourth state information indicating that the wearable device is in a scanning state for performing the scanning;
   recognize the state of the wearable device as the scanning state according to the received fourth state information; and
   control the display to provide visual feedback corresponding to the scanning state through the first area.

9. The electronic device of claim 8, wherein, for the visual feedback corresponding to the scanning state, the at least one processor is configured individually and/or collectively to control the display to provide a visual effect of moving an area where a second color is represented on the UI of the first area.

10. The electronic device of claim 1, wherein the at least one processor is configured individually and/or collectively to:

receive, from the wearable device, an evaluation result regarding an exercise pose of the user and fifth state information indicating that the wearable device is in an utterance state for outputting the evaluation result in an utterance voice;

recognize the state of the wearable device as the utterance state according to the received fifth state information; and control the display to provide visual feedback corresponding to the utterance state through the first area.

11. The electronic device of claim 10, wherein, for the visual feedback corresponding to the utterance state, the at least one processor is configured individually and/or collectively to control the display to repeatedly extend and reduce the area where the second color is represented on the UI of the first area.

12. The electronic device of claim 10, wherein the at least one processor is configured individually and/or collectively to, when the electronic device establishes a wireless communication link with wireless earphones:

control the wearable device to not output the utterance voice;

generate the utterance voice based on the received evaluation result; and control to transmit the generated utterance voice to the wireless earphones so that the generated utterance is output by the wireless earphones.

13. The electronic device of claim 1, wherein the at least one processor is configured individually and/or collectively to:

receive, from the wearable device through the communication module, motion information obtained by sensing the motion;

control to transmit, through the communication module, the motion information, position information of the user, biometric information of the user, and exercise amount information of the user to a server;

receive, from the server through the communication module, guide information about an exercise of the user, wherein the guide information is based on the motion information, the position information, the biometric information, the exercise amount information, and environment information about an area where the user is; and control the display to provide the received guide information via the first area.

14. A wearable device comprising:

a communication module, comprising communication circuitry, configured to establish a wireless communication link with an electronic device;

a driving module, comprising a motor and/or circuitry, configured to generate torque to provide an external force to a user;

a sensor configured to acquire motion information by sensing a motion of the user;

a display module comprising a lighting unit; and at least one processor, comprising processor circuitry, configured individually and/or collectively to:

control to transmit first state information indicating that the wearable device is in a sensing state for sensing the motion, to the electronic device via the communication module;

control the display module to output light indicating the sensing state via the display module, wherein the light corresponds to visual feedback provided by the electronic device;

determine control information used for generating the torque by using at least some of the acquired motion information; and control the driving module to provide the external force to the user based on the determined control information.

15. The wearable device of claim 14, wherein
the lighting unit comprises at least one light source, and
the at least one processor is configured individually and/or collectively to control the lighting unit to sequentially output light of each of a plurality of colors for the light indicating the sensing state.

16. The wearable device of claim 14, wherein the at least one processor is configured individually and/or collectively to:

control to transmit second state information indicating that the wearable device is in a booting state to the electronic device through the communication module, and control the display module to provide visual feedback corresponding to the booting state; or control to transmit third state information indicating that the wearable device is in a state of charge to the electronic device through the communication module, and control the display module to provide visual feedback corresponding to the state of charge.

17. The wearable device of claim 14, wherein the at least one processor is configured individually and/or collectively to:

receive a control signal instructing the wearable device to perform scanning for determining whether the user is in a ready state of exercise start from the electronic device via the communication module, control to transmit, to the electronic device through the communication module, fourth state information indicating that the wearable device is in the scanning state for performing the scanning, perform the scanning based on the received control signal, and control the display module to provide visual feedback corresponding to the scanning state; or evaluate an exercise pose of the user by using at least some of the acquired motion information, control to transmit an evaluation result of the exercise pose and fifth state information indicating that the wearable device is in an utterance state for outputting the evaluation result in an utterance voice, to the electronic device via the communication module, output the utterance voice, and control the display module to provide visual feedback corresponding to the utterance state.

18. A watch-type electronic device communicating with a wearable device applying an external force to a user, the watch-type electronic device comprising:

a communication module configured to establish a wireless communication link with a user terminal and communicate with the wearable device through the user terminal;

a display;

a memory configured to store a fitness application;

at least one processor comprising processor circuitry configured individually and/or collectively to execute the fitness application and control the display to display a first screen of the executed fitness application, wherein the at least one processor is configured individually and/or collectively to display, on the first screen, an object corresponding to an operation mode of the wearable device, an exercise intensity, a button for changing the exercise intensity, a button for setting the operation mode to a first operation mode where the wearable device provides assistive power to the user, and a button for setting the operation mode to a second mode where the wearable device provides resistance power to the user.

19. The watch-type electronic device of claim 18, wherein the at least one processor is configured individually and/or collectively to:
- control the display to display a second screen of the executed fitness application on the display; and
- control the display to display, on the second screen, the object corresponding to the operation mode of the wearable device, the exercise intensity, an exercise performance time of the user, an exercise index of the user, and biometric information of the user.

20. The watch-type electronic device of claim 18, wherein the at least one processor is configured individually and/or collectively to:
- control the display to display a third screen of the executed fitness application on the display; and
- control the display to display, on the third screen, an exercise index of the user during a workout section, a time corresponding to the workout section, and biometric information of the user during the workout section.

* * * * *